United States Patent
Bouchard

(10) Patent No.: US 11,576,310 B2
(45) Date of Patent: Feb. 14, 2023

(54) SYSTEMS AND METHODS FOR EFFICIENT FOGPONIC AGRICULTURE

(71) Applicant: Serge J. Bouchard, San Ramon, CA (US)

(72) Inventor: Serge J. Bouchard, San Ramon, CA (US)

(73) Assignee: AGRITAINER, LLC, San Francisco, CA (US)

( * ) Notice: Subject to any disclaimer, the term of this patent is extended or adjusted under 35 U.S.C. 154(b) by 0 days.

(21) Appl. No.: 16/544,870

(22) Filed: Aug. 19, 2019

(65) Prior Publication Data

US 2020/0137964 A1  May 7, 2020

Related U.S. Application Data

(60) Provisional application No. 62/725,996, filed on Aug. 31, 2018.

(51) Int. Cl.
*A01G 9/24* (2006.01)
*A01G 31/00* (2018.01)
(Continued)

(52) U.S. Cl.
CPC ............. *A01G 9/246* (2013.01); *A01G 9/247* (2013.01); *A01G 22/00* (2018.02); *A01G 31/047* (2013.01);
(Continued)

(58) Field of Classification Search
CPC .. A01G 9/246; A01G 9/247; A01G 2031/006; A01G 31/06; A01G 31/00; A01G 22/00
See application file for complete search history.

(56) References Cited

U.S. PATENT DOCUMENTS

| | | | |
|---|---|---|---|
| 2,431,890 A | | 12/1947 | Raines |
| 2,522,798 A | * | 9/1950 | Persha .................. A01G 31/00 426/507 |

(Continued)

OTHER PUBLICATIONS

GrowingYourGreens, "Top 8 Vegetables You Can Easily Grow in 100+ Degree Hot Summers," Nov. 30, 2015, https://www.youtube.com/watch?v=BGvQ_pXYCCM (Year: 2015).*

(Continued)

*Primary Examiner* — Monica L Perry
*Assistant Examiner* — Megan J Moroney
(74) *Attorney, Agent, or Firm* — Kang S. Lim

(57) ABSTRACT

An integrated modular and scalable fogponics crop growth system for cultivating a crop includes an upper growth chamber housing a leafy portion of a crop, a lower growth chamber housing a root portion of the crop, a nutrient tank and dispenser, and an environmental system. The nutrient dispenser is coupled to the nutrient tank holding a nutrient mixture for sustaining the crop. The dispenser atomizes the nutrient mixture into a nutrient fog using a booster pump and a high pressure pump capable of generating approximately 800 PSI to 1500 PSI. The high pressure pump is operatively coupled to a nozzle configured to dispense the atomized nutrient fog, substantially between 6 microns and 15 microns droplet size, into the lower growth chamber. Temperature and humidity are separately controlled in the leaf area.

32 Claims, 40 Drawing Sheets

(51) Int. Cl.
  *A01G 31/02* (2006.01)
  *A01G 22/00* (2018.01)
  *H04W 4/80* (2018.01)
  *A01G 31/04* (2006.01)

(52) U.S. Cl.
  CPC ......... *H04W 4/80* (2018.02); *A01G 2031/006* (2013.01)

(56) References Cited

U.S. PATENT DOCUMENTS

| | | | | |
|---|---|---|---|---|
| 3,478,817 | A * | 11/1969 | Shaw | F24F 3/14 165/228 |
| 4,057,930 | A * | 11/1977 | Barham | A01G 31/02 47/16 |
| 4,291,499 | A | 9/1981 | Prewer | |
| 4,332,105 | A * | 6/1982 | Nir | A01G 31/02 47/1.01 R |
| 4,567,732 | A * | 2/1986 | Landstrom | A01G 9/246 62/91 |
| 4,956,936 | A * | 9/1990 | Sprung | A01G 9/247 47/17 |
| 5,121,708 | A * | 6/1992 | Nuttie | A23K 10/30 47/1.4 |
| 5,937,575 | A * | 8/1999 | Zobel | A01G 31/02 47/62 A |
| 8,881,454 | B2 * | 11/2014 | Janney | A01G 31/02 47/62 A |
| 9,148,993 | B1 * | 10/2015 | Miller | C05D 1/00 |
| 9,992,940 | B2 * | 6/2018 | Yano | A01G 31/02 |
| 2007/0033395 | A1 * | 2/2007 | MacLean | G06F 21/105 713/157 |
| 2014/0101999 | A1 * | 4/2014 | Gardner | A01G 9/02 47/65.6 |
| 2014/0259920 | A1 * | 9/2014 | Wilson | A01G 22/00 47/62 R |
| 2014/0318012 | A1 | 10/2014 | Fujiyama | |
| 2015/0027051 | A1 | 1/2015 | Anderson et al. | |
| 2015/0282440 | A1 * | 10/2015 | Shelor | A01G 9/246 47/17 |
| 2015/0305258 | A1 * | 10/2015 | Broutin Farah | A01G 7/06 700/90 |
| 2016/0050862 | A1 * | 2/2016 | Walliser | A01G 31/02 47/62 E |
| 2016/0085648 | A1 * | 3/2016 | Joshi | G06F 11/2028 714/4.11 |
| 2016/0128289 | A1 * | 5/2016 | Wong | G05B 19/041 47/62 A |
| 2016/0135398 | A1 * | 5/2016 | Mathieu | A01G 9/023 47/62 R |
| 2017/0030565 | A1 * | 2/2017 | Powell | A01G 7/045 |
| 2017/0035002 | A1 * | 2/2017 | Ellins | A01G 31/02 |
| 2017/0064912 | A1 * | 3/2017 | Tabakman | A01G 31/06 |
| 2017/0071143 | A1 * | 3/2017 | Newsam | A01G 9/246 |
| 2017/0142912 | A1 * | 5/2017 | Gasmer | A01G 13/0212 |
| 2017/0325427 | A1 * | 11/2017 | Straight | A01K 63/047 |
| 2018/0007845 | A1 * | 1/2018 | Martin | A01G 7/045 |
| 2018/0014486 | A1 * | 1/2018 | Creechley | A01G 31/06 |
| 2018/0077884 | A1 * | 3/2018 | Barker | A01G 9/0295 |
| 2018/0116131 | A1 * | 5/2018 | Leo | A01G 7/045 |
| 2018/0168108 | A1 * | 6/2018 | Foreman | A01G 9/023 |
| 2018/0177140 | A1 * | 6/2018 | Gallant | A01G 9/246 |
| 2018/0359945 | A1 * | 12/2018 | Millar | A01G 27/001 |

OTHER PUBLICATIONS

ISA/US, "Notification of Transmittal of the ISR and the Written Opinion of the International Searching Authority, or the Declaration," in PCT Application No. PCT/US2019/048431 dated Dec. 2, 2019, 9 pages.

Jerry Hatfield, et al., "Temperature extremes: Effect on plant growth and development", ScienceDirect, Weather and Climate Extremes 10 (2015) 4-10, published by Elsevier B.V.

P.D. Commuri, et al., Abstract of "High Temperature during Endosperm Cell Division in Maize: A Genotypic Comparison under in Vitro and Field Conditions", Crop Science, vol. 41, Issue 4, p. 1122-1130, Jul. 1, 2001.

D. Francis, et al., "Temperature and the Cell Cycle", PubMed, Symp Soc Exp Biol. 1988; 42:181-201.

* cited by examiner

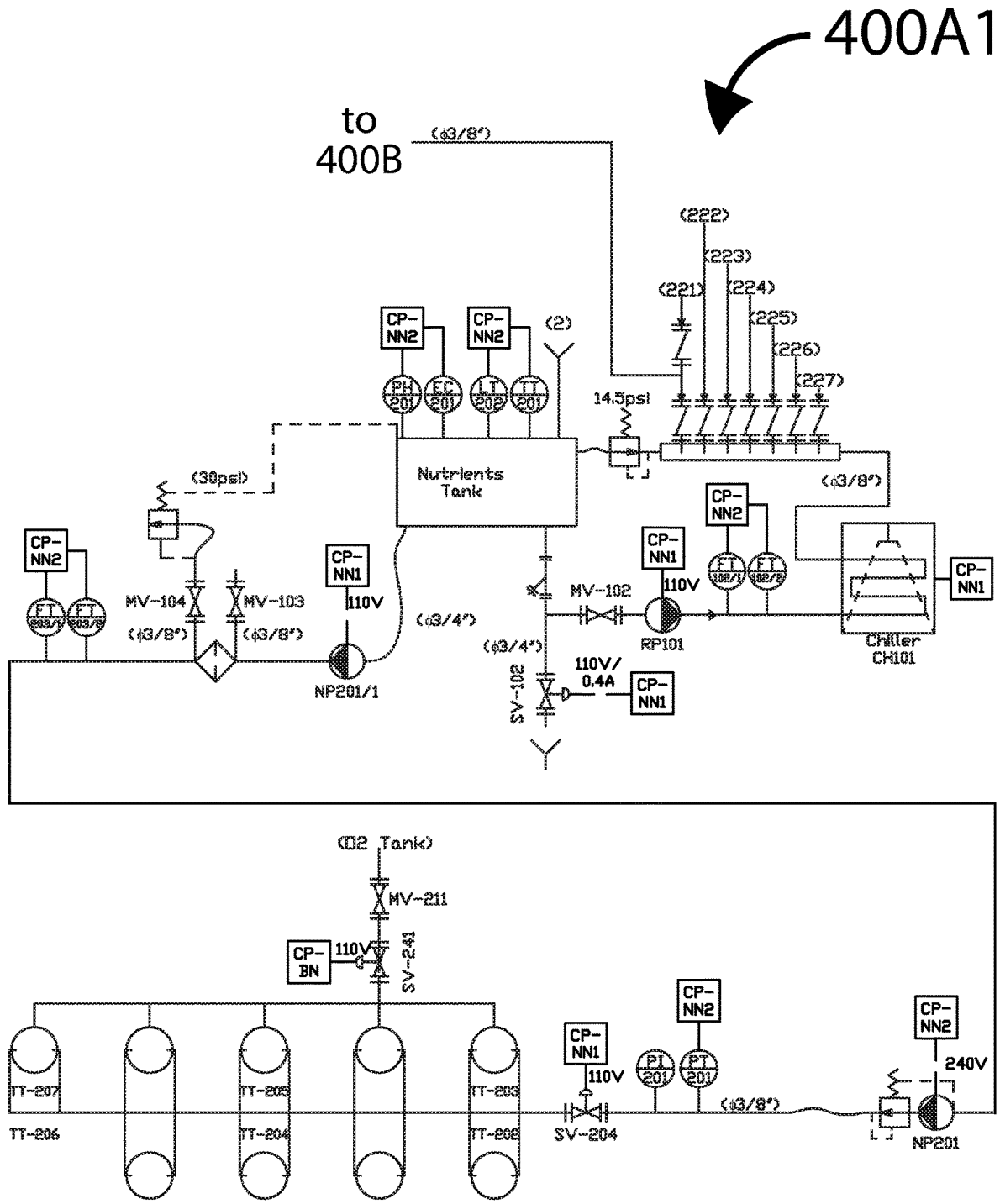
FIG. 4A-I

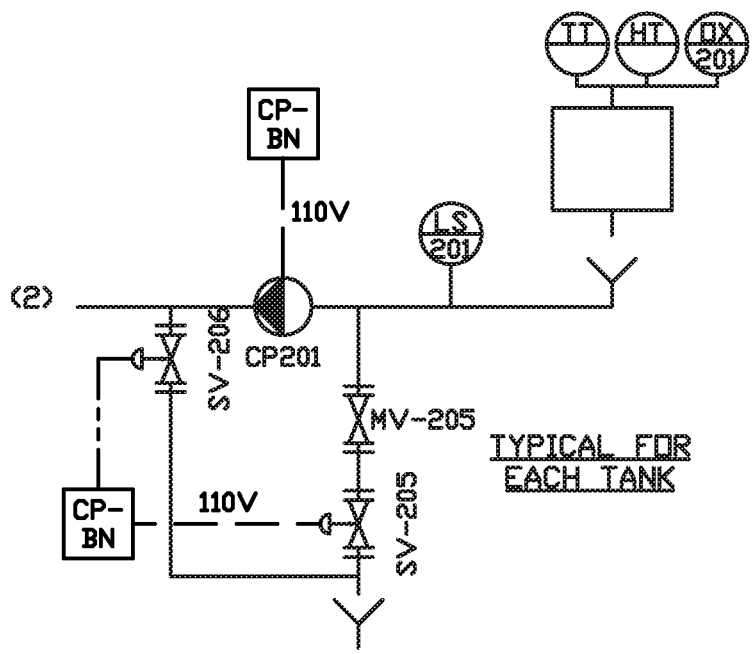
FIG. 4A-II

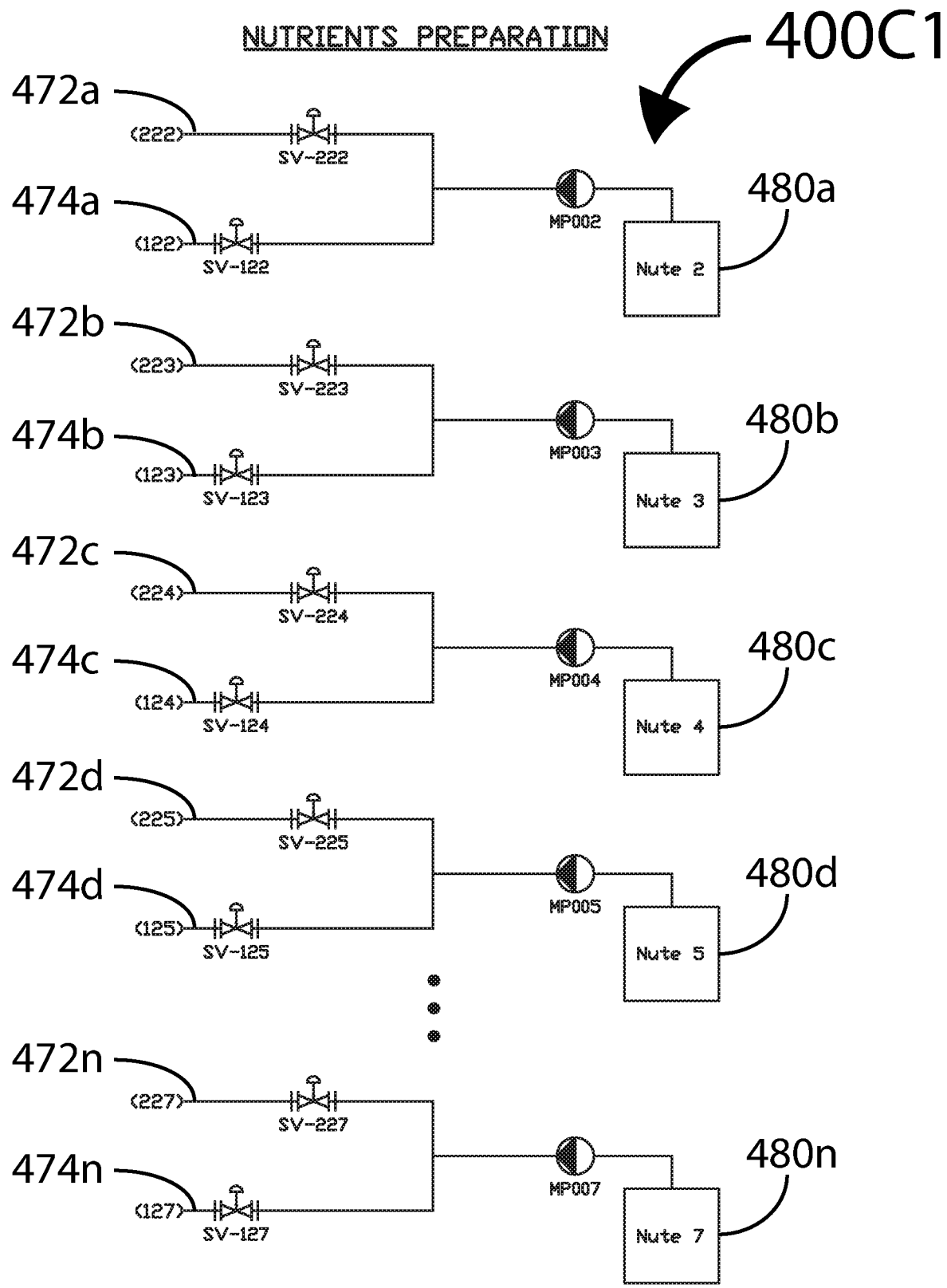
FIG. 4C-I

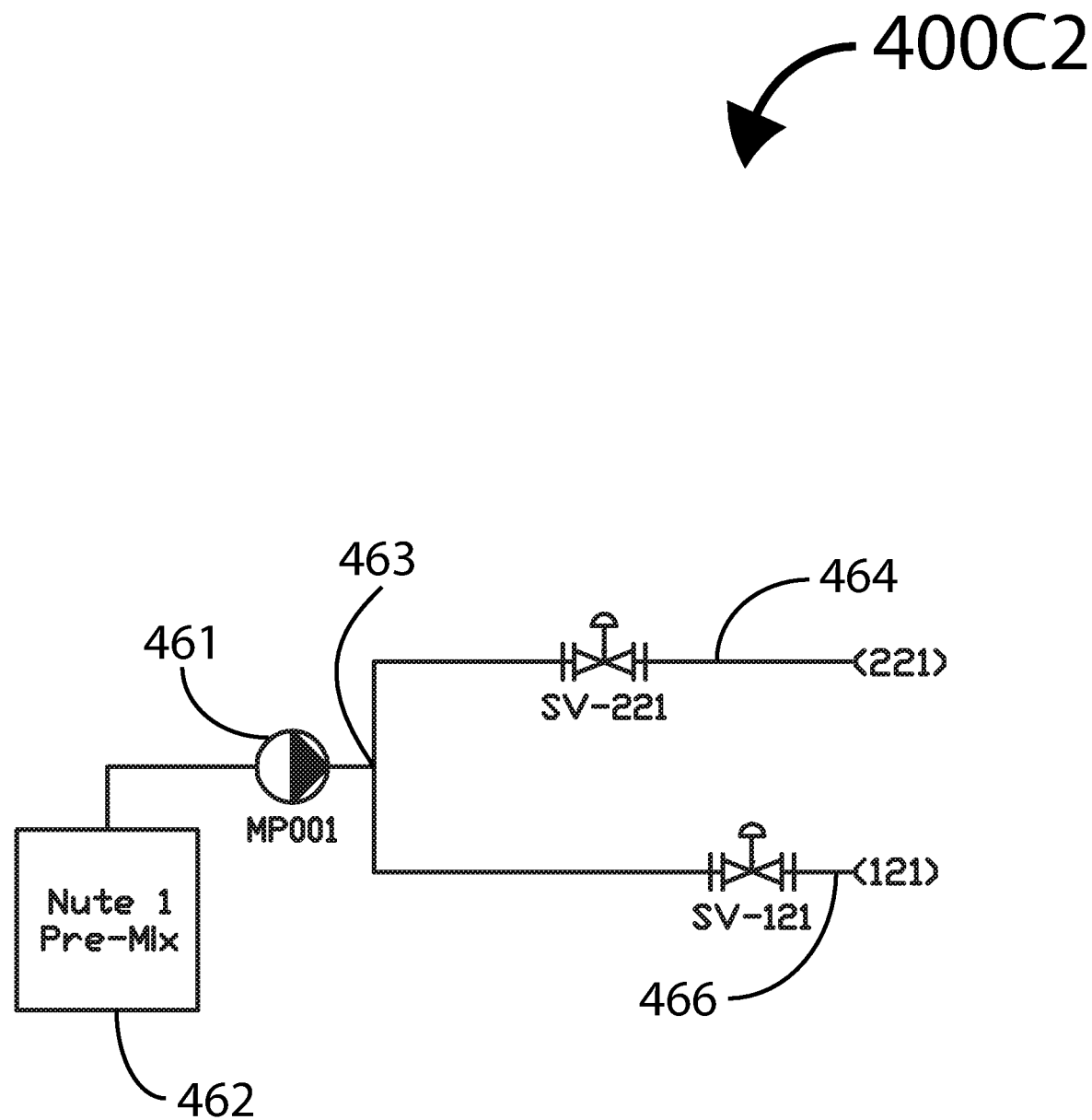
NUTRIENTS PREPARATION
FIG. 4C-II

IRRIGATION SYSTEM

SYSTEMS AND METHODS FOR EFFICIENT FOGPONIC AGRICULTURE

CROSS REFERENCE TO RELATED APPLICATION

This non-provisional application claims the benefit of U.S. provisional application No. 62/725,996 of the same title, filed in the USPTO on Aug. 31, 2018, by inventor Serge J. Bouchard, which application is incorporated herein in its entirely by this reference.

BACKGROUND

The present invention relates to systems and methods for high pressure fogponics in agriculture.

Fogponics is the process of growing plants in an air and fog environment without the use of soil or an aggregate medium, also known as geoponics. Fogponics agriculture also differs from conventional hydroponics. Unlike hydroponics, which uses a liquid nutrient solution as a growing medium and essential minerals to sustain plant growth, fogponics is conducted without a growing medium.

Fogponics agriculture has been stubbornly resistant to cost effective commercialization with scale. Low and high pressure aeroponics requires an excessive number of nozzles per plant/tree to produce an evenly distributed mist and delivering nutrients at low pressure has a tendency to clog these nozzles. Traditional aeroponics has been prohibitively high cost, being challenging to design and also to operate and maintain on a commercial grow scale.

It is therefore apparent that an urgent need exists for cost effective and environmentally-friendly fogponics system. These improved systems and methods achieve highly efficient growth for large scale agriculture operations while substantially eliminating the maintenance problems associated with aeroponics.

SUMMARY

To achieve the foregoing and in accordance with the present invention, systems and methods for fogponics agriculture are provided.

In one embodiment, an integrated modular and scalable fogponics crop growth system for cultivating a crop includes an upper growth chamber, a lower growth chamber, a nutrient tank and dispenser, and an environmental system. The upper growth chamber is configured to accommodate a leafy portion of a crop, while the lower growth chamber is configured to accommodate a root portion of the crop.

The nutrient tank is configured to hold a nutrient mixture for sustaining the crop. The nutrient dispenser is coupled to the nutrient tank and is configured to atomize the nutrient mixture into a nutrient fog. The nutrient dispenser includes a booster pump and a high pressure pump, with the booster pump providing back pressure for the high pressure pump generating approximately 800 PSI to 1500 PSI. The high pressure pump is operatively coupled to a nozzle configured to dispense the atomized nutrient fog, substantially between 6 microns and 15 microns, into the lower growth chamber. The environmental system maintains an optimal air mixture, including proportions of $O_2$, $CO_2$ and $H_2O$ at an optimal ambient temperature for the upper growth chamber.

Note that the various features of the present invention described above can be practiced alone or in combination. These and other features of the present invention will be described in more detail below in the detailed description of the invention and in conjunction with the following figures.

BRIEF DESCRIPTION OF THE DRAWINGS

In order that the present invention can be more clearly ascertained, some embodiments will now be described, by way of example, with reference to the accompanying drawings, in which:

FIGS. 4A-I-4A-II are representative schematics of a fluid processing system for the growth system of FIG. 1A;

FIGS. 4B, 4C-I, 4C-II, 4D and 4E depict exemplary functional subsystems for the fluid processing system of FIGS. 4A-I-4A-II;

DETAILED DESCRIPTION

Figure 1A:
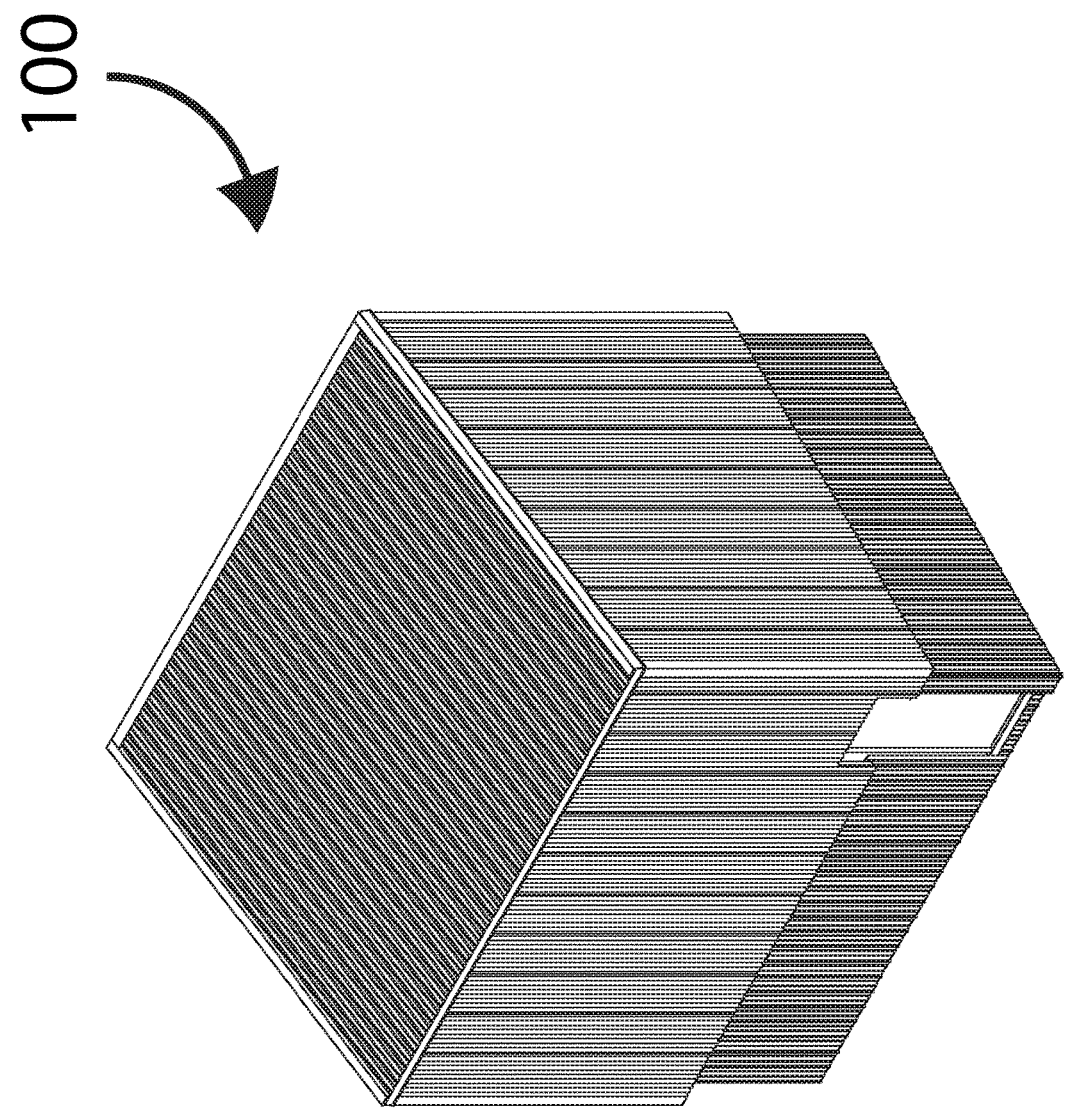
FIG. 1A is a perspective view of a fogponics growth system in accordance with the present invention.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments can be practiced without some or all of these specific details. In other instances, well known process steps and/or structures have not been described in detail in order to not unnecessarily obscure the present invention. The features and advantages of embodiments can be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description can be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to systems and methods for agricultural growth based on the environmentally-friendly and efficient delivery of nutrition to the root system of plants using a vapor comprised primarily of water and nutrients, or minerals, illumination to the leaf structures that mimic natural light in the spectral range to which the plant or crop responds best and the careful control of temperature and humidity selected to optimize growth rates. These systems are configured so that the growth area can be isolated from external ambient conditions and able to be deployed in a form factor that lends itself to remote regions with limited natural resource.

The systems can be used to provide fruit or vegetables growing on large plants or trees to small villages, yet can be augmented, or scaled, to support industrial scale production of a wide range of crops. One key advantage of these systems is that it requires relatively small numbers of "farmers" having no great skill to be very productive. A consequence of the highly optimized design is that consumption of resource is small and this greatly outperforms existing technologies, minimizing waste and maximizing the cost savings through efficient use of nutrients. In addition, the systems can be supplemented using power generated and stored using renewable resources such as sunlight and wind.

To facilitate discussion, FIG. 1A shows a perspective view of one embodiment of a typical building arrangement for a crop growth system 100, in accordance with the present invention. In this embodiment, the structural housing of system 100 is predominantly created by attaching two or more similar commercially available sub-structures. An important advantage is that these structural components are sized to be handled by existing equipment so that they can be easily transported and assembled without requiring any particular accommodations such as lifting and trucking provisions that are not already in common use.

Figure 1B:
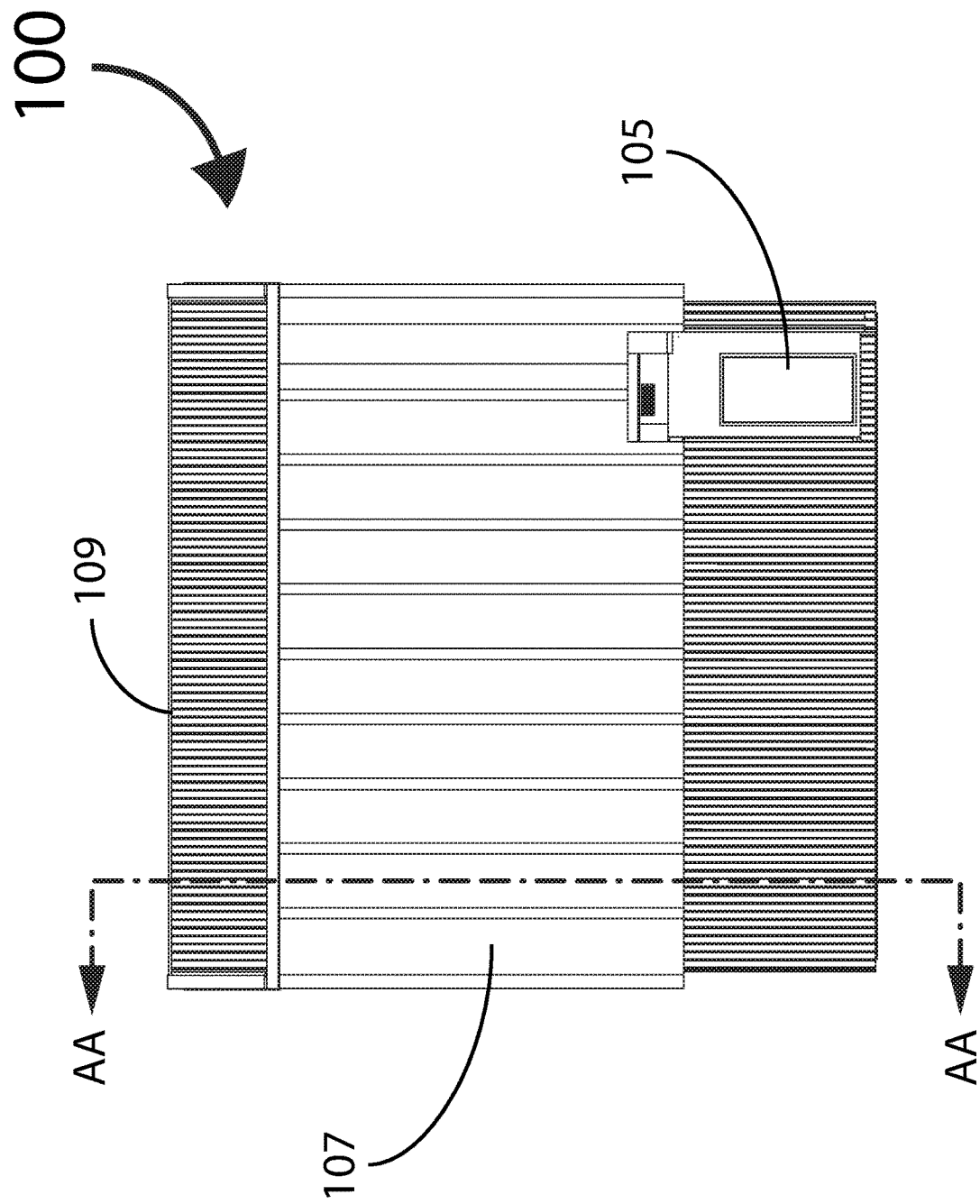
FIG. 1B is a side view of the growth system of FIG. 1A.

The elevation view of FIG. 1B also shows an exemplary entrance-way 105 that allows personnel access to a basement level of the growth system 100; although this is shown at the notional rear of the building, this entryway can be repositioned according to explicit needs. The entryway 105 can be elevated to avoid it being blocked by snowfall or flooded when the system is deployed in environmentally challenging regions which experience wintry conditions or high water levels.

Superstructure 107 can be attached to and over the assembled primary structural components and includes ducting and insulation elements that serve to reduce the impact of ambient environmental effects on the environment inside the structural housing or primary structure. This allows the conditions within the primary structure to be controlled so that an optimal growing environment can be provided from germination to harvest. Roof 109 is an external roof that caps the superstructure 107 and creates an attic space between the roof of the primary structure and itself which provides a ventilation point for cooling air as well a slope to control precipitation run off. It is also possible to store the water runoff in an external tank (not shown) to be recycled, especially in locations where rainfall and/or water supply is less reliable or predictable.

In some embodiments, roof 109 can be used as a mounting surface for energy collection components, such as solar cells for electrical energy or heat collection systems. Heat exchangers can be used for managing temperature and humidity in the growth areas located inside growth system 100 and an air exhaust can be installed at a highest point of the superstructure beneath the roof structure. Not shown can be isolation barriers interposed between the outside and inside used to ensure cleanliness in the growth areas. These can include airlocks and disinfection zones as known in the arts. In the same way, gutters and downspouts or water collection and storage provisions are excluded to avoid obscuring the essential detail. Energy collection devices which can be mounted at roof level or slightly elevated above and wiring or piping associated therewith are not shown.

Figure 1C:
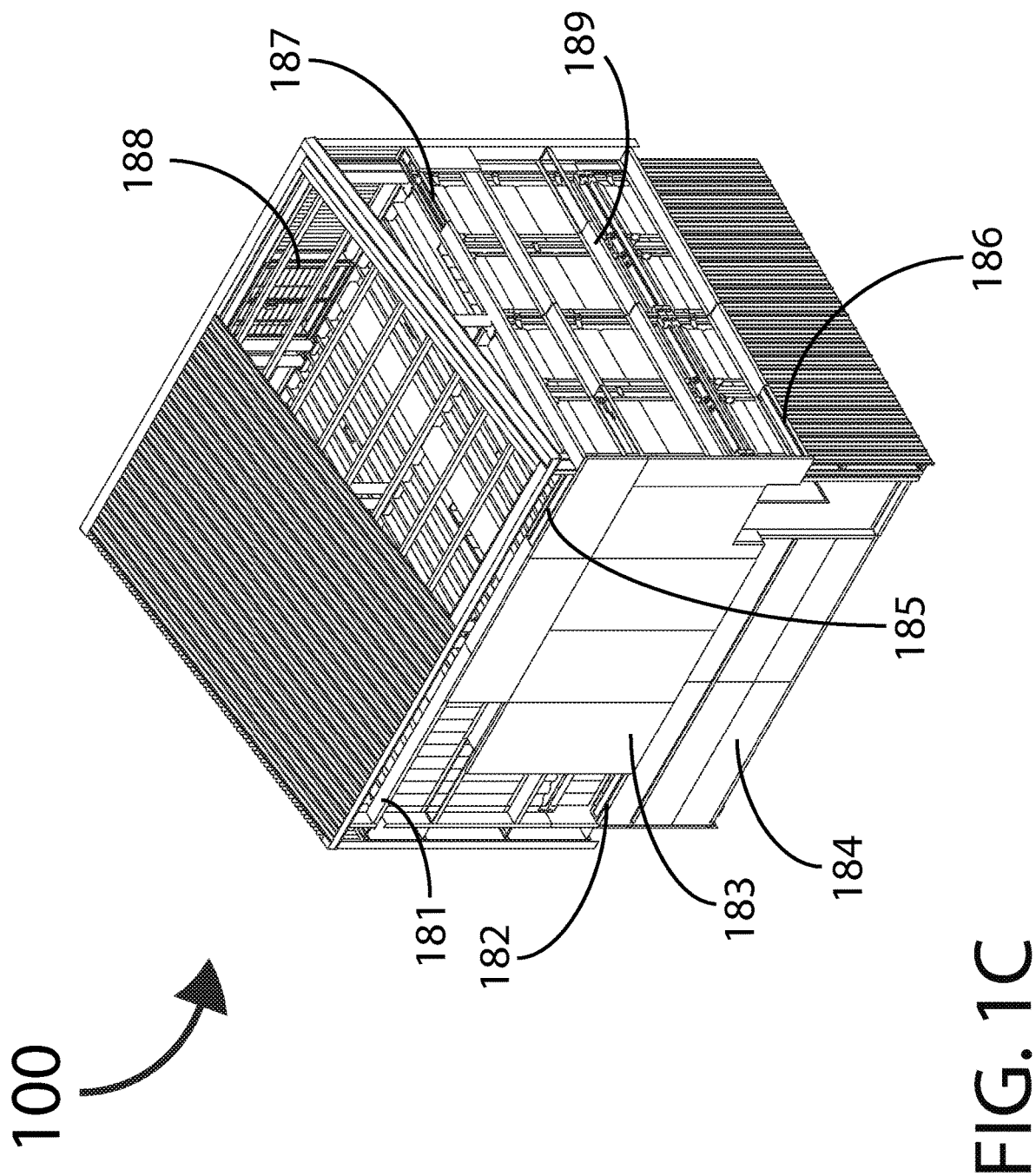
FIG. 1C illustrates a partial cut-away illustrating the external shell provides thermal management for the growth system of FIG. 1A.
Figure 1D:
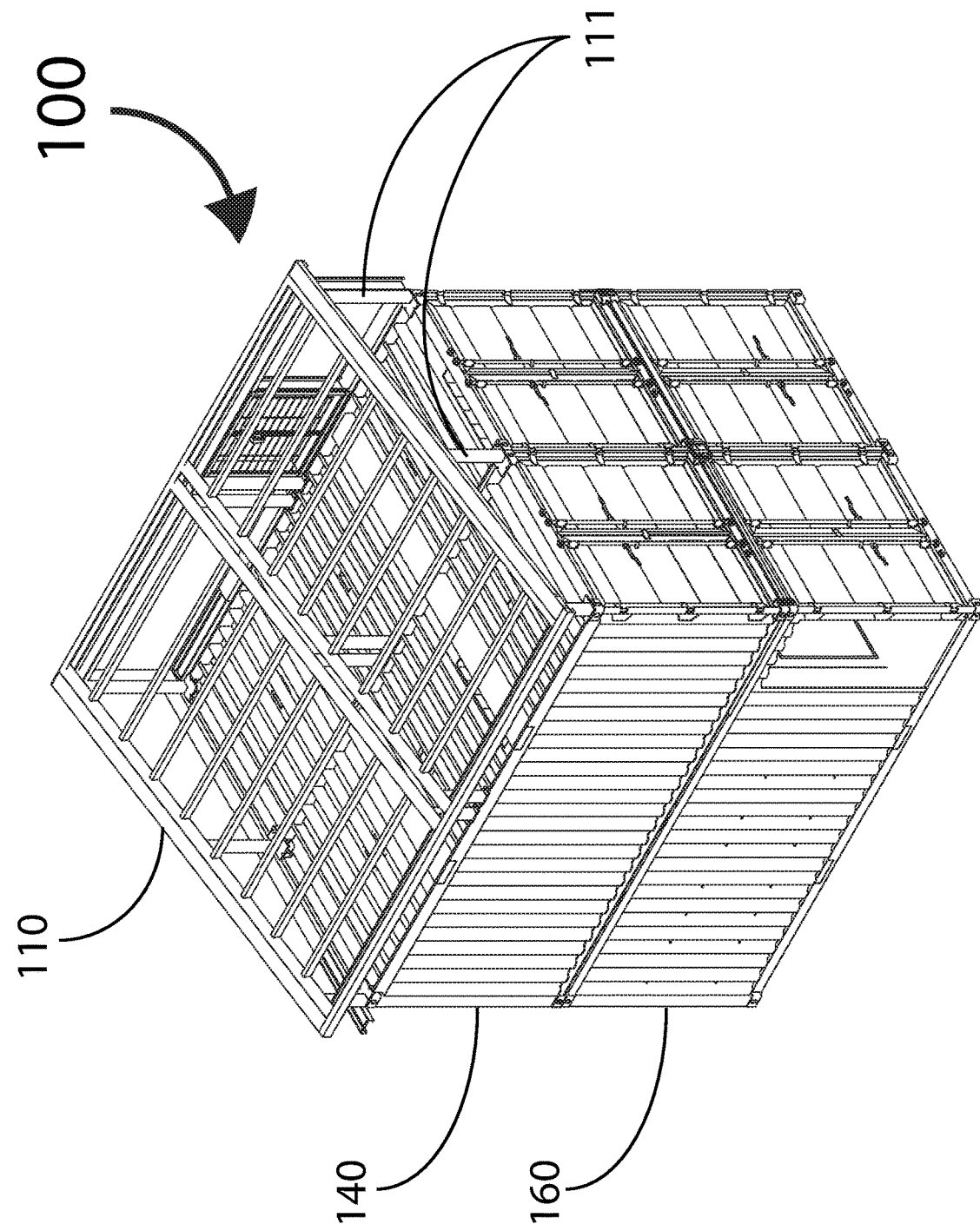
FIG. 1D illustrates a modular demountable construction style that is easily transported and handled for the growth system of FIG. 1A.

FIGS. 1C and 1D illustrate the construction details of the superstructure 107 where horizontal separators 189 are attached to the outer walls of both upper primary structure 140 and lower primary structure 160. At alternating ends of these separators 189 are cutouts that allow the passage of air from a section to the one above. Each wall can have this structure and each is isolated from its neighboring walls so that air flow control can be done independently for each wall. In use, air enters at the lower point of one end of a section at the entry cutouts 182 and 186, flows along the section to the opposite end, up to the section above via another cutout, back in the opposite direction to the next cutout, until finally the air flows along the upper section where it is discharged through the discharge holes 185 and 187.

Typically these channels are enclosed by using an insulating covering 183, such as a fiberglass panel with predetermined insulation properties. In this way, air moving along these channels accumulates heat through the walls of the container region where it is situated and warms, promoting convection until it is discharged into the roof area to finally be released to the atmosphere via exhaust vent 188 at the high point of the sloping roof 109. The vent is sized to provide suitable flow restriction for the cooling flow. Although there is generally no need to tailor the flow on individual sides of the finished structure of growth system 100, in cases of extreme weather, this can be beneficial and can be accomplished using adjustable louvre style vents at the inlet cutouts.

It should be noted that simple screens can be fitted routinely, simply to avoid the problems created by adventurous insects choosing to build nests that will compromise the cooling performance. In this process the convective flow also takes heat from the roof of the containers that make up the primary structure as well as from the sloping roof itself. The resulting convection provides sufficient airflow to extract a substantial amount of system heat in temperate climates. In cold climates, the airflow can be throttled by the simple expedient of reducing the area of the inlet point thus reducing the rate of heat extraction. Conversely, in very hot climates, it can be extremely challenging to maintain a sufficient differential temperature between the growth system 100 and the ambient air so a source of cooled air can be required. This can be done using a conventional mechanical air conditioning system or an evaporative "swamp" cooler arrangement; a heat pump can also be used to help in achieving the required system temperature inside the growth regions within the primary structure.

The attic area of roof 109, that region between the top of the upper primary structure 140 and the covering roof 109 attached to the superstructure, requires no special treatment. Since one of the walls having convective channels lies at the low end of the roof, and is notionally the rear of the structure, provision can be made to distribute airflow to the lowest height section of the attic so that this air does not stagnate and become a hotspot at roof 109. If needed, a staggered duct can be used at 181 to provide even airflow rather than through a single outlet as implied by the drawing. This can be done by enclosing the sides of the upper separator at 181 and causing it to behave as a plenum with one or more outlet slots cut so as to release air evenly into the low point of the roof 109.

The lower region of the lower primary structure 160 that does not have a superstructure overlying it can have insulating panels 184 attached directly. Because the lower primary structure 160 includes a misting apparatus within, heat is extracted by the evaporation process and yielded up upon condensation thence carried away to the water recovery plant. Additional cooling is not usually required at this level and so a simple insulating barrier to limit the rate of heat transfer between ambient conditions and the process area is considered to be sufficient for many climates.

The roof 109 of the superstructure 107 is of conventional form. Turning to FIG. 1D, vertical posts 111 can be attached to the primary structure roof and support beams 110 laid in several places so as to form a sloping foundation for a roofing material. Parallel studs can be provided for support of roofing material as required. Attachment points between the vertical posts and the primary structure can be weldments, but these can also be achieved with bolted or riveted structures.

In some embodiments, the growth system 100 comprises two, four or more standard sized intermodal shipping containers modified so as to form one or more contiguous internal spaces. For example, two containers can be placed side by side forming lower primary structure 160, and a further two containers forming upper primary structure 140 placed atop the lower primary structure 160. This category of container has a standard width of 8' which is fixed, so the width of the structure is about sixteen feet. Length for a standard container is either 20 feet or 40 feet and so it is possible to fabricate a full sized system or a half sized system depending on the target market. Especially, the global transportation of these sized components is a matter of routine since the shipping industry is equipped at every seaport to be able to handle this kind of container structure, and road and rail infrastructures globally are already designed with these items in mind.

The rectangular shaped elements of growth system 100 can be attached to each other in any of a number of ways that render the completed structure fixed. They can be bolted together and remain configurable or they can be welded together if the completed structure is intended to be permanent. Typically the lower primary structure 160 will form a basement or lower level of system 100 and can have their upper area, the ceiling, wholly or partially removed. Side walls that abut another container can also be partially or wholly removed. Upper containers of upper primary structure 140 that form a top level of system 100 can have corresponding areas of their floors removed as well as their abutting walls so that the constructed primary structure is accessible from one or more shared entrance ways.

In some embodiments, growth system 100 incorporate sealing structures that exclude gases or fluids from outside the structure. The height of a standard container is either 8'6" or 9'6" so the primary structure height can be any of 17', 18' or 19' according to the requirements of the installed product. Existing doors can be retained or else removed and replaced with alternative structures. Since internal fittings have to pass through these doors during installation, a determination can be required as to which structure is practicable. Because standard containers are exceptionally robust, very little special treatment is generally required other than selecting an appropriate paint for durability and corrosion prevention or reduction. The internal finish will be a light color so as to minimize radiation effects that couple energy between the inside and outside. Again, durability and corrosion resistance are important parameters in selecting the finish. In one embodiment, the internal walls are surfaced with plastic materials that serve to insulate as well as to reflect light. In this case, louvered elements can be inserted into the plastic so as to predetermine the flow of air between the plastic layer and the permanent wall to set the heat exchange rate. Supplementary fans can be used to add a further dimension of control.

Figure 2A:
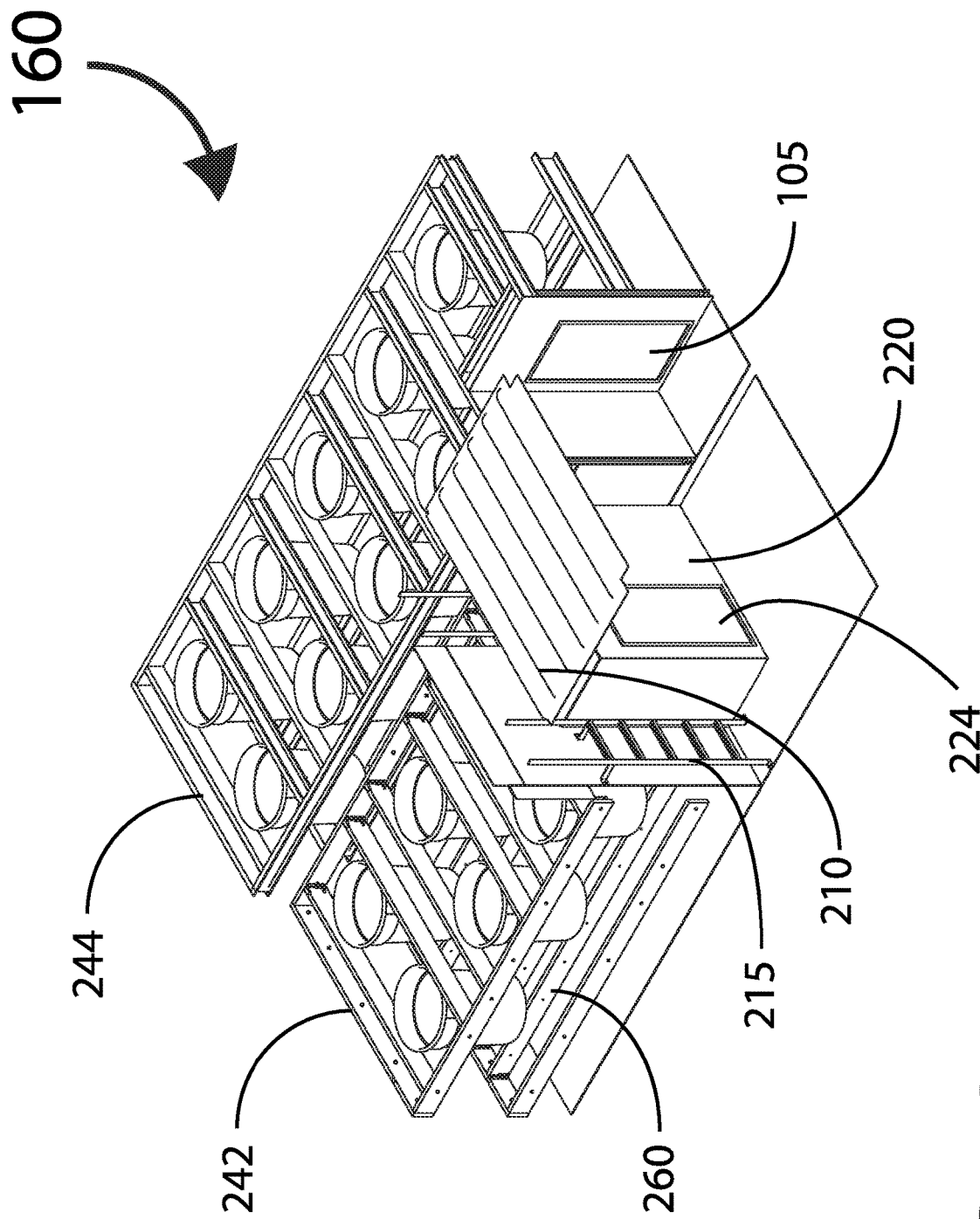
FIGS. 2A and 2B depict perspective and top views of a lower level for the growth system of FIG. 1A where the roots of the crops are housed.
Figure 2B:
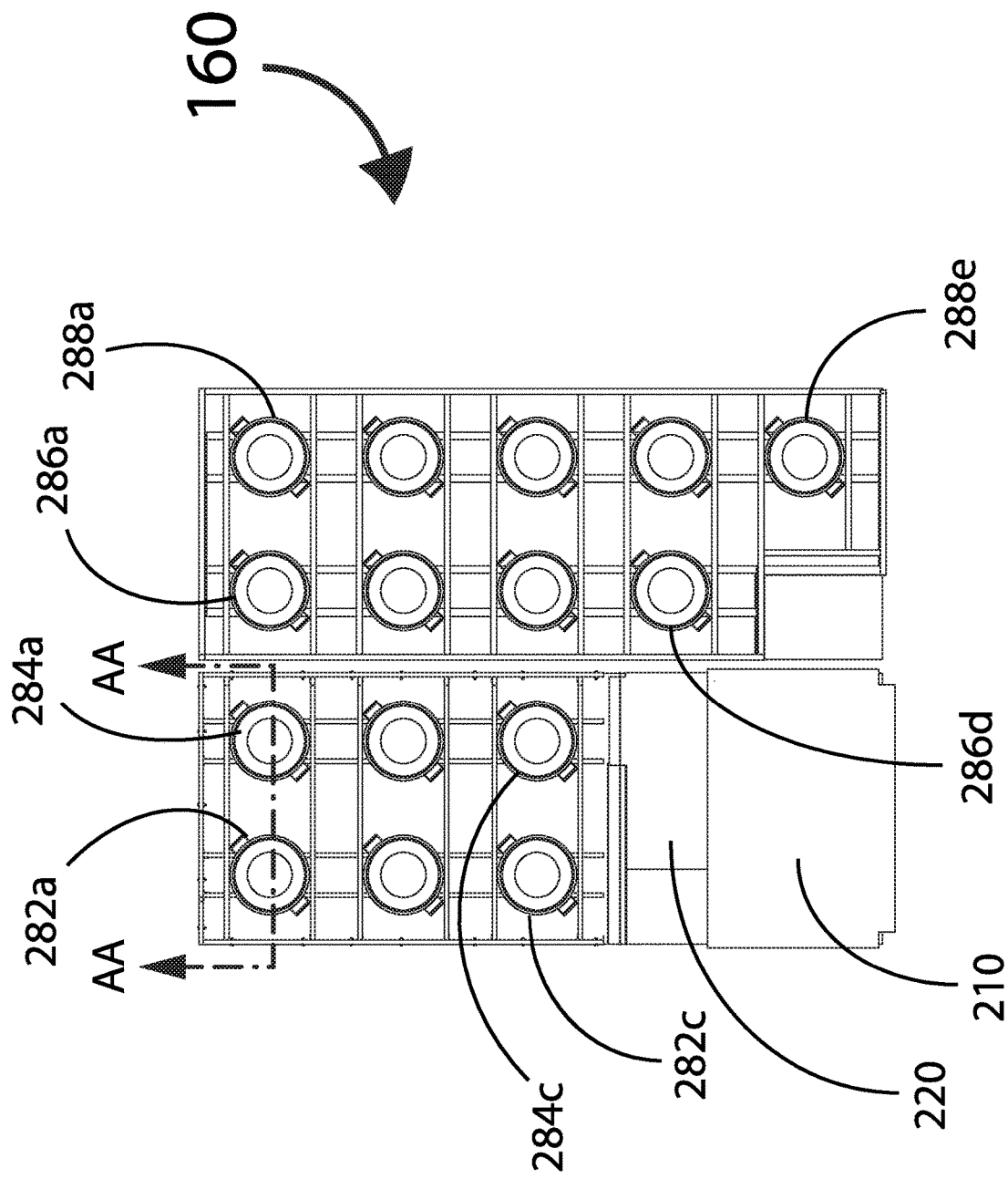

Referring now to FIG. 2A, an overview of the growing regions located inside the lower primary structure 160 is provided in a perspective view. The floor 210 of a control room, typically located in the upper level and houses the system control equipment, can also serve as the roof section of the pump room 220. Alternatively, the control room can be located anywhere in the grow farm or in another building. The pumps, valving and piping for the system is housed or originated within this pump room enclosure. As depicted in FIG. 2B, access doors 224 and 105 permit entry to the pump room 220 and the respective regions surrounding the growth reservoirs 282a . . . 282c, 284a . . . 284c, 286a . . . 286e and 288a . . . 288e, so that routine care and maintenance can be performed in this area. The control room is elevated or in a separate building so that in the event of a major failure in the irrigation system accidental flooding does not occur. Access between the control room and operations area and the basement area can be provided by a ladder 215. Because the humidity proximate to the growth reservoirs 282a . . . 288e is extremely high, approaching 100%, ideally the doors and structures form a fairly good quality seal to reduce moisture egress.

The plan view in FIG. 2B shows an exemplary four rows of grow areas corresponding roughly to the base shapes of the two containers used to make this structure excluding the area reserved for the pump room 220 and access logistics control such as airlocks. The grow reservoirs 282*a* through 282*c* and 284*a* through 284*c* are arranged as two rows of three, only by way of example. Clearly the number of grow reservoirs and their relative positioning is determined by the acceptable density for any particular crop. In general each crop is different so, correspondingly, the layout of the misting nozzles that create and sustain the nutrient fog that is matched to the root structures and positions for optimal effect. The second set of reservoirs 286*a* through 286*d* and 288*a* through 288*e* are shown for completeness and floor ducts can be installed between rows of reservoirs so as to create a suitable route for airflow management as well as drainage and condensate recovery structures.

In some embodiments, the entire growing area is well sealed and positive pressure access airlocks with disinfectant systems are provided to minimize contamination. The respective operations floors 242 and 244 are fabricated so as to allow reservoirs 282*a* . . . 288*e* to be inserted and retained laterally. An elevated subfloor structure 260 provides support for the grow reservoirs 282*a* . . . 288*e* from below and also provides a mounting point for spray nozzles that are used to create the nutrient mist. Sufficient elevation of this subfloor can be provided so that a crawl-space is created between the sub-floor and the floor of the primary structure granting maintenance access and also a routing area for the nutrient recovery drains. Not shown in the figure, drainage channels can be provided for sequestering condensate and recovering it to the main irrigation system. The recovered water is likely to have debris associated with exfoliation of the root systems and so a cleanable screening system can be used to sequester the debris from the nutrient solution prior to the recovery channels.

The root balls of the crop are intended to be located substantially inside the grow reservoirs 282*a* . . . 288*e*. Accordingly a tap root eventually extends substantially below the grow pod into the grow reservoir and this can be a consideration in the layout of the crop. The leaf bearing part of the crop is produced above the reservoir so a support structure can be required beyond what is available from the root pod. In one example of the support structure, a sprung rubber grommet suitably restrained or attached to the operations area floor can be used to clamp the main stalk, trunk or the root pod depending on the crop being raised.

Figure 2C:
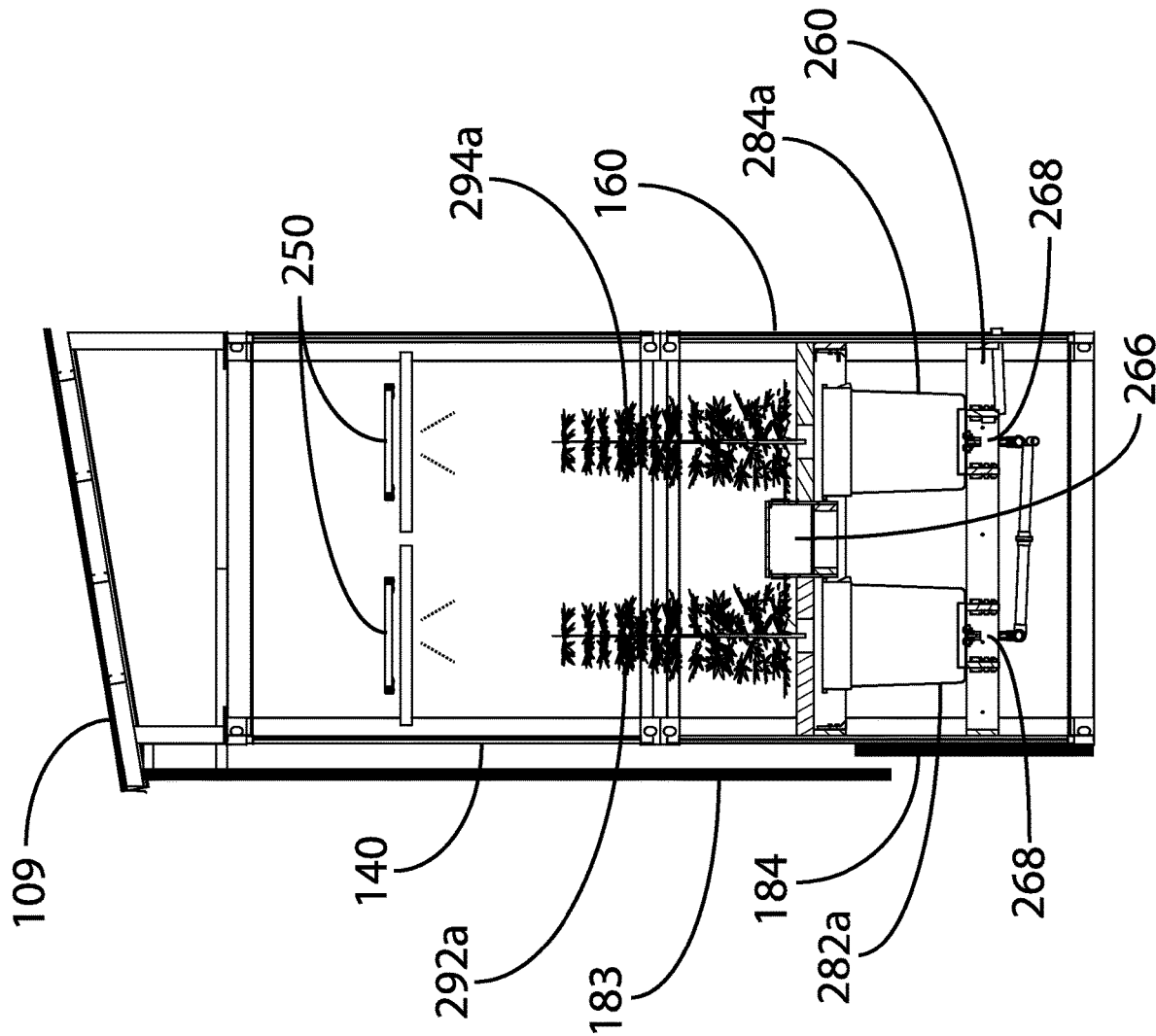
FIGS. 2C and 2D are partial cross sectional views of the growth system of FIG. 1A illustrating a representative internal layout of a typical installation and the misting and recovery apparatus at the roots of the crops.
Figure 2D:
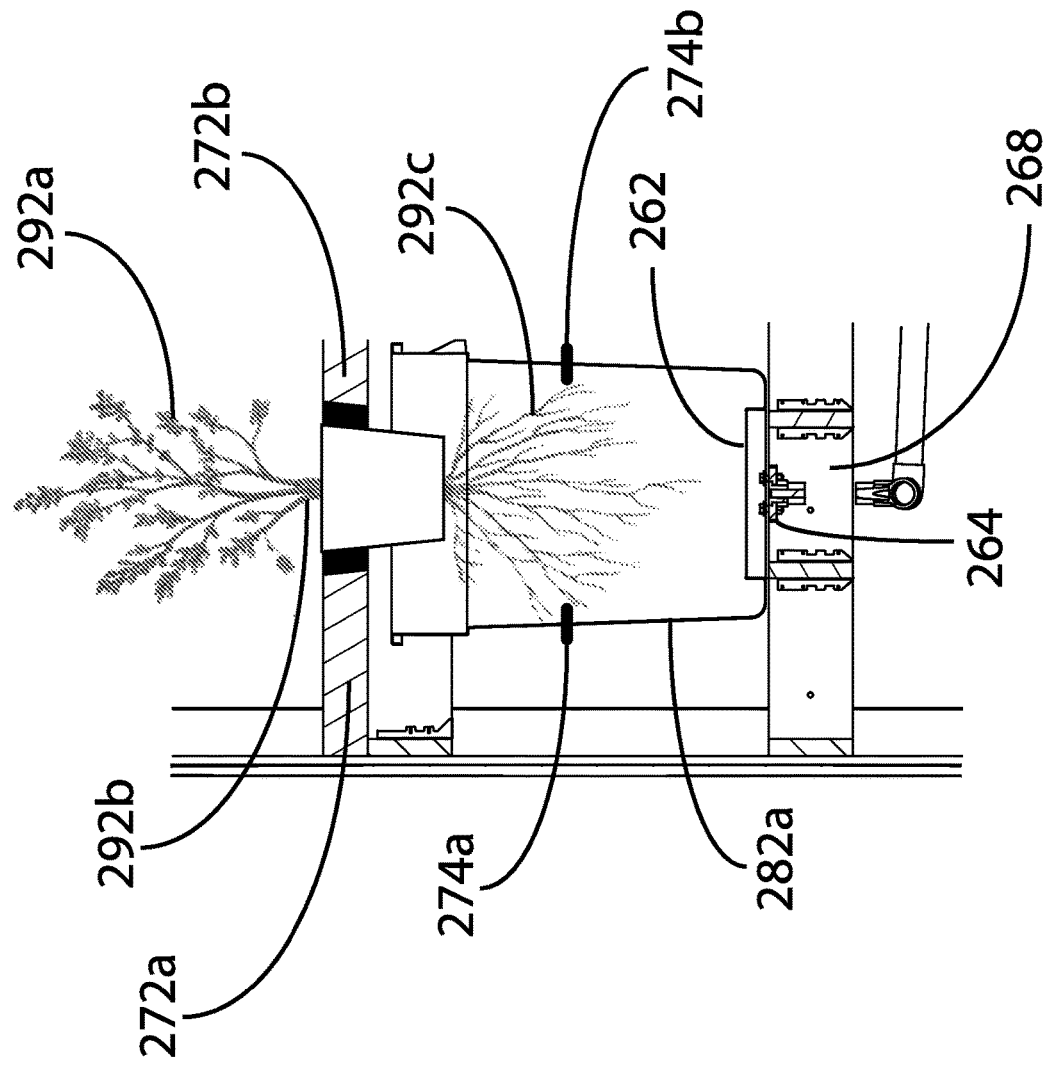

FIGS. 2C and 2D are partial cross sectional views of the growth system 100 of FIG. 1A. The upper primary structure 140 and lower primary structure 160 are shown with their relative floors and ceiling areas removed so as to form a single high bay enclosure. Sub-floor 260 is shown supporting grow reservoirs 282*a* and 284*a*. A ventilation duct 266 is located centrally between the two grow reservoirs 282*a* and 284*a* through which air of atmospheric composition supplemented with either carbon dioxide for the leafy structure or oxygen for the root structure can be provided. The placement of atomization nozzles 274*a* and 274*b* for root ball 292*c* and subsequent extensive root fibers that will develop and provisions for local drainage 268 are shown in FIG. 2D. Barrier halves 272*a* and 272*b* environmentally segregate the leafy part 292*a* from the root ball 292*c* of the crop. Barrier halves 272*a* and 272*b* can also provide physical support for the main trunk 292*b* of the crop.

The floor of the lower structure 160 can be fitted with a one piece tray which collects all the condensate. The duct system at 268 can be easily supplemented with a stainless steel mesh or grid proximate to it that allows the passage of liquid, but not the larger debris fragments. A pump can be employed to move the captured liquid back to the water processing system along with a filtration component to remove the coarser particulates down to the acceptable processing level of the system. The cladding for the superstructure is shown at 183 but the convective cooling ducting is absent for clarity. The insulation layer for the lower structure 160 is shown at 184 and the roof at 109. The leaf structures of the plant or tree is shown at 292*a* and 294*a*. Lighting is provided from overhead lights 250 and the height of this assembly can be adjusted. Note that lights 250 and lights 570 (shown in FIG. 5B) can be adjusted for height to optimize efficiency during the crop's growth cycle.

In some embodiments, the radiant energy is measured at the plant and the height of the light source altered automatically to maintain this energy at an optimal level. Although conventional lighting systems have tended to use High Pressure Sodium (HPS) or Metal-Halide (MH) lamps for illumination, these are very power hungry and rather inefficient with waste being dissipated as heat that must be removed, so LED (Light Emitting Diodes) lighting using the appropriate spectral densities for lighting reduce power consumption. In one embodiment the spectral output is dominant at the red and blue ends of the spectrum with less radiance in the yellow and green part of the spectrum. Using LED illumination for lights 250 reduces the heat output that is associated with HPS and MH lighting and significantly improves the power required by the system. Not only is more of the energy committed to illumination, but the reduction in heat output dramatically reduces the demand on the HVAC system which in consequences can be far smaller and more economic.

Figure 3A:
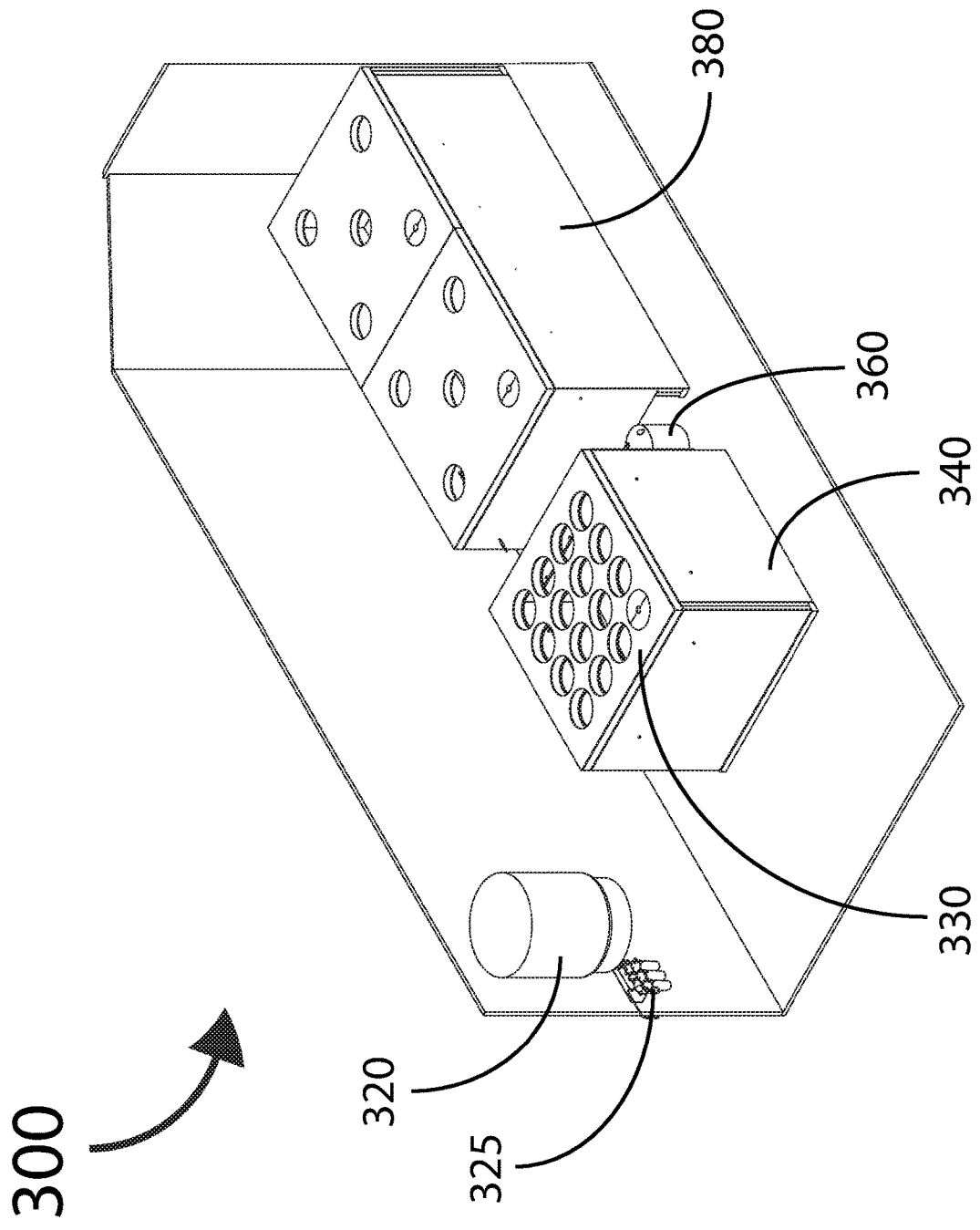
FIG. 3A is a perspective view of an exemplary nursery or germination facility located inside and incorporated with the growth system of FIG. 1A.
Figure 3B:
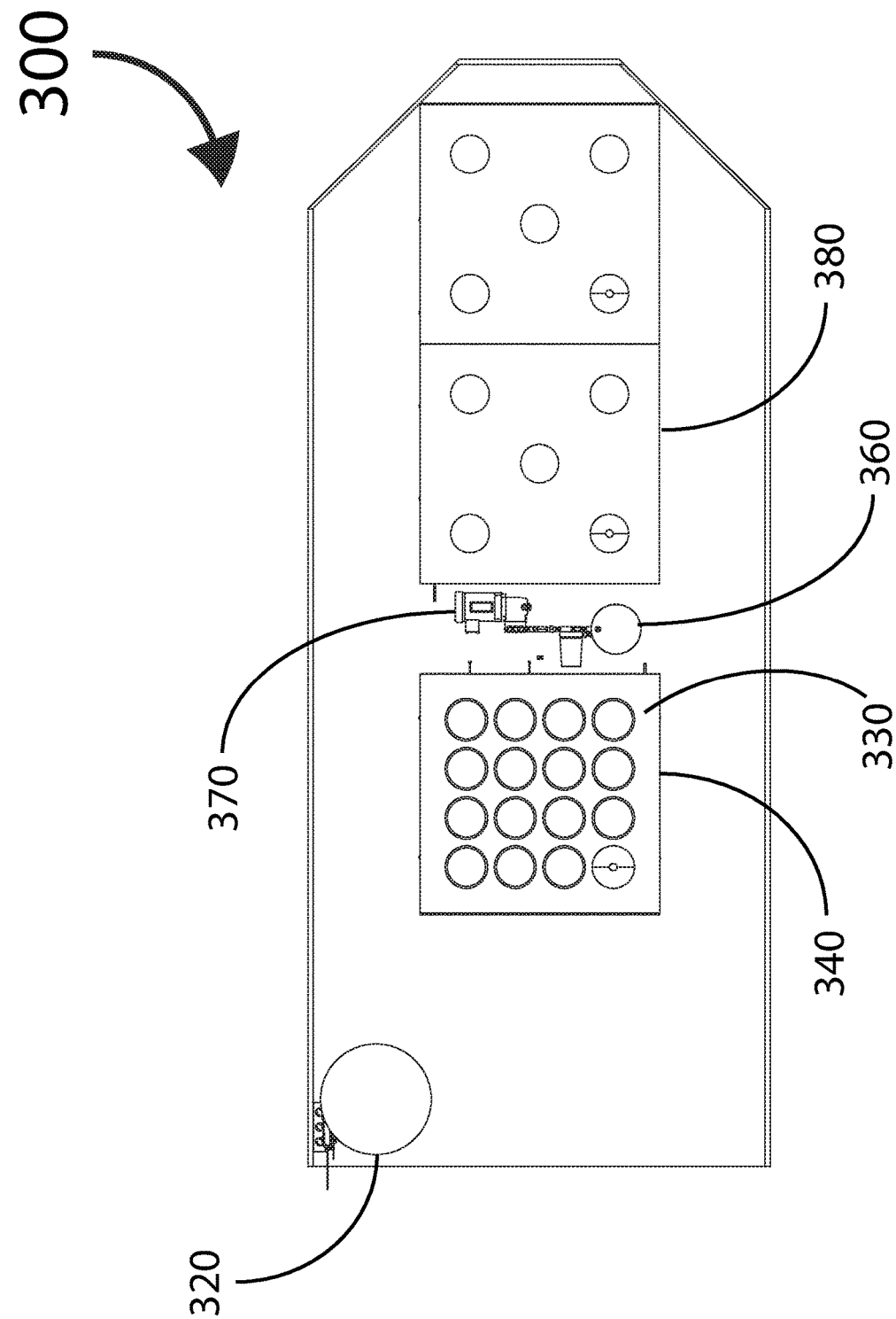
FIGS. 3B and 3C are a plan view and a side view of a representative nursery.
Figure 3C:
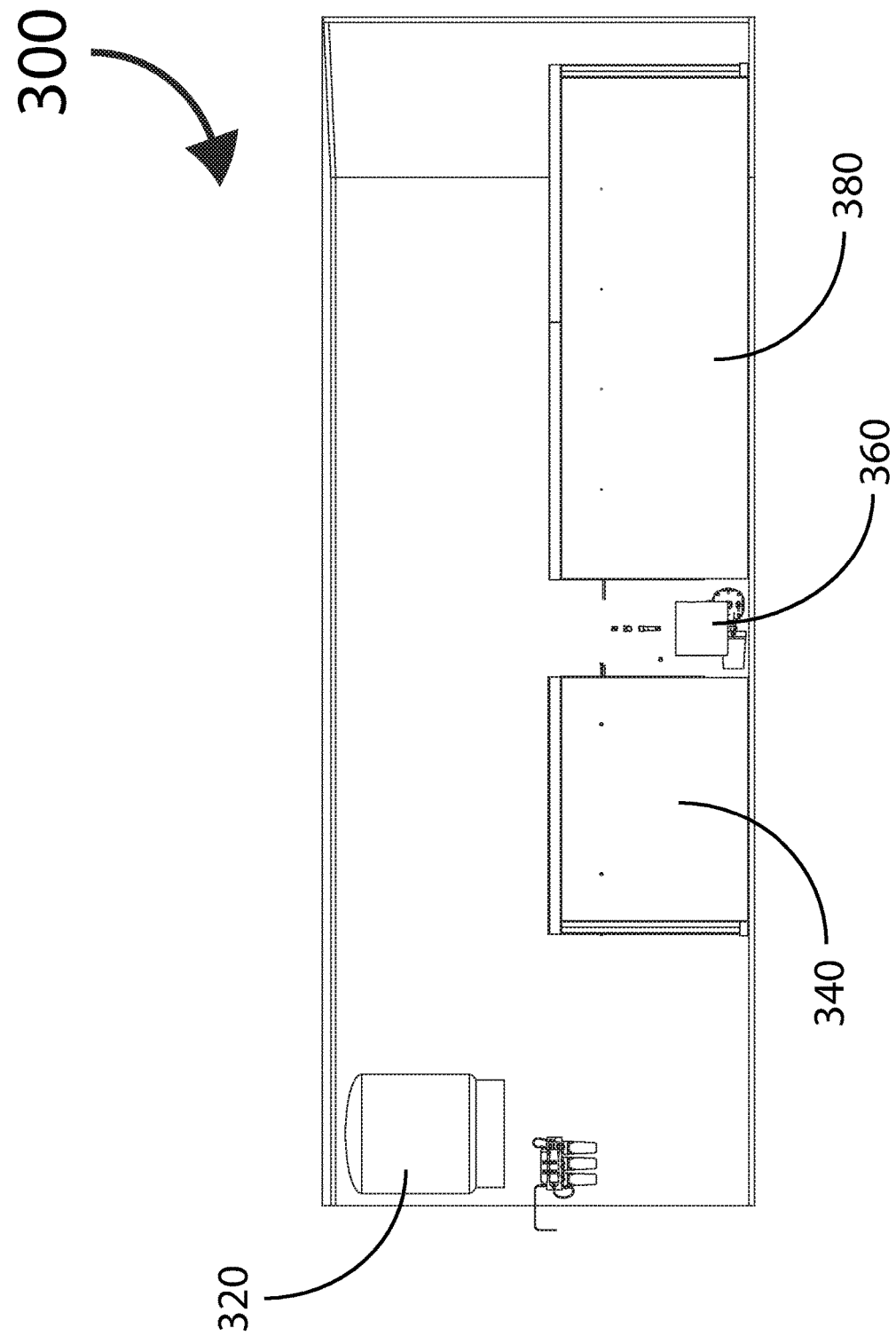

Turning now to the crop aspect of the technology, the initial stage is that of germination and vegetative area 300 is illustrated by FIG. 3A-3C. Seeds are planted and provided with an environment that encourages germination and the production of roots. Typically the seeds are embedded in an absorbent mass that can be spongiform in nature; that is to say that it allows the seed to be bathed in nutrients by absorbing and retaining a nutrient rich liquid. Temperature, usually between 12° C. and 22° C., is closely regulated and over the course of time, root fibers are produced which are then capable of absorbing quantities of nutrient and quantities of water directly from vapor, mist or fog. Illumination is not required at this stage since light is harmful to the roots which thrive in a dark environment, mimicking conditions found when a seed germinates in soil. Clones can be planted in lieu of seeds. A spongiform substrate is only required to provide protection and support for the plant seedling or clones until it reaches a point where it has produced a leaf and root structure. The substrate can be left with the plant embedded and it will eventually fracture and fragment as the plant grows. Transplanting the seedling at an intermediate stage of growth can require supplementary support until a substantial root structure has developed and in this case, clay balls contained inside a grow pad may be used. The clay is notionally impervious and devoid of nutritional value and is a purely mechanical scheme for supporting the adolescent phase plant.

Seedlings and clones occupy very little space initially and FIG. 3A illustrates a perspective view of a representative nursery comprised of small grow structures that hold the substrates into which the seedlings and/or clones have been embedded. These substrates can vary but spongiform substrates provide good support during germination and are frangible allowing the maturing plant to fracture it easily as growth occurs so that there is no particular impediment to the plant's progress. Although the germination process has a different nutrient protocol than the following growth phases, one essential similarity is the use of a closed vessel that shields the root structures from light and allows nutrition protocols to operate. An embedded seedling or clone can be placed in a cut-out in an otherwise insulated lid 330 of the insulated enclosure 340. A square or rectangular matrix is convenient for this nursery component. An insulated box enclosure 340 comprising walls that are opaque forms the basic nursery element. A nutrient delivery mechanism is provided, enclosed in the wall and/or base of the box, and is supplied with a nutrient solution in accordance with a predetermined protocol or recipe by a prepared nutrient solution tank 360, booster pump, filtration components 325, and a high pressure pump 370 shown in FIG. 3B in plan view.

A storage tank 320 holds a nutrient solution mixed in Reverse Osmosis filtered and De-Ionized water that feeds the pump, which is controlled to administer accurate doses of the nutrient solution to the seedling or clone. Filtration components 325 remove particulates so that the solution meets the cleanliness needs of the nutrient solution; depending on the construction of the delivery system, particulates can aggregate and clog valves and nozzles so their positive control is more likely to be required than not if excessive maintenance is to be avoided. Once a seedling or clone begins to sprout leaves, it can be transplanted or moved to a larger growth area 380. A typical nursery function can have many of the same control elements and functional parts of the growth area used for adolescent and mature plants except at a scale that is suited for this function. For example until germination has started, a misting system is not required, but a delivery system to feed the germ is essential; misting equipment is suitable in the interests of common component use, but simplified regulated drip systems to ensure that the substrate is suitably loaded with nutrient solution often serves as well at this germination stage. Similarly, light is not needed until a leaf structure begins to form, though there is no severe disadvantage to a germination phase sharing the lighting environment of a leafing plant so long as the roots are not exposed to the light.

Referring also to exemplary FIGS. 2C and 2D, nutrition for the crops, from seedlings or clones all the way to mature plants, is provided to the roots using a nutrient fog via, for example high pressure nozzles 274a and 274b. At this point, the support substrate begins to assume less importance as the plant becomes more self supporting and the transplanting of the seedling or clone is better served by using a clay ball structure to support the nascent plant. The leaf structure of the plant requires the provision of light and atmospheric gases to perform the action of photosynthesis. Nutrients and water absorbed into the root structures are moved by the plant to the leaf structures for photosynthesis to occur and the plant uses atmospheric $CO_2$ coupled with radiant energy (light) in order to complete this action. In the exchange, the plants yield oxygen, $O_2$, and transpire a significant amount of water. The $O_2$ changes the composition of the atmosphere and the water evaporates and increases the humidity of the atmosphere. To achieve economic advantage, which normally means rapid growth of the crop, optimal conditions will be required and this includes constant monitoring and control of the nutritional soup that is delivered as well as accurate lighting intensity and frequency (color) coupled with atmospheric composition and humidity control.

Turning first to the nutrient delivery and control system consider the system of FIGS. 4A-I-4A-II which illustrate a typical delivery system 400. This comprises several inter-related systems and is broken out as separate FIGS. 4B-E for clarity. Note that FIGS. 4A-I-4A-II show two, more-or-less duplicated functional blocks as the second and third system lines in the lower half of the Figure. Only one of these will be addressed because the same explanation applies to systems where there are many replications of this delivery function.

A key objective of a delivery system 400 that incorporates an atomizing system to produce a fog or mist is high cleanliness and, ideally, zero particulate content. Note that the terms mist and fog can be considered synonymous for the purposes of this description; there is no necessarily definitive distinction in this context since both comprise droplets in suspension that are too small to fall under gravity and the opacity of the mix is irrelevant here. Key to successful atomization is sufficient operating pressure to project the solution at sufficient velocity so that the formation of droplets as a result of surface tension of the liquid is limited to a small size. Typical droplet sizes in a fog range between about 8 µm and 14 µm and two factors that determine the result are the applied pressure and the size of the atomization nozzle. A complicating factor is that a minimum supply volume is also required to satisfy the needs of the crop. In order to achieve a balance between cost and performance, practical sizing of pumps and nozzles determines ultimately the best combination.

Figure 4B:
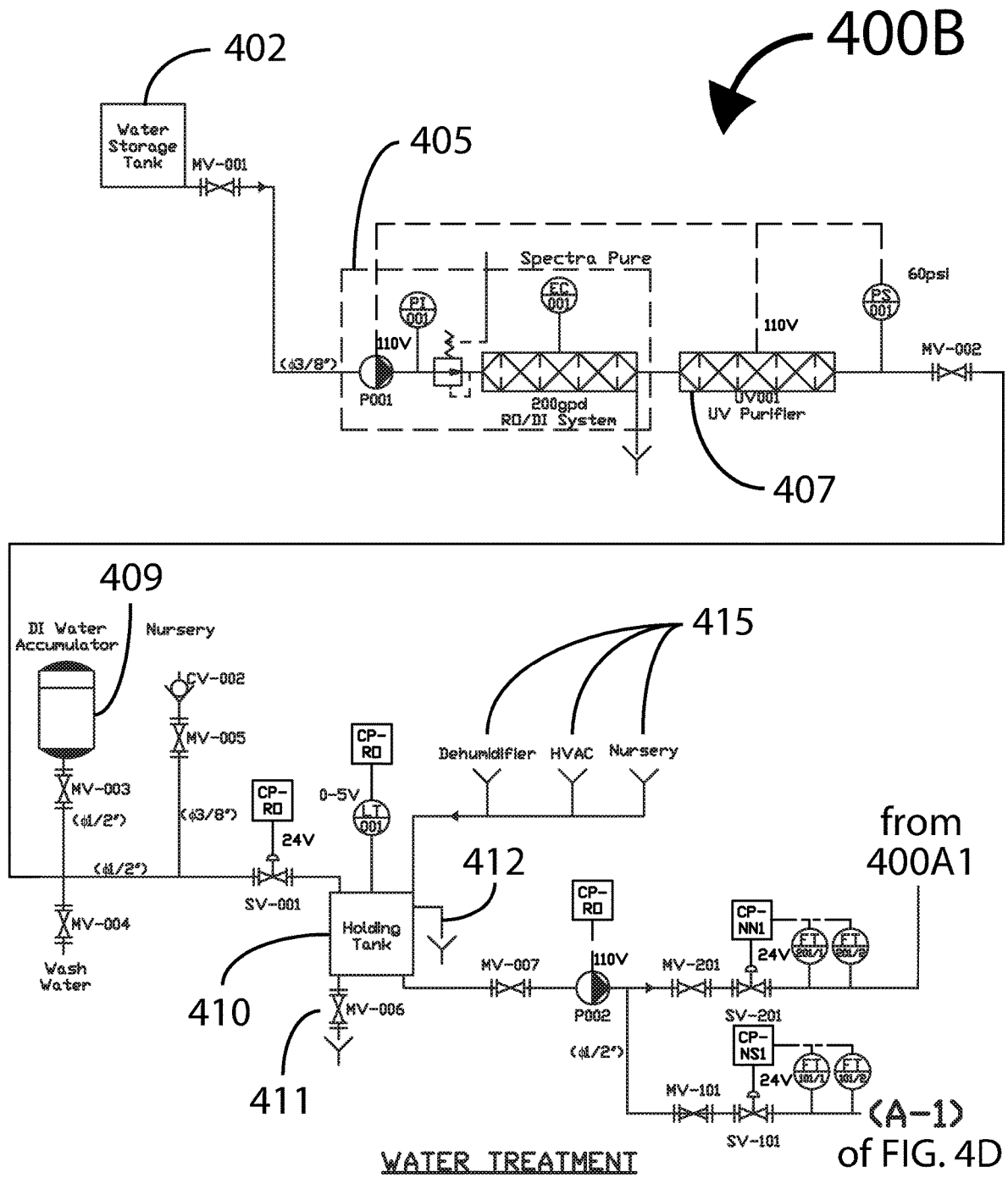

FIG. 4B shows the water processing component of the system that has to deliver a supply of clean water, free from particulates, ionic solutes and bacterial contamination. This is considered to be very close to or equal to laboratory grade clean water. Water is taken from a storage tank 402 that accumulates water from any of several sources and provided to an initial processing system 405 and 407. The supply flow can be controlled by a valve connected to the storage tank at an outlet location. The entire system is carefully controlled to conserve water by avoiding unnecessary waste or loss and in consequence the need for make-up water to account for losses is not great. This means that the system 400 can be almost entirely self-contained and can operate using any of a number of external sources for water, including water vapor recovered from external atmospheric air, condensation or rainwater as the make-up quantity.

Water from the storage tank 402 is passed to a reverse osmosis and de-ionizer (RO/DI) 405 system such as that commercially available for laboratory use. This system can incorporate a pump to ensure constant pressure for the osmotic function as well as sensors to measure conductivity to ensure the removal of ionic contaminants to a predetermined level. Not shown are screens and particulate filters that are used to remove any large debris from the water entering the storage tank and basic filtration needed to restrict the particle to sizes that will not damage the pump mechanism for the first stage of purification. RO/DI systems are normally equipped with internal filtration equipment following an internal pressure control element. The output of the RO/DI system is, provisionally, very clean water except that these processes do not exclude bacteriophages. To exclude these, the output water is passed to a purifier 407 that subjects the fluid to very intense, high-energy ultra-violet UVC radiation in the neighborhood of 250 nm wavelength, which renders the vast majority of bacteriological contaminants inert, including most viruses.

It is important to understand that the water should already be clear and free of particulates for this UVC sterilization treatment to be effective since any shielding or shadowing due to particles risks survival and subsequent regrowth of bacteriological contaminants. The treated clean water can now be passed to a holding tank 410; an intermediating accumulator 409 can be used to help maintain a stable working pressure for the proper operation of the level control in the tank and suppression of "water hammer." An overflow drain 412 can be added as can a manually operated drain valve 411 for emptying the system for maintenance. The figure also indicates the presence of sensors and gauges for monitoring pressure conductivity and levels, as well as output flow transducers. By-product water from the growing chambers can be safely returned to this holding tank 410, since the plants are grown in an almost surgically clean environment and recovered water is screened and filtered to remove debris. The internal heating, ventilation and air conditioning (HVAC) system that is used to manage the system environment condenses water as part of the process and this is basically distilled water that can be returned 415. Similarly, the de-humidifier functionality is very similar, and can return what is effectively distilled water as well 415. The nursery delivers a nutrient solution in liquid form until the root system is developed to a point where a fog delivery system is feasible. This nutrient solution flows continually to ensure optimal nutrition of the germ and seedlings or clones and can be recaptured, cleaned and also returned 415 to the holding tank 410.

In some embodiments, only clean water is kept in the holding tank 410 and returned nursery solution is sequestered in a separate tank to be combined subsequently with the clean water for delivery into a nutrient mixing chamber. The contents of the holding tank can be transferred as needed to a mixing apparatus (or chamber) where nutrient material can be combined to produce the required nutrient solution. In one embodiment, delivery is made from a holding tank through a series of valves coupled to a pump into a mixing apparatus.

Prior to describing the mixing apparatus and delivery system, the nutrient handling can be considered first. Each nutrient compound is stored in a container separate from other compounds and isolated by a suitable choice of one or more valves and pumps For the purpose of simplicity, one-way delivery can be achieved using a non-return valve or a pump which incorporates such protection. Turning to FIGS. 4C-I-4CII, the repository 462 for a nutrient (a concentrate in liquid form) is connected to a pump 461 which feeds a manifold 463 having one or more outlet connections. In one embodiment, the pump is a metered apparatus that delivers a fixed volume comprising 50 µl of nutrient for each stroke of the pump. For less critical delivery of much larger volumes, a peristaltic pump can be used having a predetermined volume per discharge cycle. A feed 464 and 466 from the manifold is coupled to it using a valve which can be manually or remotely operated. Each feed is then routed to a mixing apparatus; so if a manifold has three outlet connections, each one operational, then each of those three outlets will feed one mixing apparatus. For this example, three mixing apparatuses implies three separate composite nutrient delivery processes. Delivery of any nutrient is made to only one mixing apparatus at a time as should be quite clear if accurate volumes are to be achieved; that is to say that if two or more mixing components are to be served, then delivery will be sequenced to each part by operating the delivery valves in an appropriate sequence. Valves should not be open simultaneously, but only one delivery destination is selected at a time.

This scheme where a nutrient repository feeds a pump thence flows via one or more valves to a mixing apparatus is repeated as many times as there are applicable nutrients. Repositories 480a through 480n exemplify this approach, feeding individual pumps coupled to manifolds thence via control valves to mixing apparatus connection points 472a through 472n for one delivery process and 474a through 474n for a second process. Nutrient control is a critical process and warrants extreme care with cleanliness and avoidance of mis-loading each nutrient container. The nutrient menu changes according to the crop, indeed even between species of a crop as well as the growth phase being nourished. It can be seen then that the nutrient supply component of this technology is potentially large with many nutrient formulations possible.

Nutrients can be pumped from the nutrient supply tanks using precision volume dispensing pumps. The solution level may be determined from the supplier's information, although in practice other values may prove more effective. This is a matter of experimentation with various crop to determine the most efficient use of the plant's ability to take up nutrition. In one embodiment a dilution ratio of 0.8 ml of nutrient for each nutrient for each gallon of water is used according to a determination that this was optimal for the particular crop. The pumps used dispensed twenty strokes of 0.05 ml (fifty microliters) per stroke, equivalent to 1 ml of nutrient, so the minimum amount of water was one and a quarter gallons (about 5 liters). To accommodate the need for enough solution in the preparation tank and to fill the distribution piping so that proper atomization was achieved at the nozzles, a preparation tank size of 10 liters was found to be adequate in normal conditions of use, including retrieving solution from the piping after the high pressure pump prior to flushing the system. One objective is to minimize the waste that occurs when unused solution must be flushed prior to beginning a new cycle that requires a different solution. It should be clear that the tank should be able to hold at least enough prepared solution to be able to fill the distribution piping and then supply the flow demand of the system taking into account the volume of returned, depleted solution. For a large system, the distribution piping capacity alone can easily exceed the small sized tank described for a small installation and this must be provided for.

In another embodiment, the tank size is determined by the known daily consumption of nutrient solution and results in the lowest wasted quantity of nutrients. In this case, the entire day's supply for 24 hours may be made up including the additional quantity to ensure that a continuous supply will be available.

The quality of the nutrient solution determines the point at which the existing supply should be drained and a fresh batch constituted. In a normal feeding routine, the pH of the solution increases, but the depletion of the nutrient component of the solution eventually occurs and when the pH trend reverses, then the solution is considered to have reached a terminal point and the process may then be terminated by draining the solution remaining and flushing the system with clean water before restarting the process with a fresh solution. In general, when the rate of change of pH approaches zero then this indicates that to the system that attention is required and that one or more administrative programs should be invoked to determine the condition of the nutrient solution and take appropriate, remedial action. In one embodiment, the electrical conductivity is measured and when this has increased by a factor of two, this may also be used as an indication that a solution refresh cycle should be performed. The variation in electrical conductivity has been found to be a surprisingly good indication of overfeeding or underfeeding of the plants and allows fine adjustment to be made that maintains an optimal point for a significant time. Measurement of the Calcium ion concentration in the nutrient supply can also be used; a trending increase in the concentration may be taken to indicate that the plants have no further need for calcium and its addition to the nutrient cycle deprecated.

The growth and bloom phases of plants nurtured according to the invention require different concentrations of nutrient to be supplied and so the careful monitoring of the attrition rate of the current solution may yield a good indication that the optimum performance point has changed and so may allow exceptionally quick response to minimize waste of both nutrient solution and growth time for a crop from seed to harvest.

Figure 4D:
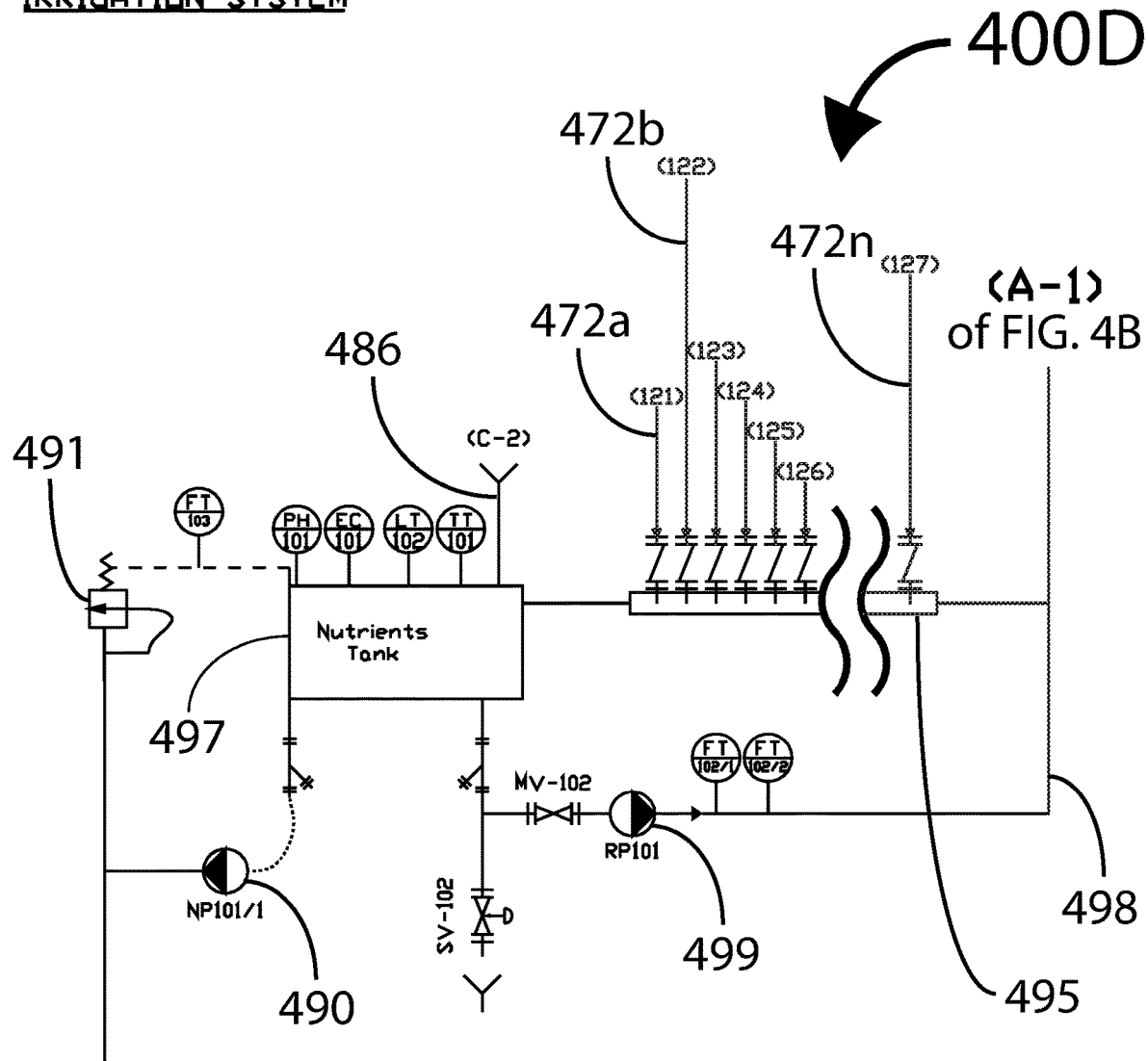
Figure 4D:
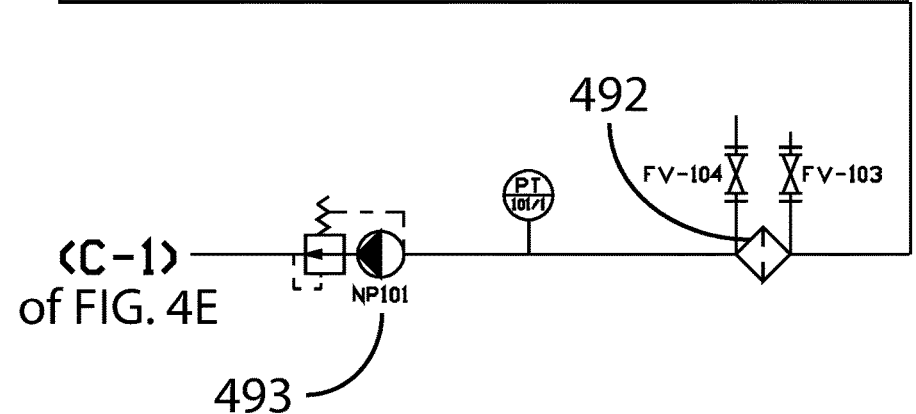

FIG. 4D illustrates the nutrient mixing apparatus that creates the deliverable solution to the plants via the fogging system. Basic operation provides clean water at 498 into the mixing manifold 495. Nutrients are injected at 472a through 472n and are intermixed using either a mechanical mixing action or by turbulent flow created by obstructions in the mixing manifold 495. The output of the mixing manifold 495 is directed into a holding tank 497 for the resulting nutrient solution. As a point of note, in some cases, the nutrient concentrates have to be mixed prior to the addition of water and in this case, the water supply 498 is halted, the nutrients are mixed and moved to the holding tank; typically this can be arranged to be a gravity feed so that the nutrient combination simply dribbles down through the mixing manifold, through a simple turbulator and then drips into the holding tank. Pump 499 can now be used to circulate the mixed concentrate through the manifold for improved mixing and then paused while water is added at 498.

Once the holding tank 497 has filled to a predetermined level, then the pump 499 can continue to circulate the water-nutrient mixture until a homogeneous solution is achieved. Sensors that record the pH value of the solution, the electrical conductivity and the temperature of the solution are coupled to a controller that determines which correction factors, if any, need to be applied and then supplements the tank contents appropriately. For example if the pH is high, it can be reduced by bubbling $CO_2$ into the solution using a simple bubbler that is not shown in this illustration. Conventionally, the electrical conductivity is used as a measure of the alkalinity of the solution and this should be modified first to reach the required value, after which the pH can be adjusted. Adjustment to the pH also has an effect on the alkalinity but this is not generally severe. Provision is made to drain the tank contents and the mixing apparatus can also be flushed, by adding only clean water and recirculating it, so that the mixing manifold can be flushed prior to a new nutrient protocol being applied.

A pump 490 moves liquid from the nutrient solution holding tank 497 through a flow measuring system 492 to a high pressure pump 493; in this example, pump 490 has an external pressure relief valve 491 shown, but it should be understood that pumps can be used where this relief valve is an internal feature of the pump, as seen at pump 493. In use, the booster or lift pump 490 primes the high pressure pump. Typical boost pressure are in the range of 10-60 psi, but the pressure must be maintained at the system flow rate to avoid surging and cavitation of the high pressure pump. To this effect, the boost pump is switched on and pressure rises to the point at which the bypass valve 491 opens and the resultant flow monitored by a flow transducer. This value must exceed a nominal predetermined minimum before the control system will allow the high pressure pump to be actuated. In one embodiment, the minimum flow rate at 30 psi of boost is set at 0.2 gallons per minute (approximately ¾ liter per minute). Pressure transducers can be used at various points in the system to monitor operating conditions and the alert operators if a fault condition occurs. Flow measurements can be made by measuring the pressure drop across a calibrated orifice 492 and once the high pressure pump is operational, this flow measurement can be used as an indication of system performance.

The high pressure pump feeds a distribution network of piping and atomization nozzles. Operating pressures in the neighborhood of 1,000 psi (more generally 800 psi to 1,500 psi) have been found to give good life and reliability of the pump and has not compromised the integrity of the nozzles. Using atomization nozzle (orifice) diameters between 8 and 20 mils (0.008" to 0.020") has been found to produce adequate droplet size to sustain a saturation level fog without undue coalescing of the stream to form a spray. It should be clear that pressure alone is not an adequate indicator of system health since clogged nozzles will cause a rise in pressure that may adversely affect the atomization performance of the remaining nozzles to the detriment of the crop. Because failure of either of the lift pump or the primary pump is potentially disastrous to the crop, in one embodiment a second auxiliary lift pump is provided arranged so that it is engaged if delivery pressure to the high pressure pump falls below a predetermined level. This engagement will trigger an alarm so that a maintenance inspection can be performed whilst the system continues to operate. Not shown on the illustration is the provision for check valves to prevent reverse flow through an inoperative pump. Too low a pressure from the high pressure pump will cause atomization to cease and a spray will be formed that may damage the root system of the crop. Pumps can be centrifugal, piston or diaphragm operated but it should be understood that they do have different operating characteristics. An overloaded pump may stop and in this case some provision must be made to prevent damage to the motor driving the pump. Magnetic couplings are commonplace in low pressure systems and shear pins or similar load relief devices are often used in high pressure components.

Figure 4E:
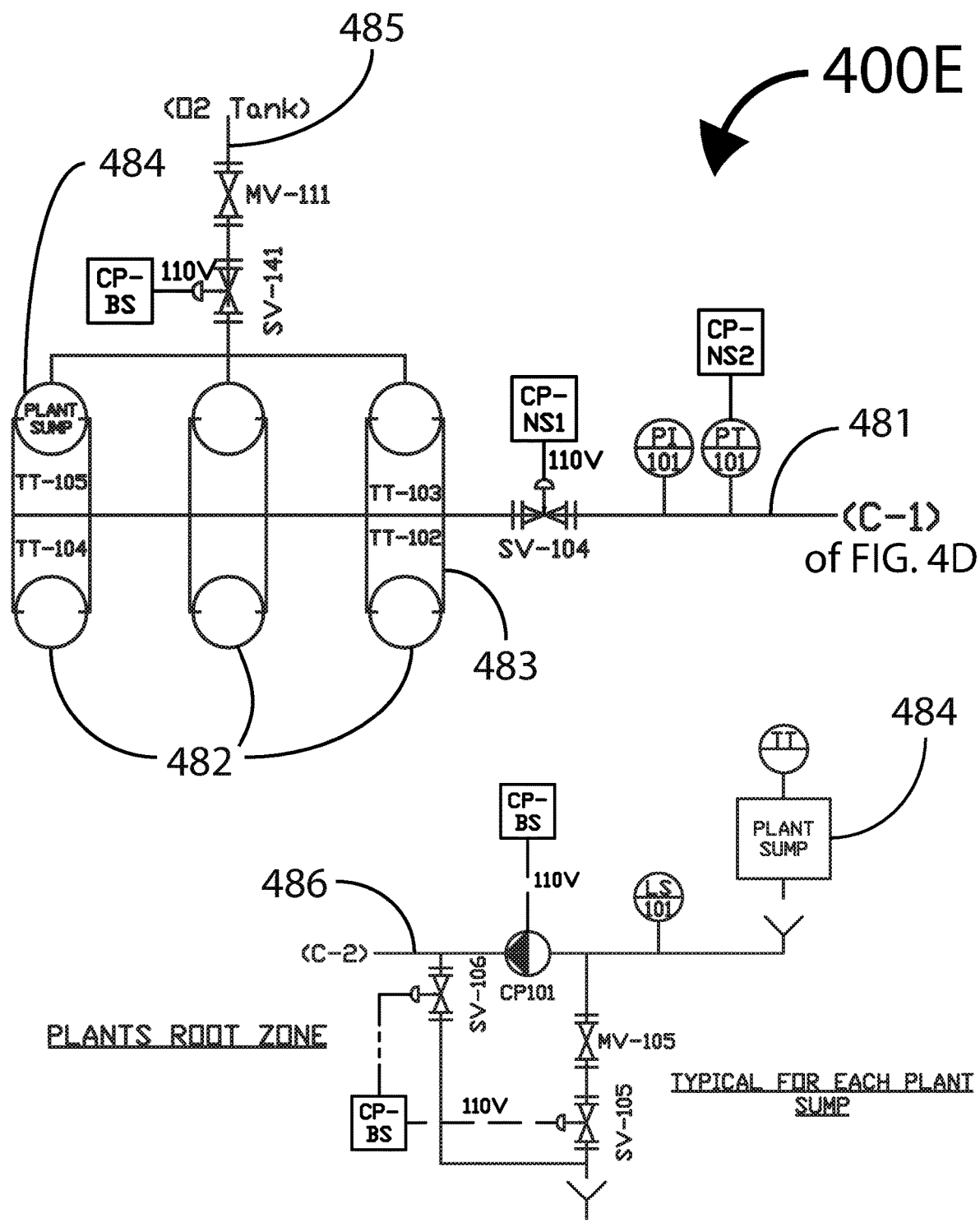

FIG. 4E shows the delivery and recovery functions at the root zone. High-pressure nutrient solution is delivered at 481 and routed to injection nozzles 483 positioned within the root containment areas 482. These nozzles are designed to atomize the nutrient solution yielding a droplet size typically between 8 μm and 14 μm, corresponding to the optimum droplet size for the roots to function as direct absorbers. Micro-droplets at this size do not fall under gravity but form a mist or fog. Droplets will coalesce at the roots when in excess and condense to form larger, heavier droplets that will then run off the roots as a surplus in liquid form. This run off is then collected in a sump 484 and can be pumped back to the nutrient solution holding tank 497 via piping 486. Provision can also be made to inject supplementary oxygen $O_2$ into the root zone.

In some embodiments, the spray nozzles produce a concentrated fog directly into the plant sump 484 to ensure that a scavenge pump stays primed. The recovered nutrient that is returned can be filtered or screened to reduce debris that is typically the result of root fiber detachment or exfoliation. Because the plant absorbs some of the nutrient as well as some of the water according to its needs and ability to process this, the recovered nutrient solution can be depleted in some nutrients and overly rich in others. The monitoring functions at the holding tank 497 provides information about the solution to a controlling computer that determines which nutrients need to be supplemented and then regenerates the solution to its correct condition.

Also, referring back to FIGS. 2C and 2D, with respect to the upper chamber where the leafing growth of the crop occurs, FIG. 2C shows leaf structures 292a and 294a along with lighting structure 250. In some embodiments as illustrated in FIG. 2D, a pair of interlocking barriers 272a and 272b are located between upper and lower chambers so that the root environment and the leaf environment can be separated as occurs in nature. Accordingly, the root balls are protected from light, the leaves can be provided with a $CO_2$ rich environment while they transpire water and oxygen, and the roots provided with nutrients, oxygen and liquid water.

Figure 5A:
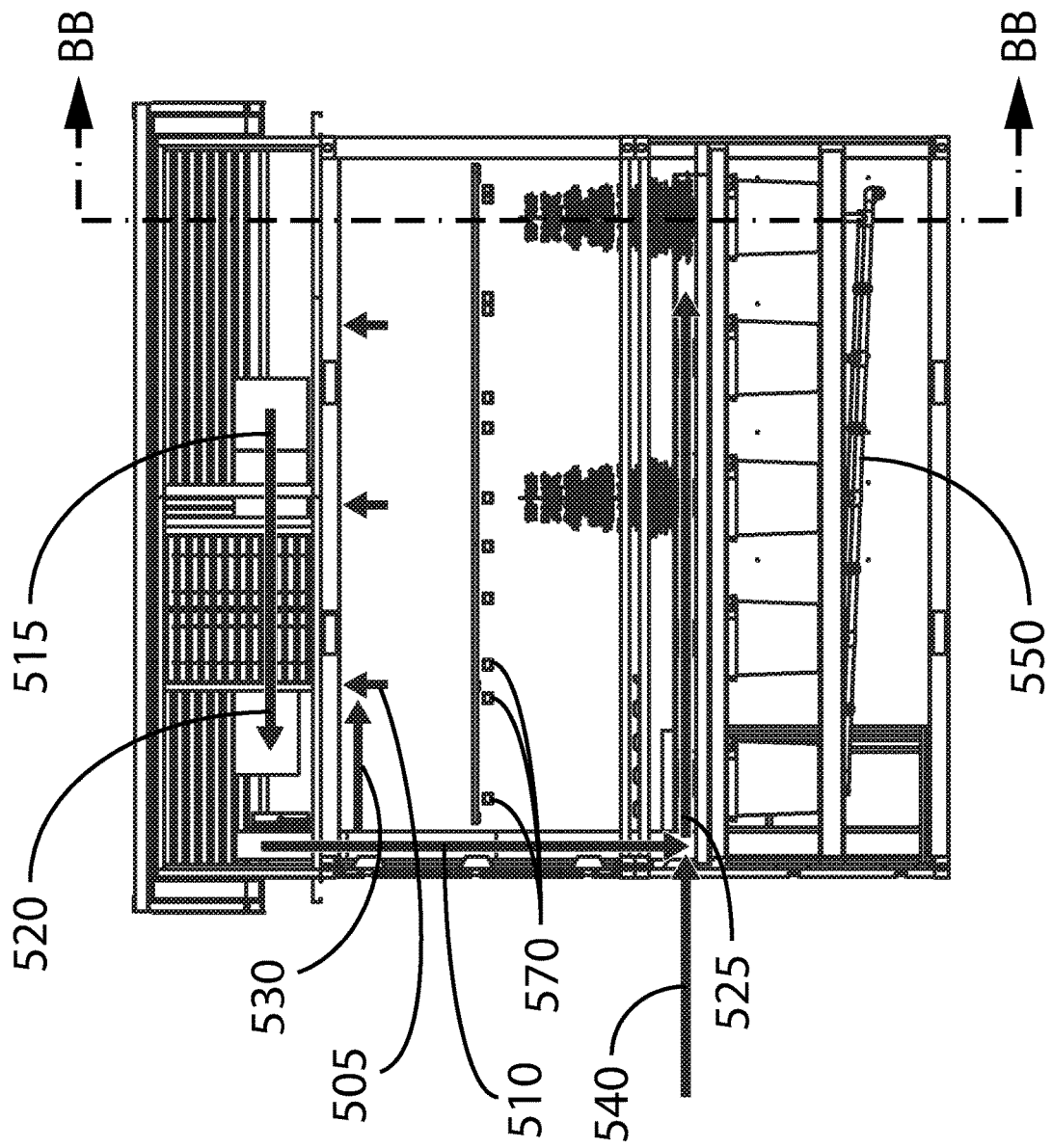
FIGS. 5A and 5B are cutaway views illustrating airflow in the leafy region for the growth system of FIG. 1A.
Figure 5B:
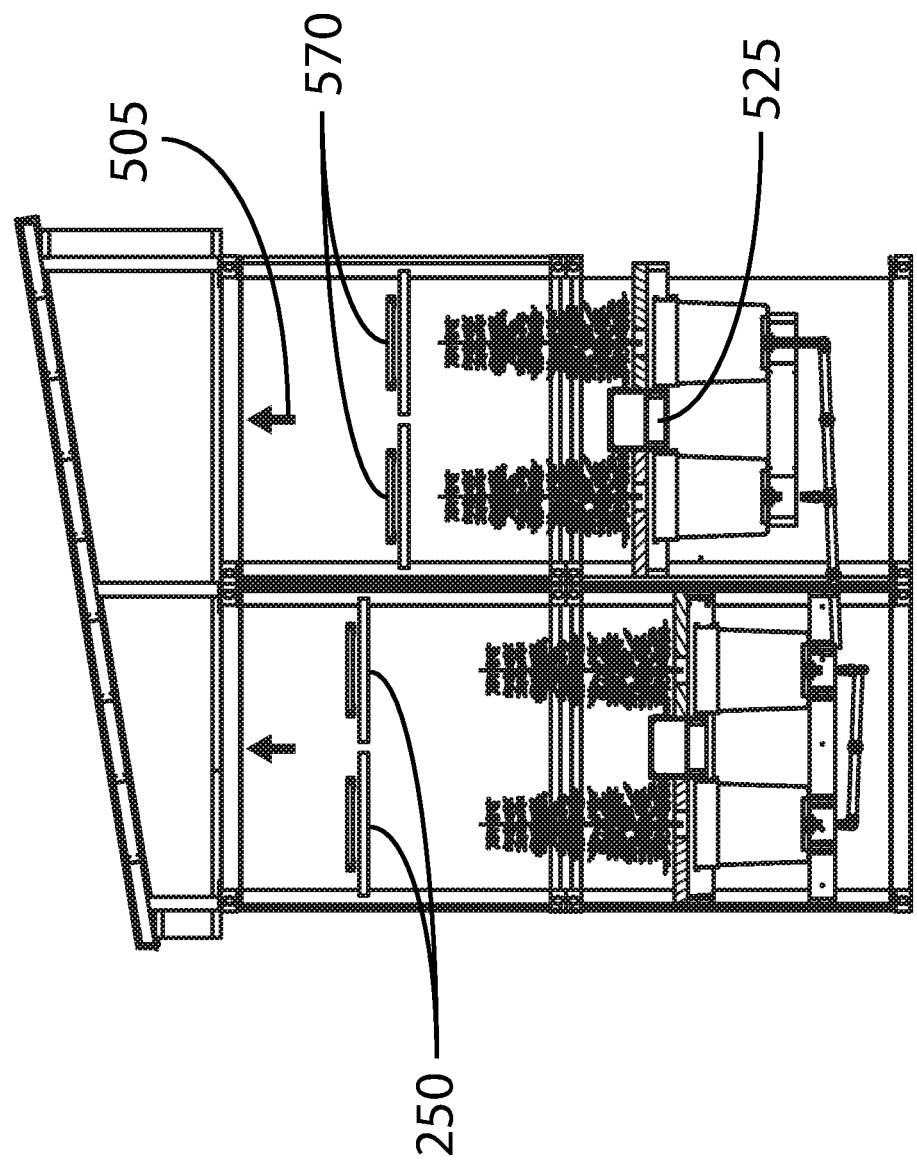

The management of the root system having been discussed at length, attention can now be turned to the environment management needed by the leaf structure elements of the plant and shown in FIGS. 5A and 5B. Because the leaves transpire water, the humidity in the upper chamber tends to increase. This can be controlled by altering the temperature in this upper chamber. Too cold and there will be significant condensation of liquid water and transpiration efficiency of the leaves will suffer. The leaves are also sensitive to draughts and rapid temperature changes so air circulation is carefully managed. Ducting can use fans to assist in moving warm air 505 from the top of the chamber, filtering and de-humidifying it using an HVAC system 515 and returning cooled and cleaned air 520 through ducts 510 to the base of the plant at 525 to replace the extracted air. The air temperature can be influenced by setting the flow rate, affecting the time that the air spends in the chilling heat exchanger, but enough time should be allowed to reduce the humidity of the air.

In some embodiments, the cooled air is vented 530 in part to the upper region of the chamber where it mixes with the warm air and a lesser amount is returned to the base of the leaf structures. This increases the humidity in the mixing zone as the air is cooled and therefore less time is needed in the heat exchanger for cooling to the dewpoint to significantly remove moisture. Further it reduces the volume of air returned to the base of the plant and this, in turn, reduces the flow rate of the air and hence the thermal shock to the leaves. The reduction in draughts and temperature differentials for the leaves that results from this method of managing airflow is found to be beneficial, allowing the plant to prosper. In one embodiment a target temperature range for the upper chamber is set to between 12° C. and 21° C. which has been found to be satisfactory.

Temperature in the root area is controlled in a different fashion. Because the air temperature directly affects humidity and the fogging performance, it is beneficial if this is maintained at an optimal value. Accordingly a heating scheme that circulates a temperature controlled solution through pipes wrapped around or built into the growth reservoirs. This latter heating scheme can be a sealed system and to protect against the risk of freezing when the system is inactive yet intended to operate in regions having extremely low temperatures, a mixture of water and glycol (antifreeze) is used, though other solutions having freeze resistant behavior can be substituted. Careful control of airflow mitigates condensation in the upper chamber and almost all of the water that is transpired can be recovered at the HVAC system drain (not shown) and returned to the clean water holding tank 410. The drain for moving the recovered condensed nutrient solution is shown at 550 and the condensation drain for the HVAC system is similar in style and can be routed conveniently. Gaseous $CO_2$ can be added to the airflow 540 so that the atmospheric conditions for the leaves can be optimized; this can be added anywhere in the ducting for the descending cool air and no special effort is required to mix it adequately. Typically a flow rate controller is used to feed simple nozzles and is added to maintain the concentration required. In one embodiment, the cool air flow rate is measured with a simple vane turbine and $CO_2$ is injected as a short pulse of gas whose injection duration is proportional to the flow rate. The $CO_2$ content can be measured at one or more points at the level of the lighting bars, just above the plant leaves and below the remixing zone where cool air 530 and warm air 505 are blended. If the CO2 level is low, a pulse of gas can be added to the cool air at 540.

Referring also to FIG. 2D which shows the general arrangement of the apparatus for producing and recovering the nutrient fog or mist and its condensate, the root structure 292c is, in general, partly contained by a housing, e.g., reservoir 282a, which can be any suitable shape and size, e.g., round, elliptical, oval, square, rectangular, or polygonal. One or more atomizing nozzles, e.g., nozzles 274a and 274b, can be inserted through cutouts made in the sides of the housing. These nozzles are supported by delivery piping (not shown) and do not need to be attached to the root housing. In use, the nutrient fog or mist produced by the nozzles can fully or partially fill the housing structure though it is beneficial if only sufficient volume to completely immerse the root structure is used. Condensed nutrient solution, where the micro-droplets have coalesced to form droplets that are large enough to fall under gravity falls to the base of the housing where the solution passes through a screen 262 through a drain outlet 264 and into a runoff duct 268 where it can be returned to the nutrient delivery system holding tank. In one embodiment a flow sensor is installed at the drainage point at the entry to the pipe connecting duct 268 so that each growth reservoir can be monitored separately; this aids in diagnosing which nozzles, if any, are blocked.

Usually a large tap root will be produced by the plant that will descend from the growth reservoir and a mass of root fibers will develop opportunistically, many outside the growth reservoir. It is not necessary to completely saturate the entire root structure with the nutrient fog since at least some of the condensed fog in liquid form will drip down these root components under gravity and achieve much the same effect in as much as nutrition and water will be available to these as well as their brethren within the growth reservoir.

As for all components that can be in contact with the nutrient solution and the atmosphere in the upper chamber, special attention should be paid to the materials used. Corrosion is undesirable so stainless steel hardware is desirable. Other materials can be used provided that a durable, passivating coating is applied. Teflon coatings are well understood as are powder coated paints, but high quality plastic components can also be suitable. Cleanliness approaching that of an operating theater is desirable and all surfaces should be able to withstand periodic treatment with strong disinfectants and fungicidal agents without deteriorating markedly. Being able to achieve this level of cleanliness can pay dividends in rapid growth of healthy crop. Note that clean room precautions are desirable for operation of this kind of facility.

As discussed above, FIGS. 4A-4E, which illustrates a typical water treatment and nutrient provisioning system 400, is littered with an array of sensors, valves and pumps. This implies that a commensurately complex control system will be required. Some elements can be operated using simple sequencing logic such as can be driven by a programmable logic controller (PLC), but many of the sensed pressures, temperatures and flows are continuously encoded. A PLC is intended for the most part to be interfaced to equipment having relatively simple on-off states and sometimes a small number of analog temperature sensing components. So although we can consider the overall system to be a colocation of several state machines, there are some parts that are not amenable to this kind of treatment if growth performance is to be maximized.

Figure 6A:
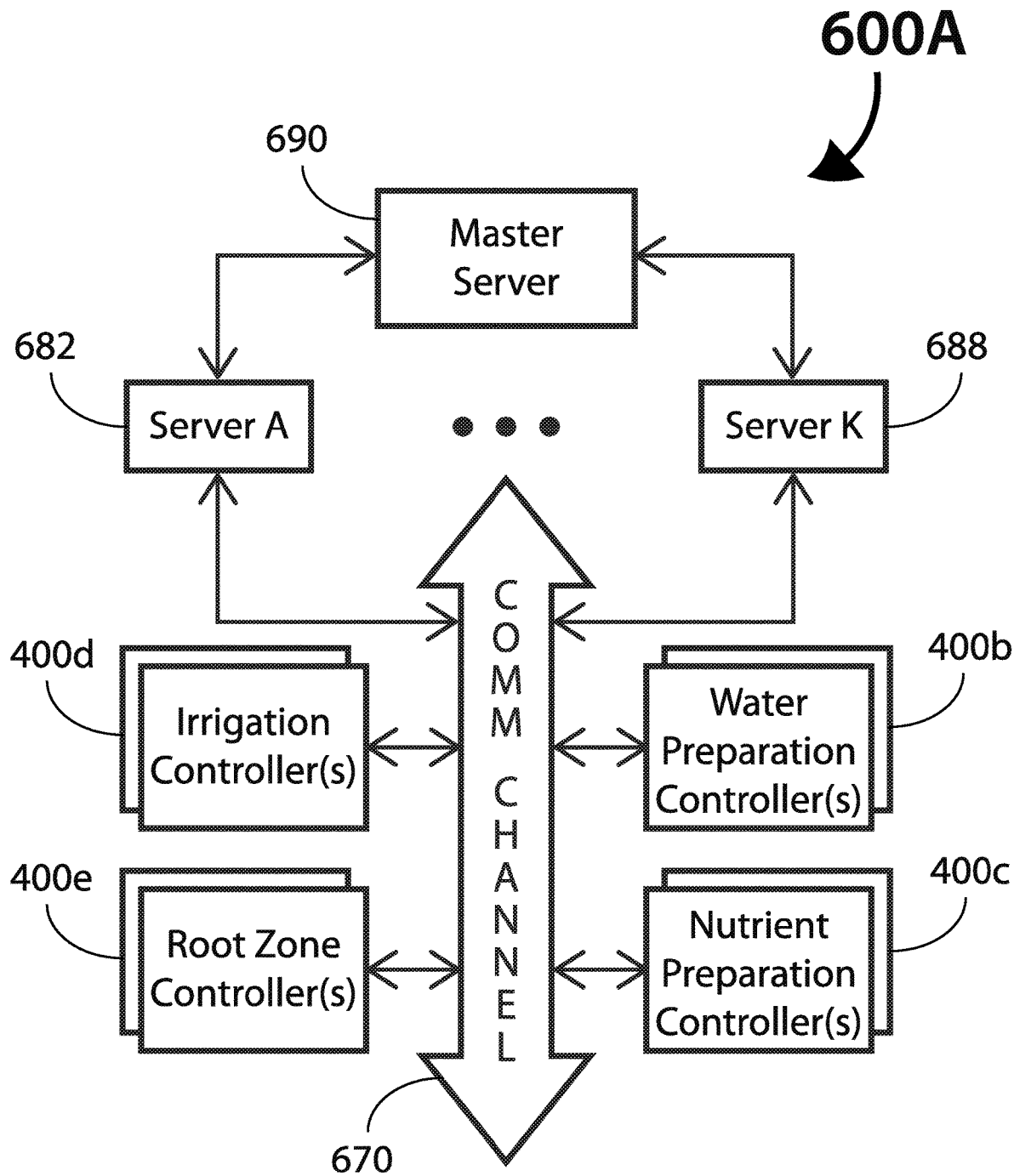
FIGS. 6A and 6B illustrate exemplary servers and a control system for the growth system of FIG. 1A.

FIG. 6A is a block diagram illustrating a fault-tolerant and scalable embodiment 600A for growth system 100. A master server 690 monitors the health of two or more redundant servers, e.g. server A 682 to server K 688, thereby ensuring that the growth system is reliable, which is to say that the system will continue to operate over extended periods of time without catastrophic failure and is able to endure events such as power disruptions and equipment failures. Master server 690 can be a general-purpose computer. Servers 690, 682 and 688 should be able to communicate independently and remotely with authorized growth management personnel over wide area network(s) (not shown).

A local secure communications channel 670 enables one or more computers or servers 682 . . . 688 to command and/or monitor water preparation controller(s) 400b, nutrient controller(s) 400c, irrigation controller(s) 400d and root zone controller(s) 400e (see also FIGS. 4B, 4C, 4D and 4E, respectively). Controllers 400b, 400c, 400d and 400e can be replicated so that multiple, scalable modular growth systems can be controlled by the same server, such as server 682, and limited only by the latencies implicit in the system and the storage constraints of the controlling computer or server.

In the event of a fault, the master server 690 can approximate a fault tolerant redundant system by switching control of the growth system between, for example, server A 682 and server K 688, when one of the servers 682 . . . 688 malfunctions, due to, for example, a hardware failure/glitch or a system software crash. Detection of the error condition can be achieved in any of the ways known in the art; a watchdog timer may be set and reset at regular intervals. Because the time constants of the growth system are computationally very long, in the order of seconds, containment is not considered to be at risk and recovery is at worst simply a reset sequence of the remote controllers followed by the issuance of resumption instructions. In general, component reliability in modern electronic equipment is exceptional and redundant systems may be used to alleviate many potentially catastrophic failure modes.

Figure 11A:
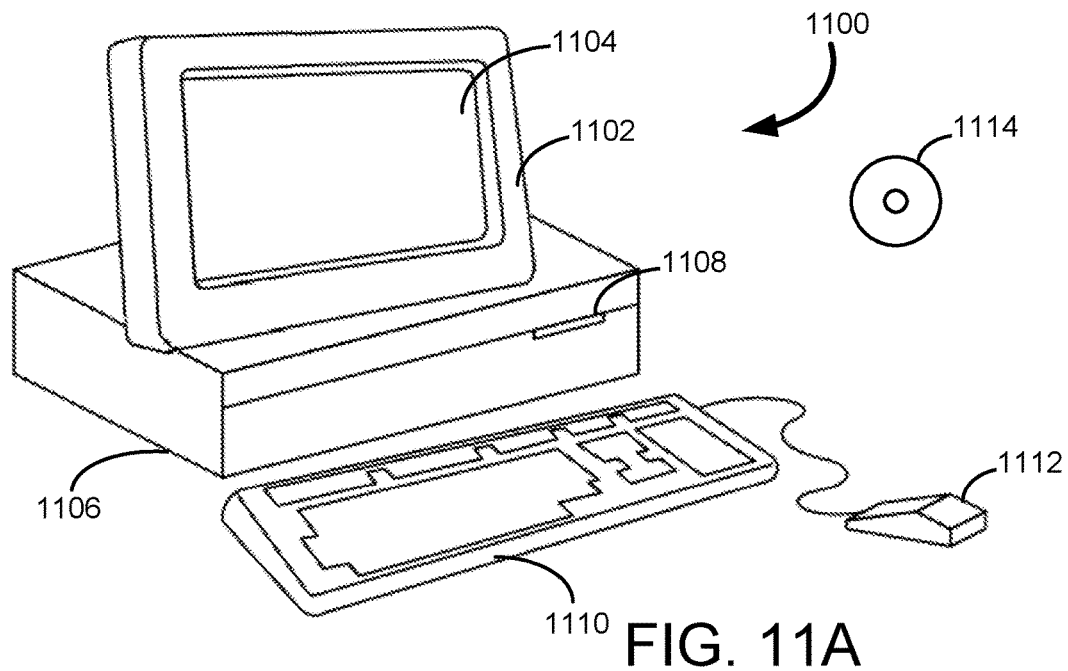
FIG. 11A shows an exemplary computerized workstation useful for implementing server(s) for the growth system of FIG. 1A.
Figure 11B:
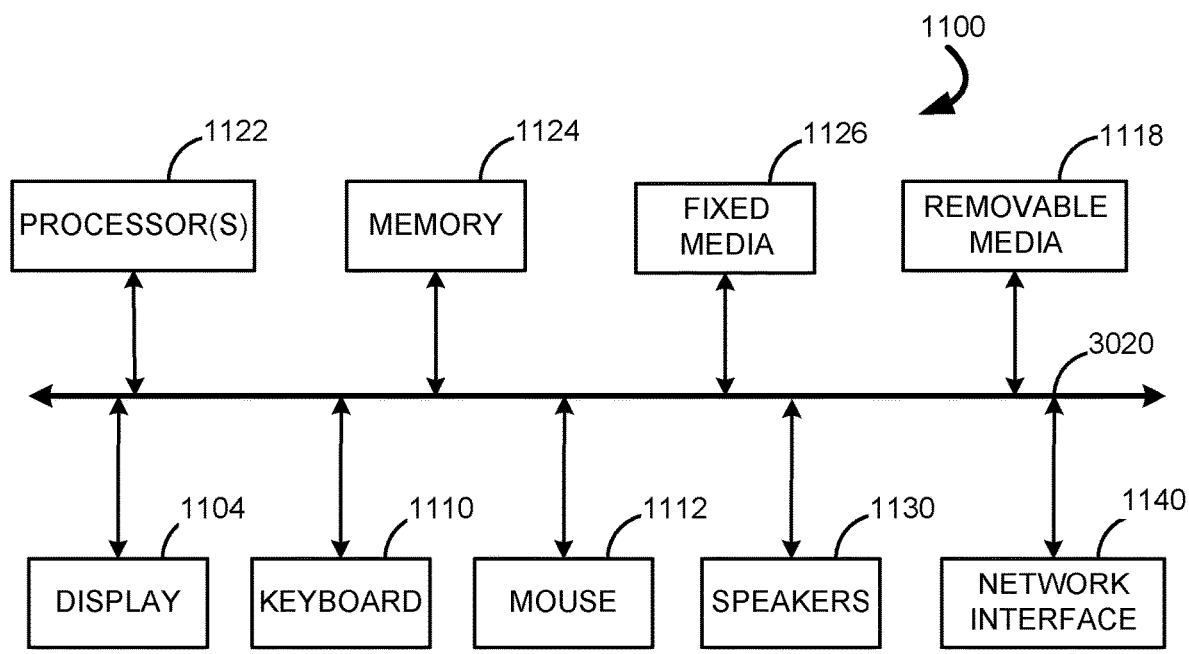
FIG. 11B shows the block diagram of the workstation of FIG. 11A.

To further facilitate this discussion of controlling the growth system 100, FIGS. 11A and 11B illustrate a Computer System 3000, which is suitable for implementing a master server 690, servers A-K 682 to 688 and/or remote communicators such as wireless link equipment for embodiments of the present invention. FIG. 11A shows one possible physical form of the Computer System 1100. Of course, the Computer System 1100 may have many physical forms ranging from a printed circuit board, an integrated circuit, and a small handheld device up to a huge super computer. Computer system 1100 may include a Monitor 1102, a Display 1104, a Housing 1106, a Disk Drive 1108, a Keyboard 1110, and a Mouse 1112. Disk 1114 is an exemplary computer-readable medium used to transfer data to and from Computer System 1100. More commonly, solid state memory in the form of plug in devices or wirelessly connected devices are also used.

FIG. 11B is an exemplary block diagram for Computer System 1100. Attached to System Bus 1120 are a wide variety of subsystems. Processor(s) 1122 (also referred to as central processing units, or CPUs) are coupled to storage devices, including Memory 1124. Memory 1124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Media 1126 may also be coupled bi-directionally to the Processor 1122; it provides additional data storage capacity and may also include any of the computer-readable media described below. Fixed Media 1126 may be used to store programs, data, and the like and is typically a secondary storage medium (such as a hard disk or solid state memory) that is slower and lower cost than primary storage. It will be appreciated that the information retained within Fixed Media 1126 may, in appropriate cases, be incorporated in standard fashion as virtual memory in Memory 1124. Removable Media 1118 may take the form of any of the computer-readable media described below.

Processor 1122 is also coupled to a variety of input/output devices, such as Display 1104, Keyboard 1110, Mouse 1112 and Speakers 1130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1122 optionally may be coupled to another computer or telecommunications network using Network Interface 1140. With such a Network Interface 1140, it is contemplated that the Processor 1122 might receive information from the network or might provide information to the network in the course of performing the above-described dynamic messaging processes. Furthermore, method embodiments of the present invention may execute solely upon Processor 1122 or may execute over a network such as the Internet in conjunction with a remote CPU that shares a portion of the processing.

The controlling program is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the computer system 1100 operates as a standalone device or may be connected (e.g., networked) to other machines. In a networked deployment, the machine may operate in the capacity of a server or a client machine in a client-server network environment or as a peer machine in a peer-to-peer (or distributed) network environment.

The computer system 1100 can be a server computer, a client computer, a virtual machine, a personal computer (PC), a tablet PC, a laptop computer, a set-top box (STB), a personal digital assistant (PDA), a cellular telephone, a smartphone, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Figure 6B:
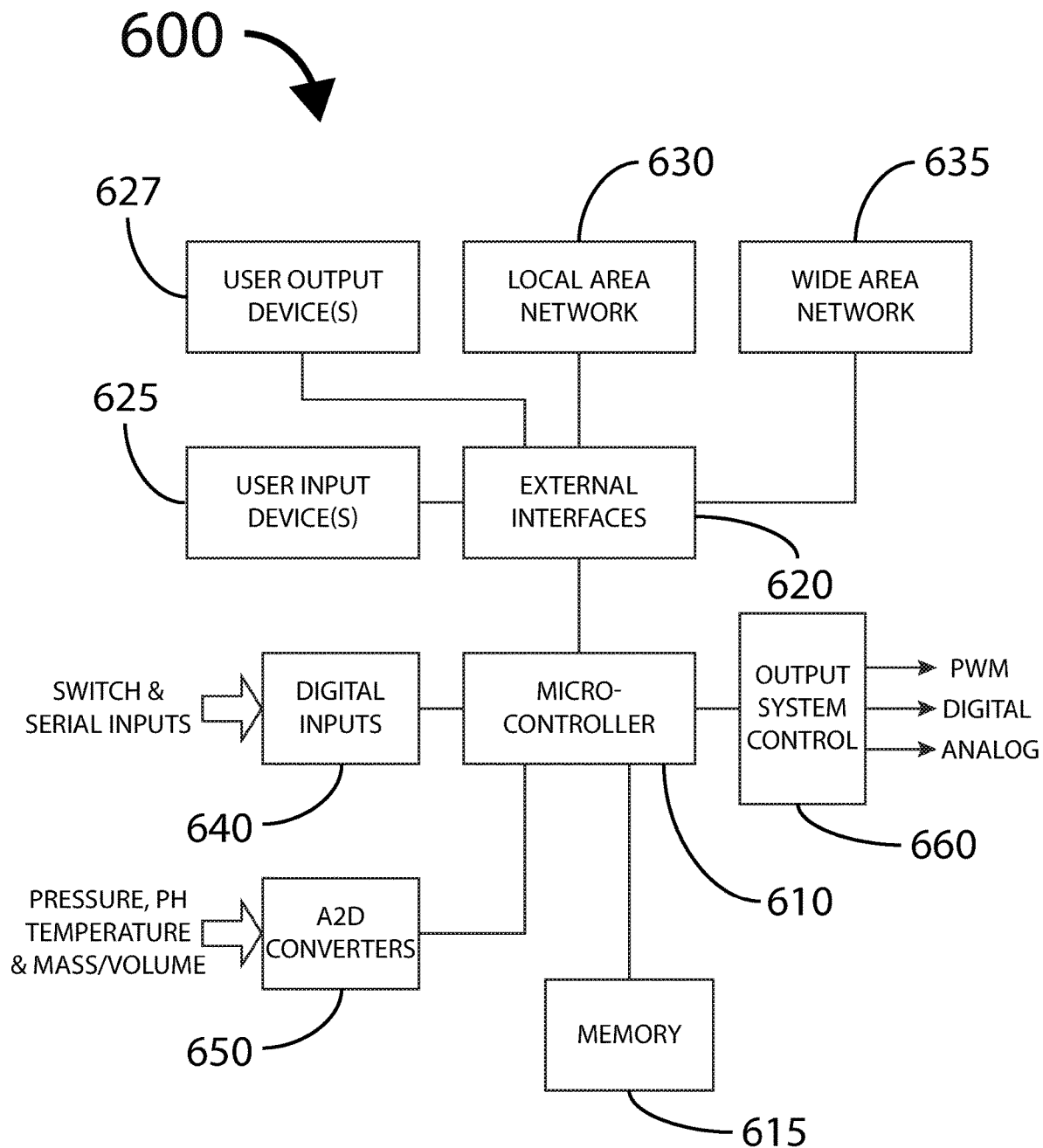

FIG. 6B is a block diagram illustrating an exemplary computerized control system 600B for implementing servers 682 . . . 688 of the growth system to provide the performance described herein. The heart of the control system 600A is a suitable processor 610, e.g., a microprocessor or a microcontroller, that has an associated memory 615 including operational instructions as well as temporary storage. This can be entirely implemented in one system packaged on a single semiconductor substrate or can be distributed. External interface connectivity 620 enables suitable user input device(s) 625 such as keyboards, touch pads/screens and/or joysticks, and output device(s) 627 such as display monitors to be coupled to allow interaction with the controller. Part of the external connectivity allows local wireless connections 630 such as WiFi or Bluetooth to be implemented that allows for a range of remote connection options locally, such as using an appliance to observe the local effects of changes made whilst the operator or supervisor is present at the area of concern. Provision can also be made for longer range connectivity 635, such as the internet, to allow data exchanges to take place so that information can be aggregated centrally on a server or data repository.

Information can be passed to the processor 610 for processing via signal processing circuits in either digital or analog form. Devices such as switches are generally contact closure events and individual digital inputs can record the switch position via digital input 640. Some connected appliances can offer their information as a digitized data stream, so that all the signal conditioning can be done internally at the device. Pressure sensors, for example can often be connected using one or more of the serial data protocols, e.g., as digitalized stream via inputs 640. Examples of these are I2C, SPI, serial RS232 or RS422, CANbus, 1-wire™, USB and so on. For the most part, the operation of the overall system 600B can be relatively slow, having time constants in the few hundreds of milliseconds so the key to data communications from sensors to the processor 610 can be robustness, not raw speed. Some digital inputs are time related so that if rotational speed is being measured directly, the time between pulses can be an aspect of the requirements for the digital input circuit 640. Certain sensors can provide an analog voltage or current as a measure of the sensed value. For example, position sensors usually provide a voltage that is proportional to their displacement so that the percentage opening of valves or vents can be ascertained; temperature sensors are often implemented using thermistors, components whose resistance changes with temperature and when incorporated in a suitable measuring circuit, produce a voltage that is proportional to temperature.

Pressure sensors can be implemented having either voltage levels as their outputs or current levels when used as a current loop; there are several standards, but a 4-20 mA loop is commonplace; this allows surprisingly long distances between sensors and their receivers to be used with simple wire pairs. Mass, flow and volume sensors can also be required as part of any analytical installation such as this system for controlling airflow in the ducts and when nutrient quantities are managed. Electrical conductivity is another relevant measure as is the measurement and control of pH, which is a measure of the acidity or alkalinity of the nutrient solution. Gas sensing can be done for $O_2$, $CO_2$ and other gases as required. In general, an analog to digital converter(s) 650 allows analog quantities to be converted into a data form usable by the microcontroller.

Control outputs 660 drive components such as electric motors or relays or indicators. Outputs are generally digital, On or Off, for indicator lights, heaters and cooling equipment; Analog outputs can be used to drive meters that display some of the system parameters that are easily discernible by an operator for a quick evaluation of the system condition without requiring sophisticated equipment. Electric motors can be turned on by switch action or else can be controlled by a variable speed function and a pulse width modulated (PWM) output can be made available for this aspect of control.

The controlling programs useful for embodiments in accordance to this invention comprise a number of loops as well as individual subroutines that deal with particular aspects. Although the system operates in real time, the time constants are generally quite long. This means that, except for emergency conditions, simple scheduling can be used for many functions. Distribution of tasks to semi-autonomous remote controllers is also a simple solution for many of the tasks; for example, in the delivery system that provides the nutrient fog for the roots, a pump is used and the output pressure is controlled by altering the speed of the pump. This can be achieved by using a variable speed drive to the pump motor and then using a control loop to manage the pressure. If the pressure rises, then the pump rate can be reduced. If the pressure drops, then the pump rate can be increased. Because the system is characterized, flow rate of the nutrient solution into the pump can be used in conjunction with pressure from the pump to infer operational conditions so that a blocked spray nozzle can be detected, for example. Similarly a low pressure with high delivery rate can be used to infer that a leak has occurred.

In practice, many of the functions can be performed using freely available commercial components and sub-assemblies. The choice of programming language is mostly dictated by the tool choices of the implementers; for example if the Arduino™ series of development boards are used, then the language will be very much like the C programming language. Other development boards can use Operating Systems and Java-like languages or even scripts.

Figure 7:
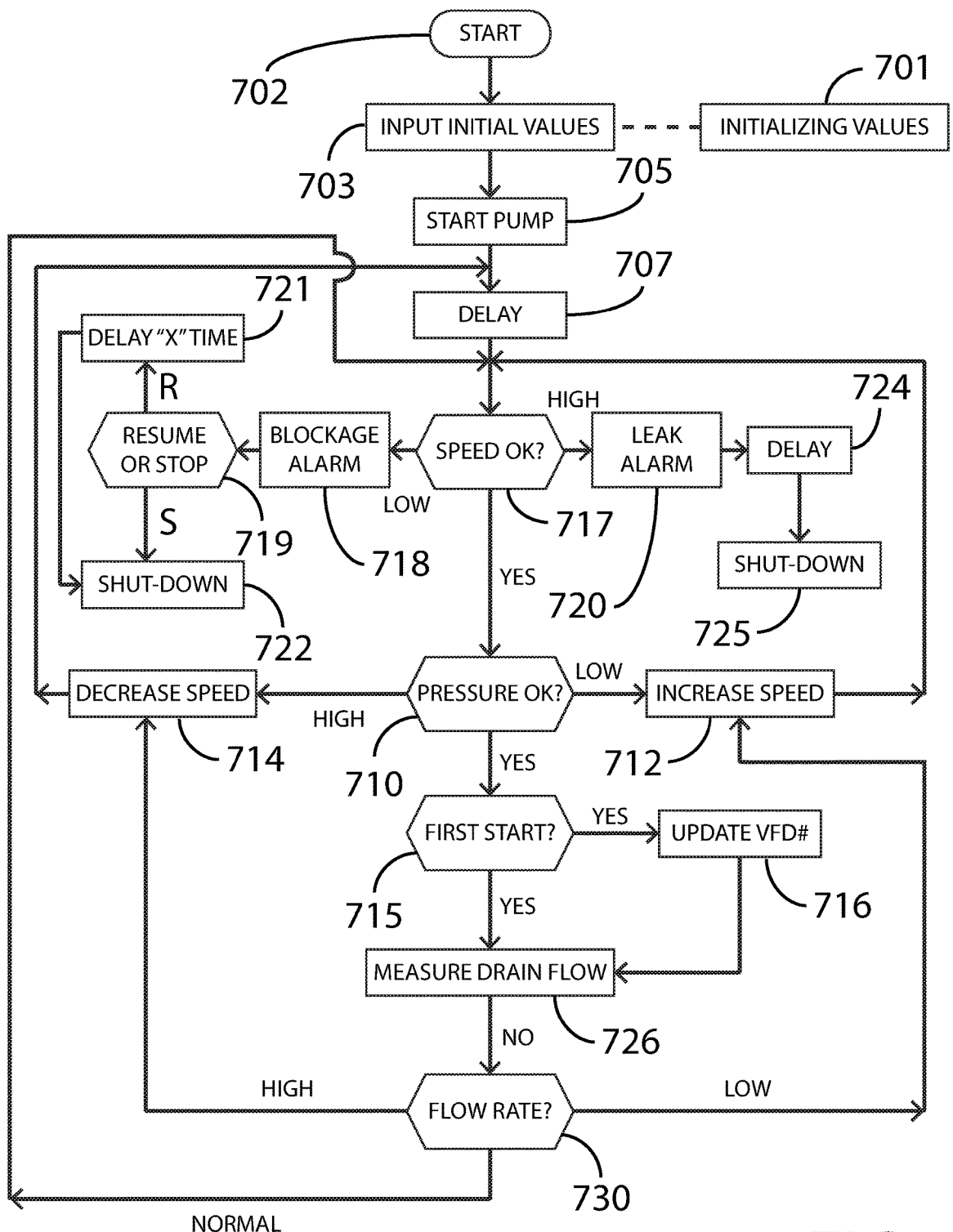
FIG. 7 is a flow diagram depicting an exemplary control protocol executing in the control system of FIG. 6.

FIG. 7 shows an example of a typical routine used to operate fogging or misting pump and atomization nozzles for some embodiments of growth systems, e.g., system 100, in accordance with the present invention. At the time of software and/or firmware installation, initial values 701 are stored in memory so that the system has an expected set of start values. If this is not done, then the first start can be haphazard and can take a considerable time to settle into normal operation. After the Start 702 of the program, the initialization values 703 are read and then the high-pressure fogging pump 705 can be started; this is a simplified example for ease of understanding and there are other conditions that dictate when the high pressure pump can actually be started. It will be recalled from FIGS. 4C-I-4CII and 4D that the pump 493 feeds high pressure nutrient solution to an array of nozzles 482 which atomize the solution, thus producing a fog or mist of the solution. The microscopic droplets are too small to fall under gravity but when they encounter structures such as the target root structure, that allows the droplets to condense, the droplets can coalesce and a substantial amount simply drips downwards where it is recovered by a drain system. The roots absorb some of the suspended nutrient solution according to the needs of the plant.

Once the pump starts, a small delay 707 is introduced to allow it to reach its initial working speed. After this delay, a check should be made on the pump motor speed 717 to ensure that it lies within an acceptable working range, since gross speed errors indicate a fault condition that can harm the pump or the drive motor or other system components. Alarm indications can be used to alert operators.

If the speed is high, an alarm 720 can be set that suggests a leak; the leak can be small so that the pressure is still attainable but at either a greatly increased delivery volume or as a result of diminished pump performance. Following a brief delay period 724 that allows an operator to intervene if needed, the system progresses to an orderly shutdown 725 of the irrigation system. A leak condition can lead to minor flooding of the system at any point in the pipe run from the pump to the atomization nozzles.

If the pump motor speed is low, the delivered volume will have reduced yet maintain normal pressure, which implies that one or more nozzles can be blocked. This in itself is unlikely to require an urgent response but an alarm 718 can be set and a decision 719 required from an operator whether to continue or shut down 722. In the case where an operator is unresponsive, after a predetermined time 721 the shutdown 722 occurs.

After sensing that the pump speed is within the expected normal range, pressure is measured by pressure transducers and a determination 710 is made based on this pressure. The notional pressure is a characteristic of the atomization nozzles which have a range of pressures at which they will properly atomize the liquid being pumped. If the pressure is too low, then the electronics (a Variable Frequency Drive is used in one embodiment) that control the motor are instructed to increase the speed 712 of the motor to deliver a larger volume of liquid, which will result in a pressure increase. If the pressure is within its predetermined limits, and this is the first time that the system has been started 715, the initial set point of the Variable Frequency Drive that controls motor speed is updated 716 to the current value so that future starts will produce a speed that is known to be correct. If the working pressure does not stabilize in the expected range, then this update will not happen, because there will be a fault condition.

Drain activity should be monitored to maintain system equilibrium and can also function as one of several metrics for performance measurement. For example, the volume or flow rate of recovered solution can be measured 726 and this should be slightly less than the delivered volume from the high-pressure pump; the actual amount will be slightly less due to that absorbed by the plants and evaporative leakage into the upper growth chamber. Provided that the humidity in the root region remains near 100% and fogging is effective, then the drainage amount can be made very small by reducing the delivered volume. In practice this volume will be achieved by proper selection of the atomization nozzles.

In this example, the flow rate 730 in the drainage system can be used as a reliable indicator that operation of system 100 is efficient since a small to moderate drainage rate implies that most of the delivered fog is being absorbed by the roots. The simplified control loop of FIG. 7 as shown does not end automatically though this can be achieved manually, by commanding a shutdown or by the use of a timer or a combination of sensor readings that indicate that a change is needed, thus invoking a shutdown. For example, in one embodiment, a rapid change in transpiration rate is used to signify the next stage of growth and this indicates that a new nutrient regime should be started.

Figure 8:
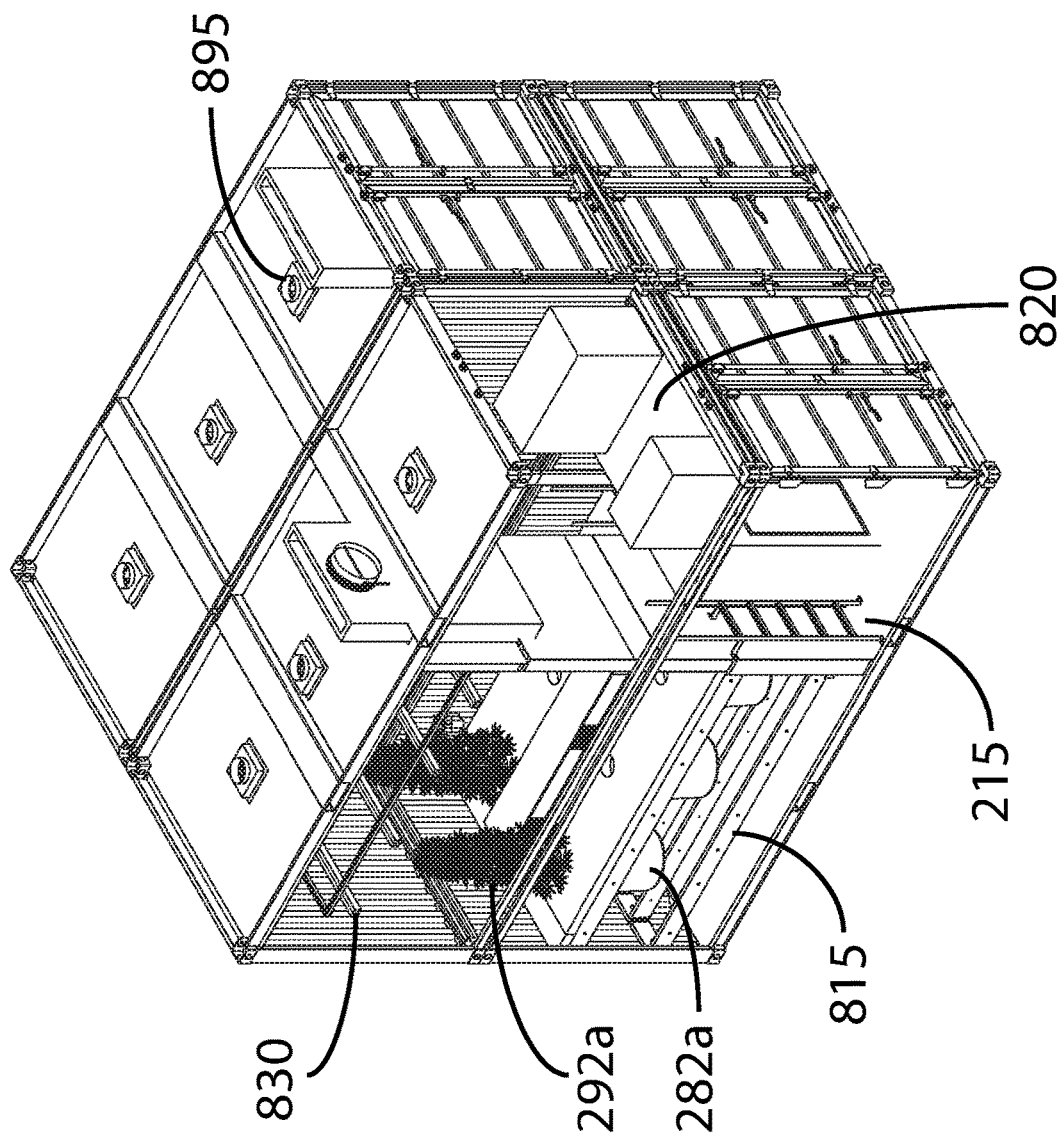
FIG. 8 is yet another perspective cutaway view illustrating ventilation for the growth system of FIG. 1A.

FIG. 8 shows a perspective cutaway view for ease of understanding the general arrangement of a functional system for some embodiments in accordance the invention. Here we can note the leaf section 292a of a crop. The housings for the root structures at 282a are supported by the raised basement floor at 815 and access to the control room 820 is via the ladder 215. In this view, fans or vents are shown at 895 and light bars are seen at 830. The HVAC equipment is installed on this primary structure roof area along with the requisite ducting and maintenance access.

Figure 9:
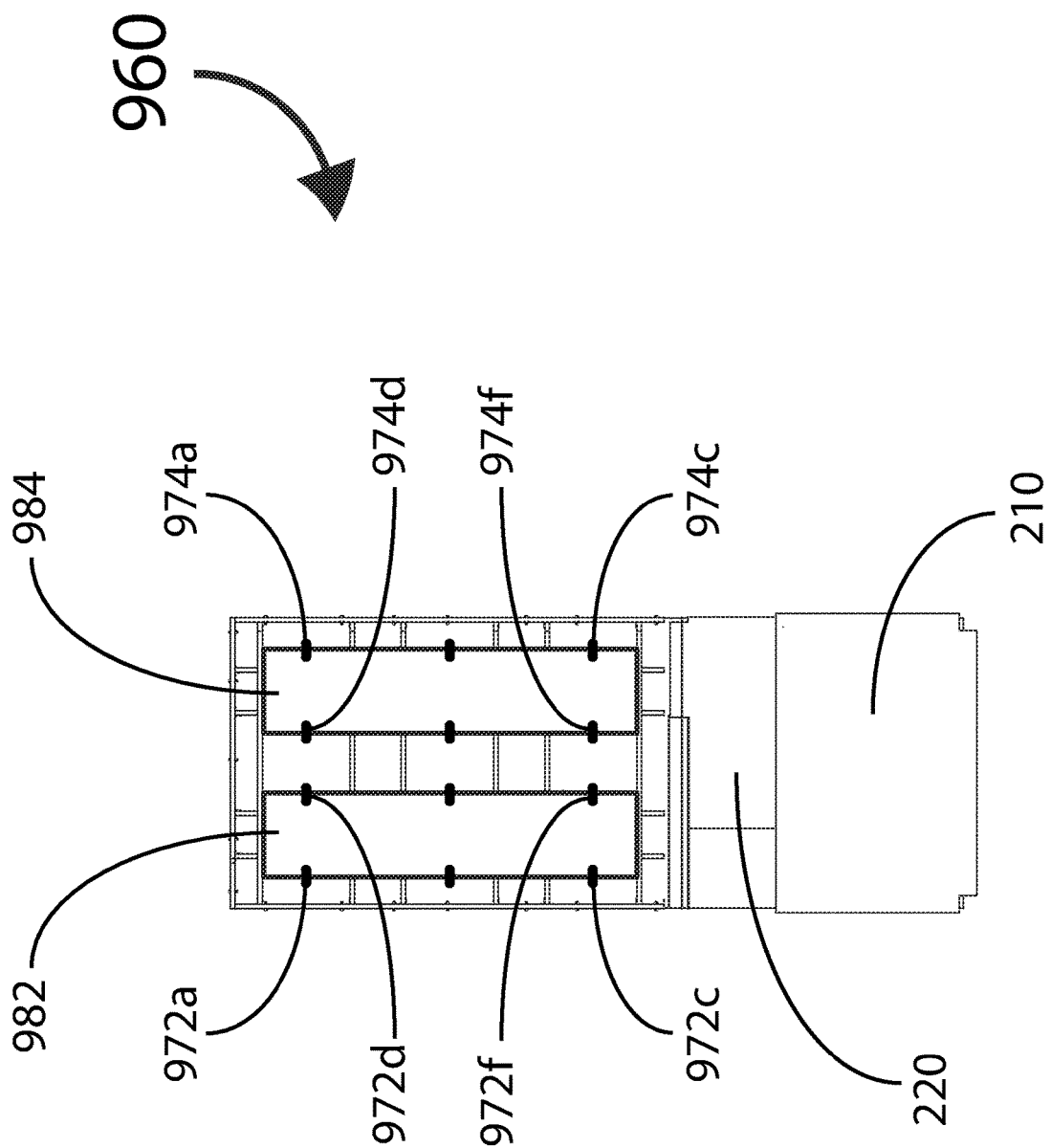
FIG. 9 is a top view of another embodiment of a growth system in accordance with the present invention.

Many modifications and additions to the above described embodiments are contemplated within the spirit of the present invention. For example, FIG. 9 depicts a partial top view of another embodiment of a growth system 960 incorporating one or more rectangular grow troughs 982 and 984 instead of round grow reservoirs. Each rectangular trough includes a plurality of nozzles, e.g., nozzles 972a . . . 982f, 974a . . . 974f, arranged strategically along the respective sides of the grow troughs 982 and 984.

Figure 10:
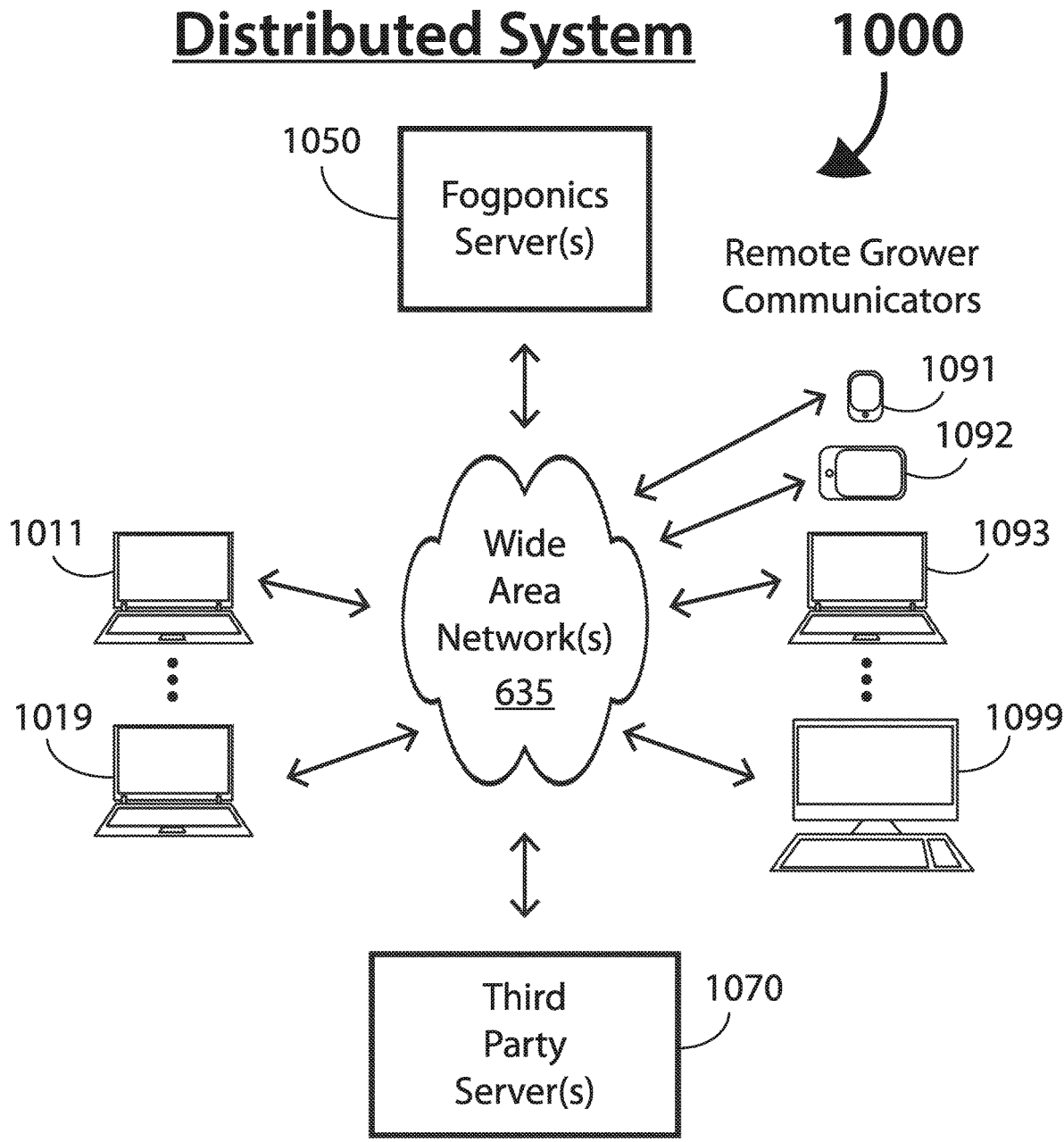
FIG. 10 is a block diagram depicting an exemplary plurality of distributed growth systems in accordance with the present invention.

FIG. 10 is a block diagram illustrating a distributed system 1000 with a plurality of remote grower communicators 1091 . . . 1099 remotely controlling and monitoring a plurality of growth control systems 1011 . . . 1019 (each similar to servers 682 and 688 described above) via wide area network(s) 635. Fogponics redundant server(s) 1050 can provide initial or ongoing advisory and/or management services remotely, such as growth nutrients recipes and control algorithms. Optionally, third party server(s) 1070, such as weather reporting services or security contractors, may be accessible via wide area network 635. Examples of suitable platforms for implementing remote grower communicators 1091 . . . 1099 include smart phones, iPad, laptops and/or can also be one or more general purpose computers 3000 described above.

Figure 12A:
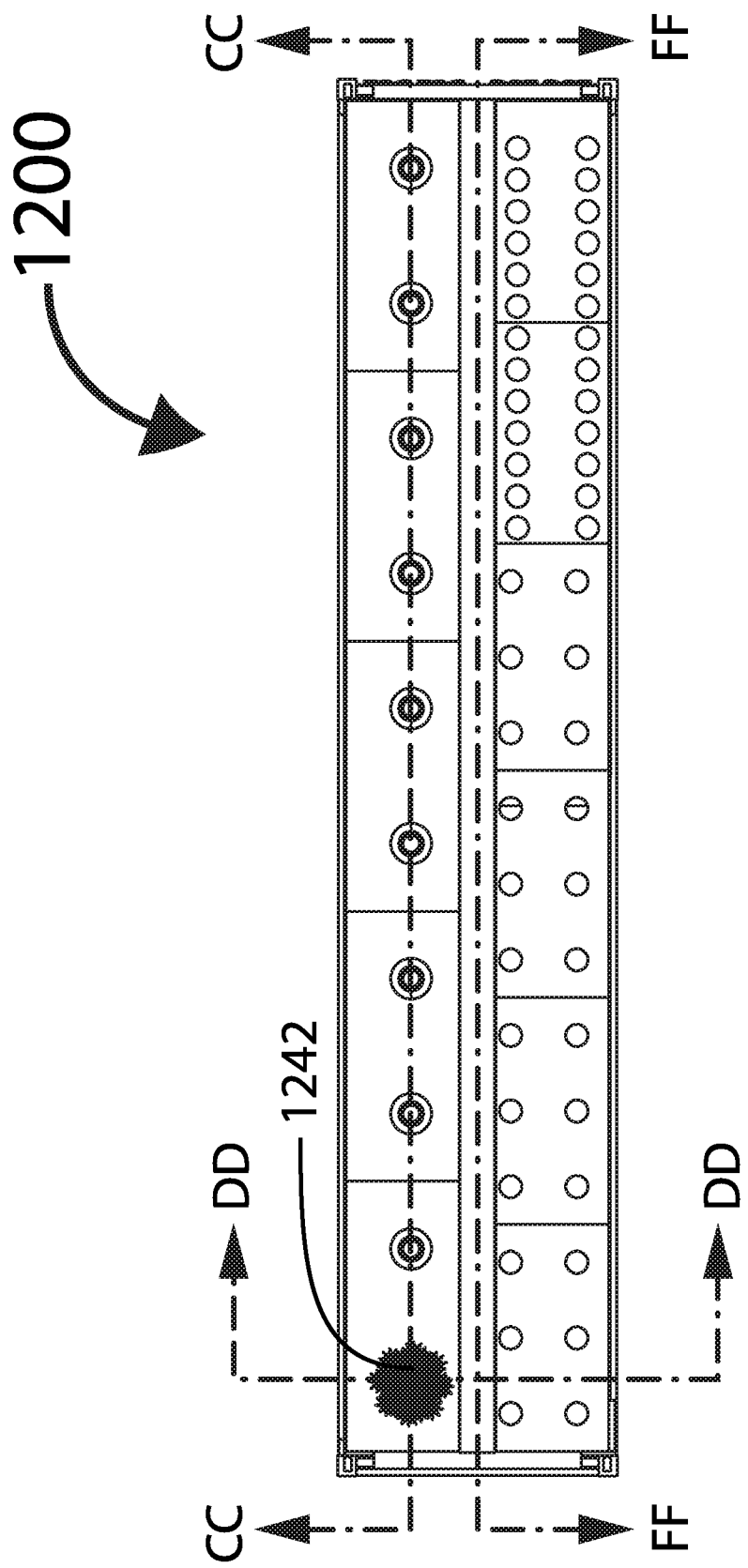
FIGS. 12A through 12E illustrate an exemplary integrated growth system detail underpinning the growth cycles from nursery to fully bloomed crop.
Figure 12B:
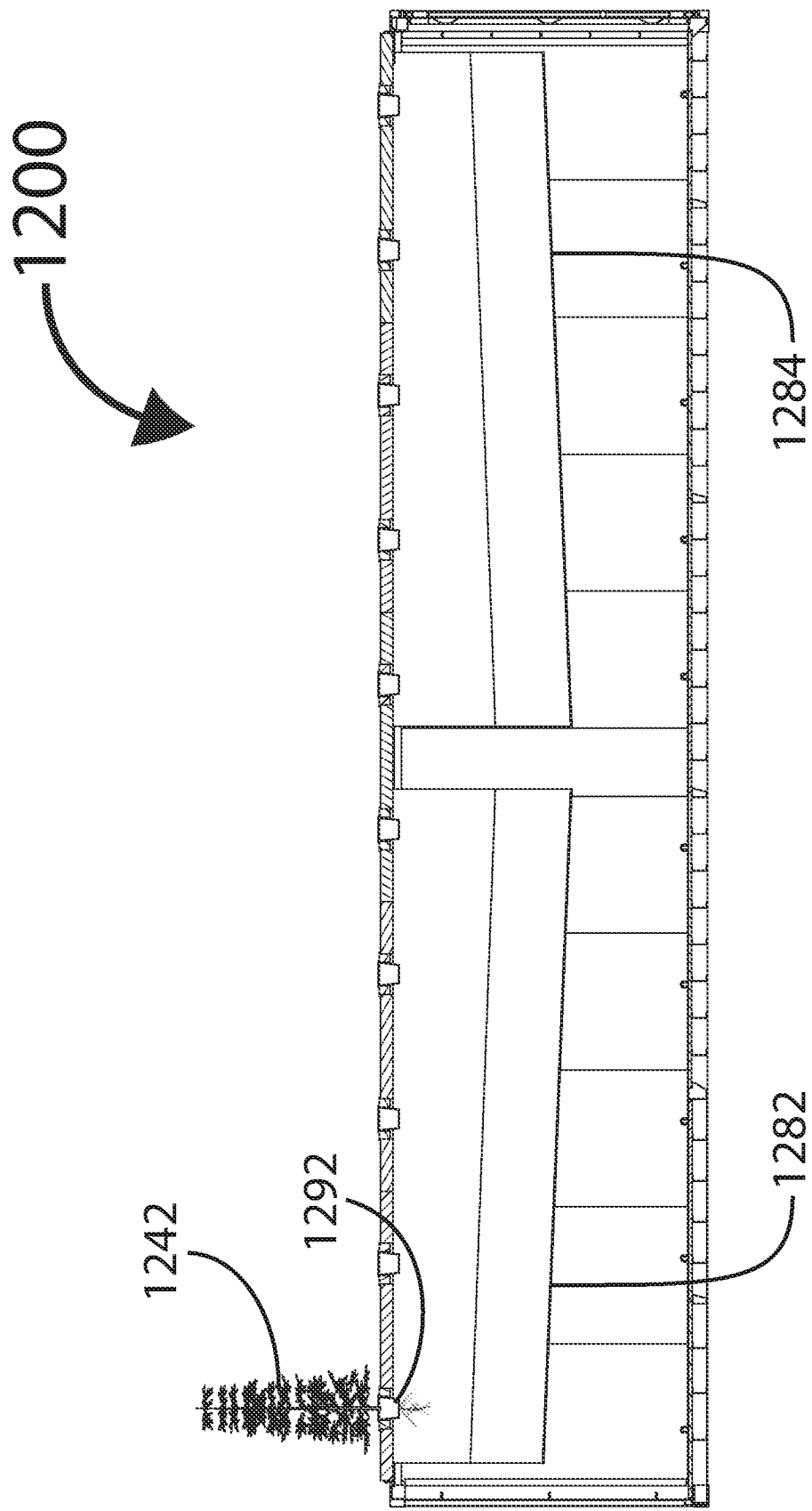
Figure 12C:
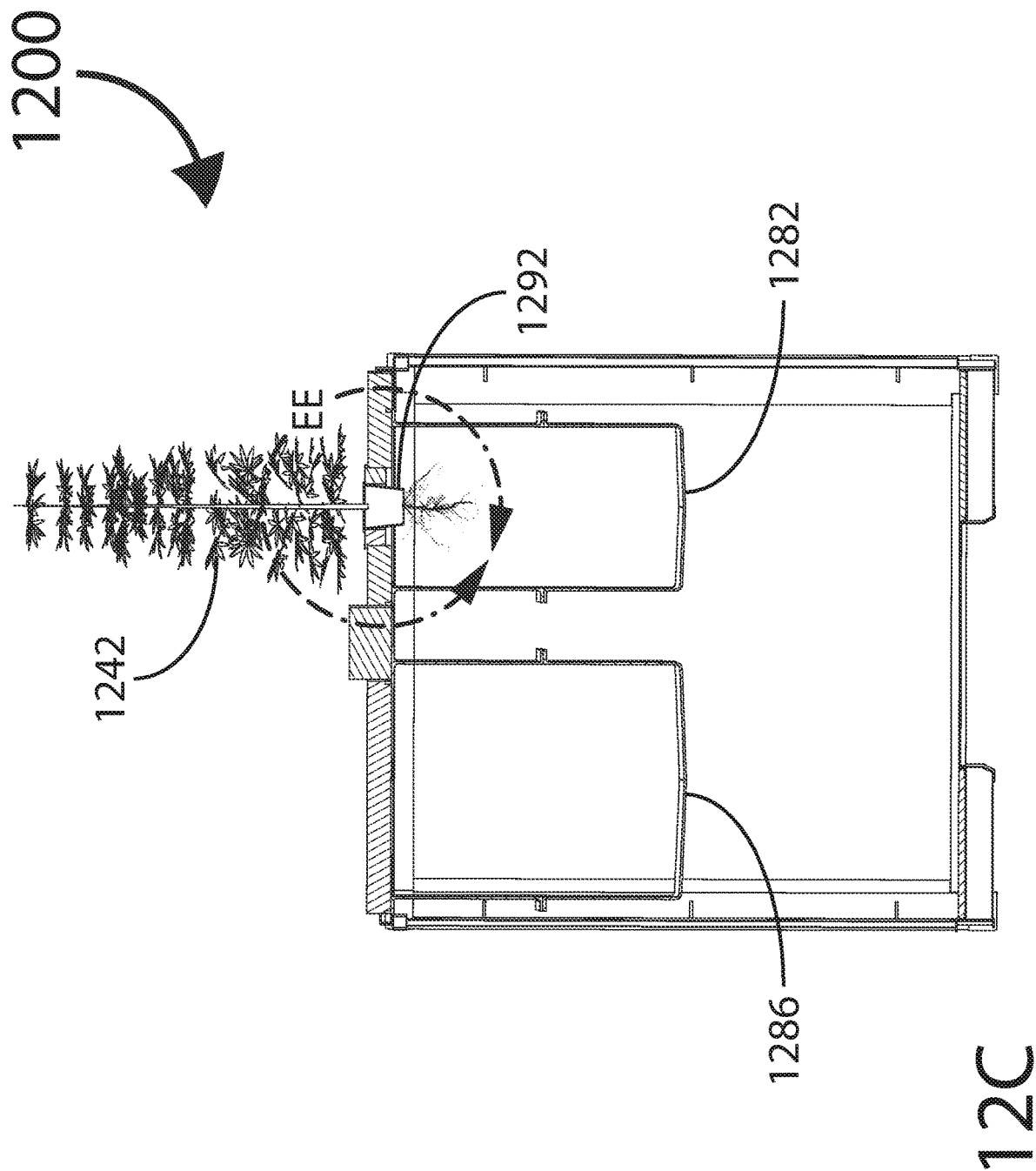
Figure 12D:
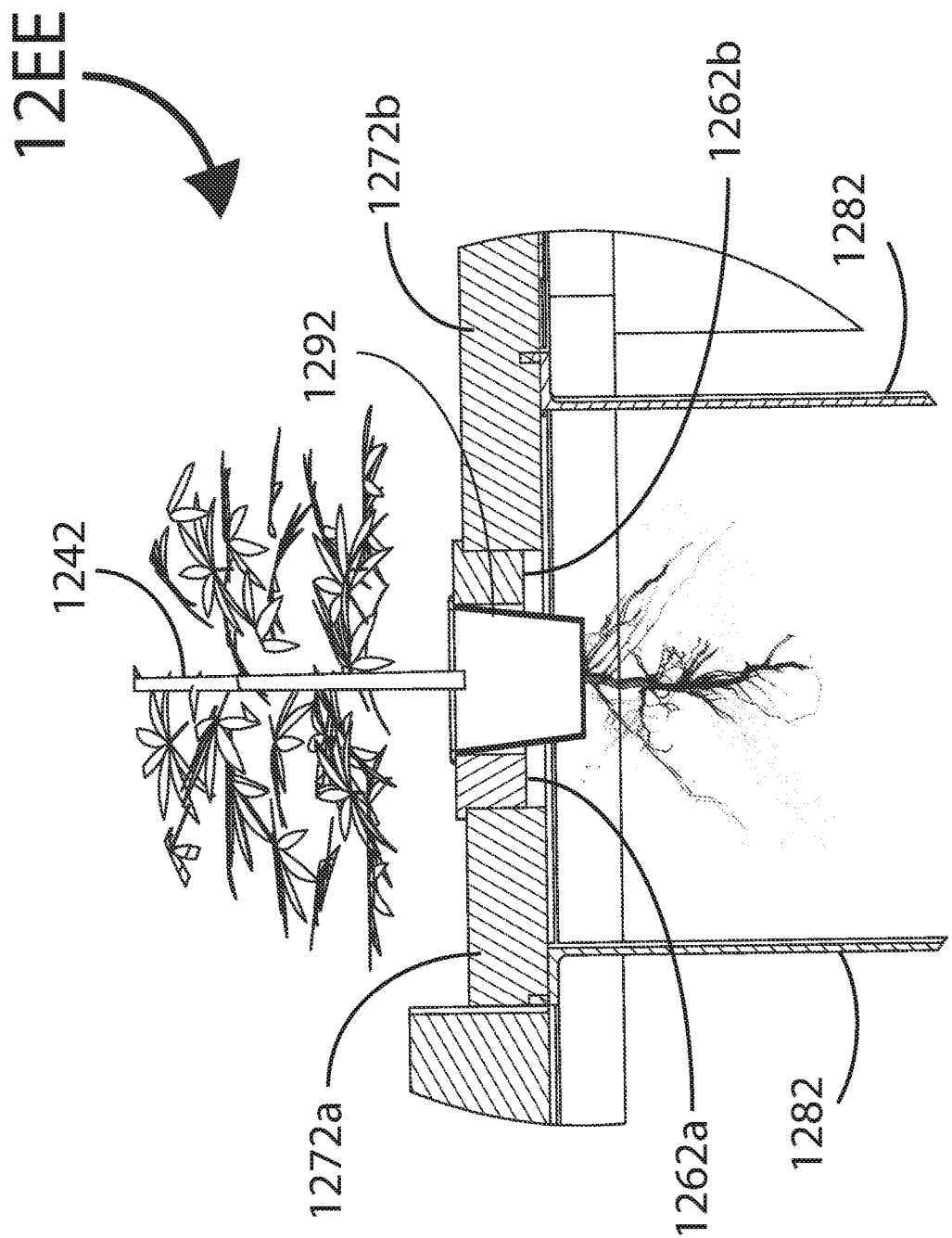
Figure 12E:
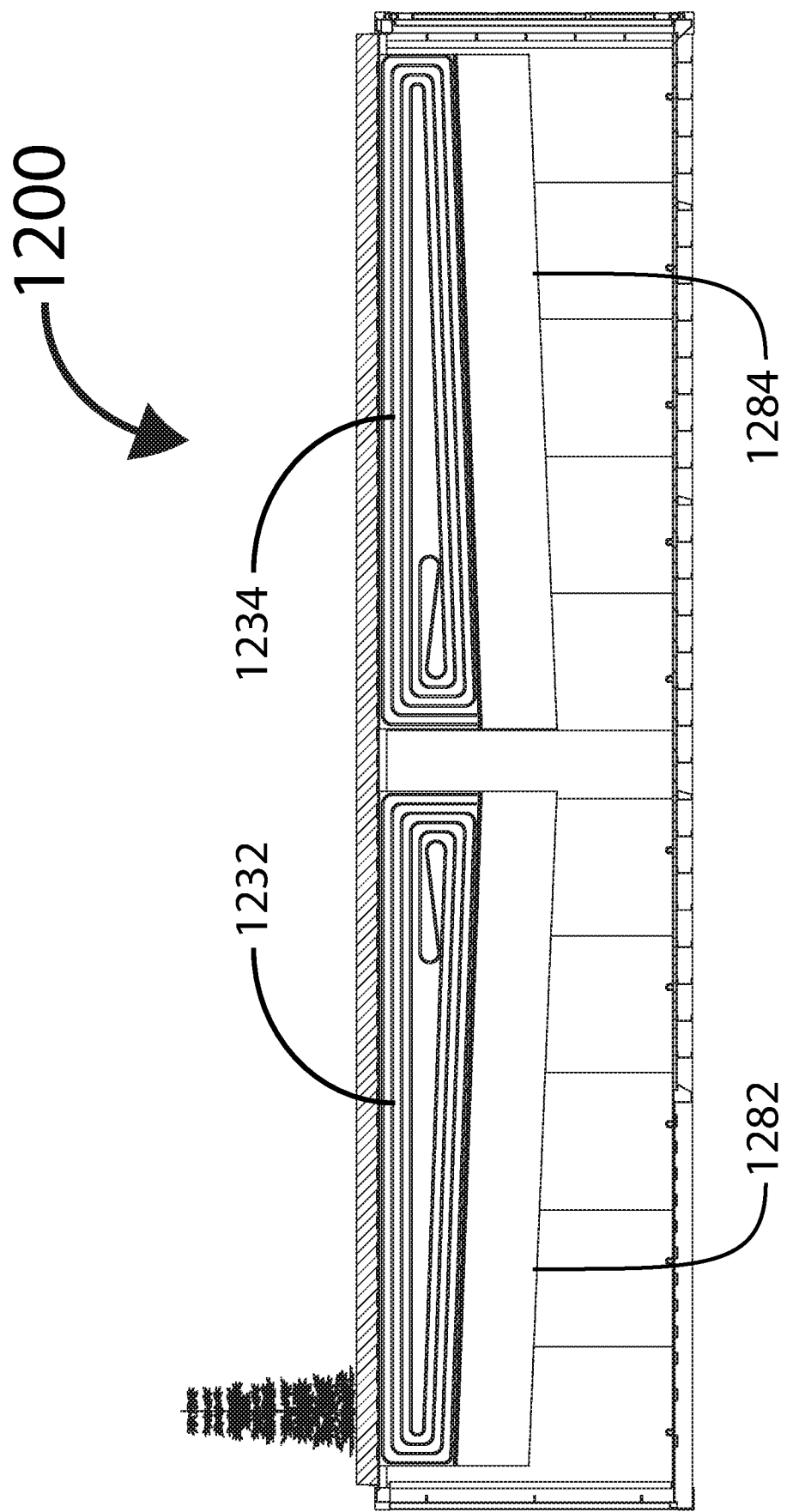

FIGS. 12A-12E illustrate yet another embodiment of a growth system 1200 configured to house seedlings to plants of increasing maturity, shown as plant 1242. FIGS. 12B & 12E show lateral cross-sectional views CC-CC & FF-FF of a couple of plant troughs 1282 and 1284, while FIG. 12C is transverse cross-sectional view DD-DD of the plant trough 1282 and a seedling trough 1286.

As shown in FIG. 12D depicting a magnified partial view EE of FIG. 12C, the support structures for plant 1242 includes two parts of the floor 1272a and 1272b, a supporting ring 1262a and 1262b and a growth pod 1292. The ring 1262 can be a large grommet that may be in two parts or simply a single split grommet that can be positioned so as to secure the growth pod 1292 into the hole cutout in the floor. As explained previously, the floor is split simply for convenience of maintenance but is required so as to provide at least a barrier to prevent light from affecting the root system of the plants adversely. The support and stability needed by the plant is provided by nesting the reinforced rim of pod 1292 resting on ring 1262a and 1262b, which in turn rests on floor parts 1272a and 1272b. In one embodiment, a heating or cooling system is created by circulating a suitable liquid, such as a water-glycol solution, through a network of winding pipes 1232 and 1234, e.g. winding pipes 1232 located between the growth troughs 1282 and 1286, as illustrated by the cross view FF of FIG. 12E.

Figure 13A:
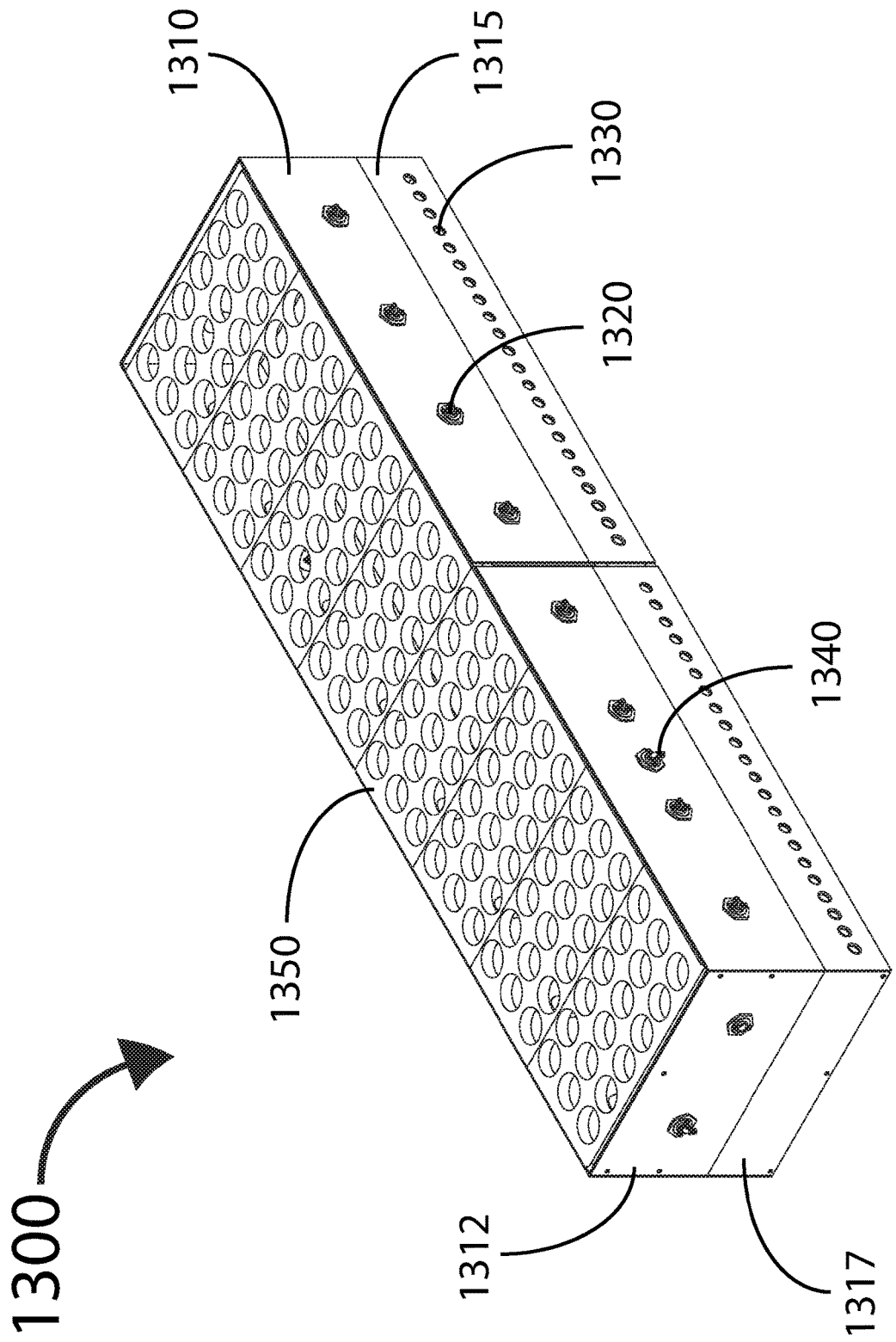
FIGS. 13A through 13C illustrate an alternate densely packed, well integrated growth chamber assembly for the fogponics growth system of FIG. 1A.

Turning now to FIG. 13A, a perspective view of a growth chamber assembly 1300, the enclosing walls 1310 and 1312 for the upper part of the assembly and 1315 and 1317 for the lower part are shown as separate parts by way of example, as these upper and lower components can be combined into a single part such as a molding. Fabrication of these outer walls may be done using any suitable material, such as a stainless steel or PVC or a polyethylene material. The production of a nutrient fog is achieved with nozzle assemblies 1320 that are inserted through the outer wall and extend through the inner wall structure to produce the fog within the root region in the growth troughs 1282 of the growth chamber 1300. The floor of the growth chamber is nominally at the division between the illustrated upper 1310 and lower 1315 outer wall components, but its actual position is determined by manufacturing convenience. Airflow is provided beneath the floor 1350 of the root region, entering at a duct at the end of the assembly 1300 (see 1325 at FIG. 13B) and exhausted back into the growth room through the holes 1330. Measuring sensors 1340 are located proximate to the nozzle assemblies 1320 though sensor location is a design choice; for example there may be several sensors located together in one area or else there may be a number of sensors located at various points in the root region beneath the floor 1350. The division between the root of the plant and the stem/leaf system of the plant comprises the roof to the chamber and is shown at 1350. This is typically made of a durable plastic such as a Low Density Poly Ethylene (LDPE) that is easily replaced in sections; holes are provided in the structure to accommodate the plant. In this illustration, the lower end plate is shown as a flat plate without ventilation exhaust holes 1317 but this is again a design choice, and according to the limits of the area within which the growth chamber is located, ventilation holes are not prohibited.

In some embodiments, growth is achieved at higher temperatures than are conventionally used. One advantage to this is that the cooling burden is reduced and so air conditioning equipment is only needed when the ambient temperature surrounding the installation is significantly higher than this elevated growth temperature. Accordingly, simple chillers can be substituted for air-conditioning equipment in many cases, with the attendant benefits of reduced power requirements. Thus forced airflow to the underside of the floor of the root region is generally sufficient to modulate the temperature of the growing environment, both root and leaf area.

Figure 13B:
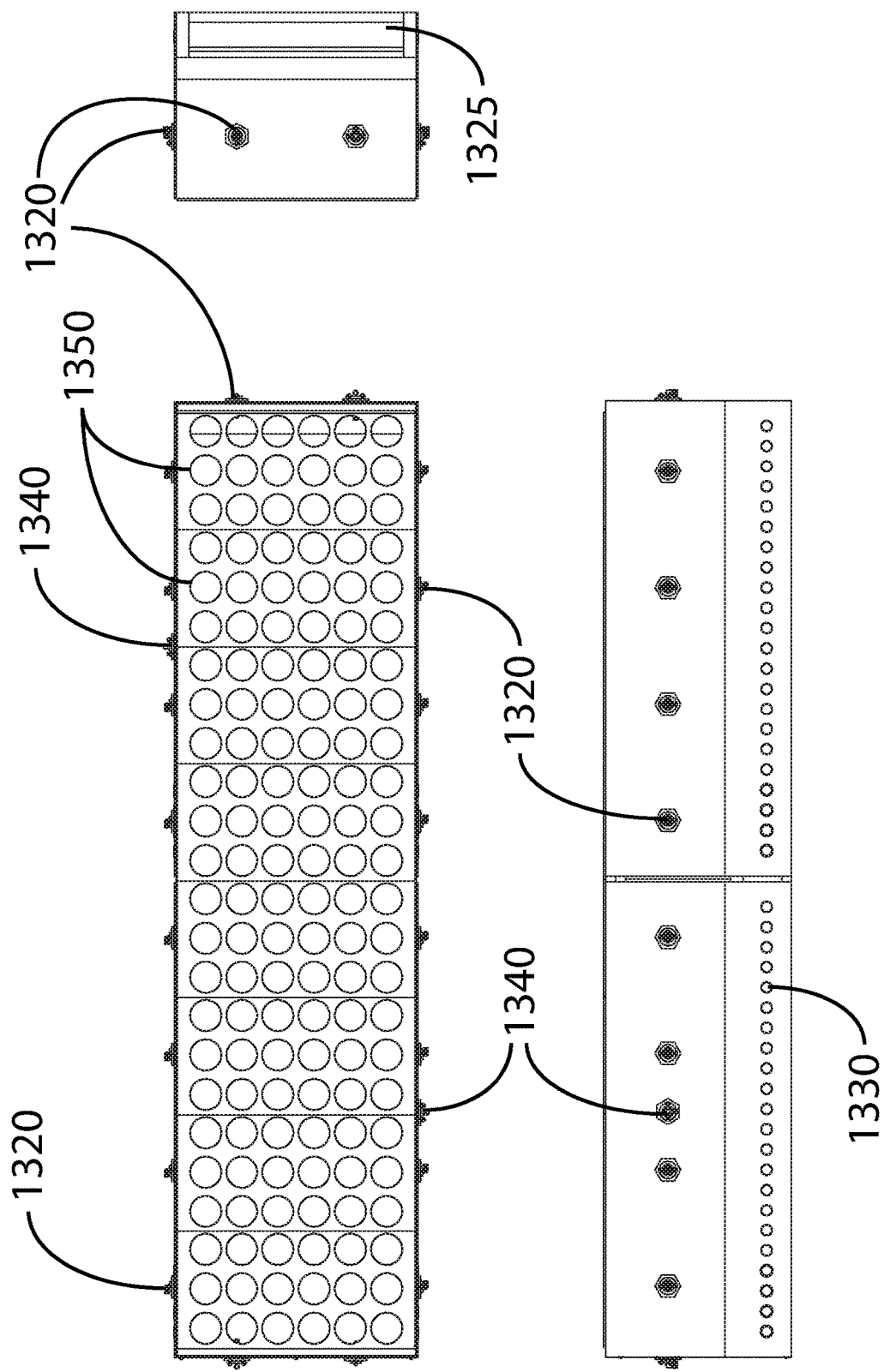

FIG. 13B is a plan and elevation view of the illustration of FIG. 13A. Airflow is provided by a forced air system comprised of one or more fans and a simple ducting system that moves air from the upper reaches of the growth room, through a ductway 1325 leading under the floor of the root region to exhaust from holes 1330 cut in the lower panels. The illustration shows a rectangular duct, but this is merely illustrative and, for example, circular ducts may be used without limiting an embodiment. The panels 1350 that separate the roots from the stem of the crop have access holes cut into them so that the "pot" or net structure that contains the root ball may be fit into the lid 1350 securely. Although the illustration in FIG. 13A shows a fairly dense hole pattern in 1350, it should be clear that this hole distribution is determined by the crop to be grown and will vary according to the practical constraints for all or any crop.

Figure 13C:
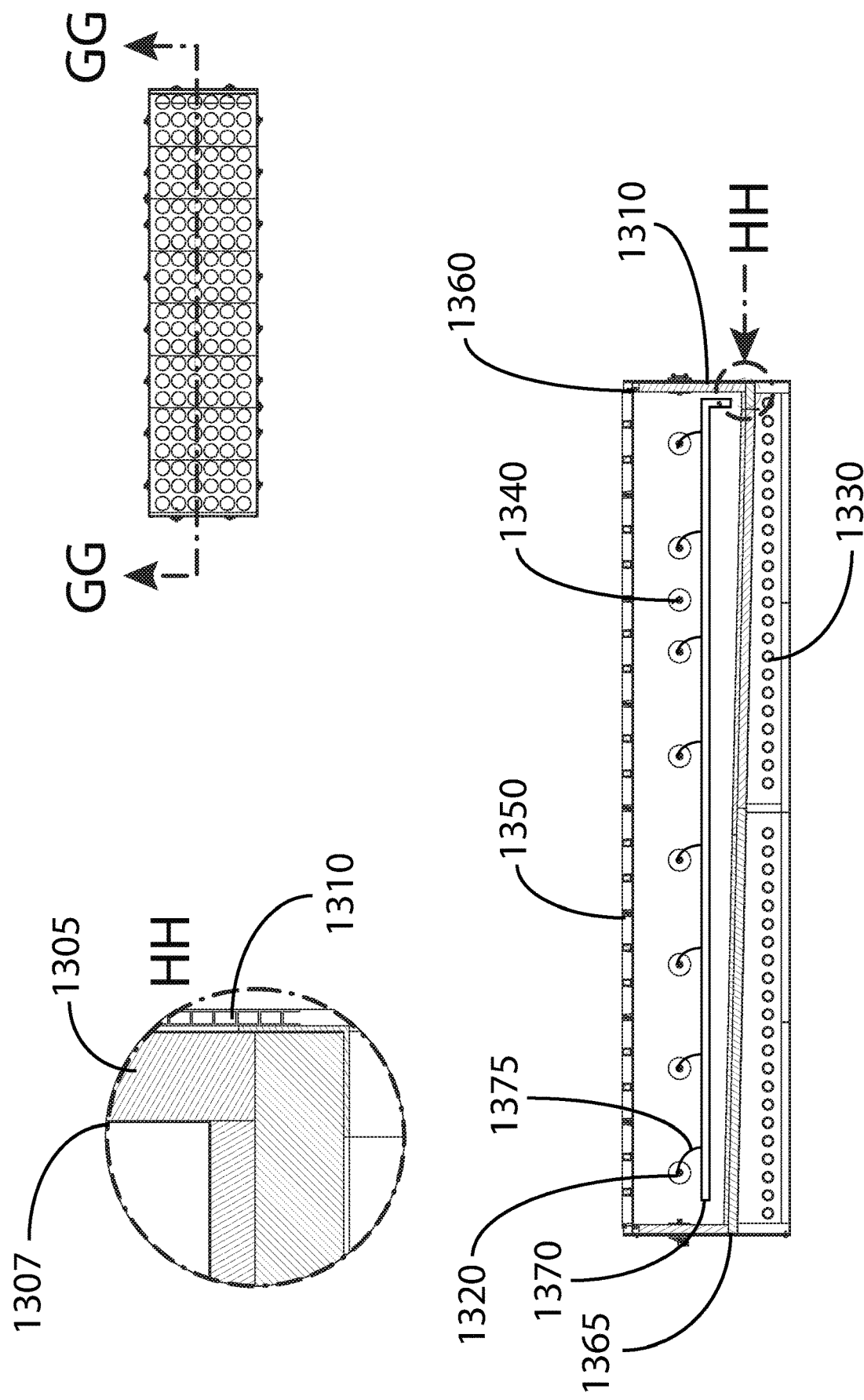

Turning now to FIG. 13C, an example of the construction of this growth platform is shown. Here it can be seen that the root region below panels 1350, within which the fogging system is positioned, can be sloped so that a low point is formed in which a drain system can be installed (not shown). The nutrient fog that is created by a system of nozzles saturates the root region that lies between the floor 1365 and the lids or roof panels 1350. Any further addition of fog should result in condensation that increases droplet size within the chamber that forms the root region, which enlarged droplets then falls under gravity and coalesce to form a liquid stream that can be drained back into the nutrient processing system. The outer walls or panels of the growth platform can be constructed of a PVC or polyethylene material, although any convenient material may be substituted. The inner surfaces of these panels are lined with a thermal insulator 1305, which in one embodiment embeds a network of hydronic conduits. This may be as simple as a series of pipes through which a liquid heat transfer medium may be pumped. The provision of a predetermined temperature in this insulating layer serves to render the inside of the reservoir independent from temperature variations outside the reservoir. The inner surface of this insulating layer 1305 supports an impermeable reservoir liner 1307 that forms the bottom and sides of the reservoir that defines the root region and that prevents the saturated atmosphere created by the fogging nozzles from wetting the insulating material and offering a route for bacteriological contamination such as mold growth.

The fogging nozzles 1340 are supplied with the nutrient rich fluid and produce a fine mist of microdroplets that are nutrient rich and are initially too small to fall under gravity. As the atmosphere within the reservoir area (the root region) reaches saturation, droplets will eventually coalesce and grow until they begin to fall under gravity. To achieve the required small sizes of droplet to form a fog, high liquid pressures are needed. This liquid distribution is achieved using a stainless steel seamless pipe 1370, pressurized with a high pressure pump. A pressure transducer is installed at the lowest pressure point in this distribution manifold, typically close to the connection between the manifold and the nozzle furthest from the inlet point to which the pump is connected, so that the delivery pressure can be maintained within the range that allows the fogging nozzles to operate properly without forming drips resulting from a failure of the nozzle to create a mist due to low pressure. For completeness, flexible braided lines are attached between the manifold pipe and individual nozzles. Suitable choice of pipe bore and associated interconnection fittings avoid the complexities of flow and pressure management at individual nozzles.

Fogging nozzles 1340 operate at high pressure, e.g., in the neighborhood of 70 bar or 1000 p.s.i., and have a nozzle orifice that is a small diameter, e.g., between six and twenty thousandths of an inch depending on desired droplet size. The nutrient solution is carefully mixed and filtered to remove particulates since the presence of solids leads to wear that can reduce the fogging performance of the nozzle, and any contaminants can also block the nozzle orifice either partially or completely. Although repair may be possible, in general it is possible to simply change the nozzle assembly 1400 shown in FIG. 14A, so that system downtime is minimized and subsequent component repair may be carried out without substantially affecting the crop growth cycle. To this end, a nozzle subassembly is simply inserted into precut holes above the floor of the reservoir, in the root region. A goal is to make the maintenance of the fogging system as efficient as possible. To this end, FIGS. 14A-14C illustrate the construction of these subassemblies.

Figure 14A:
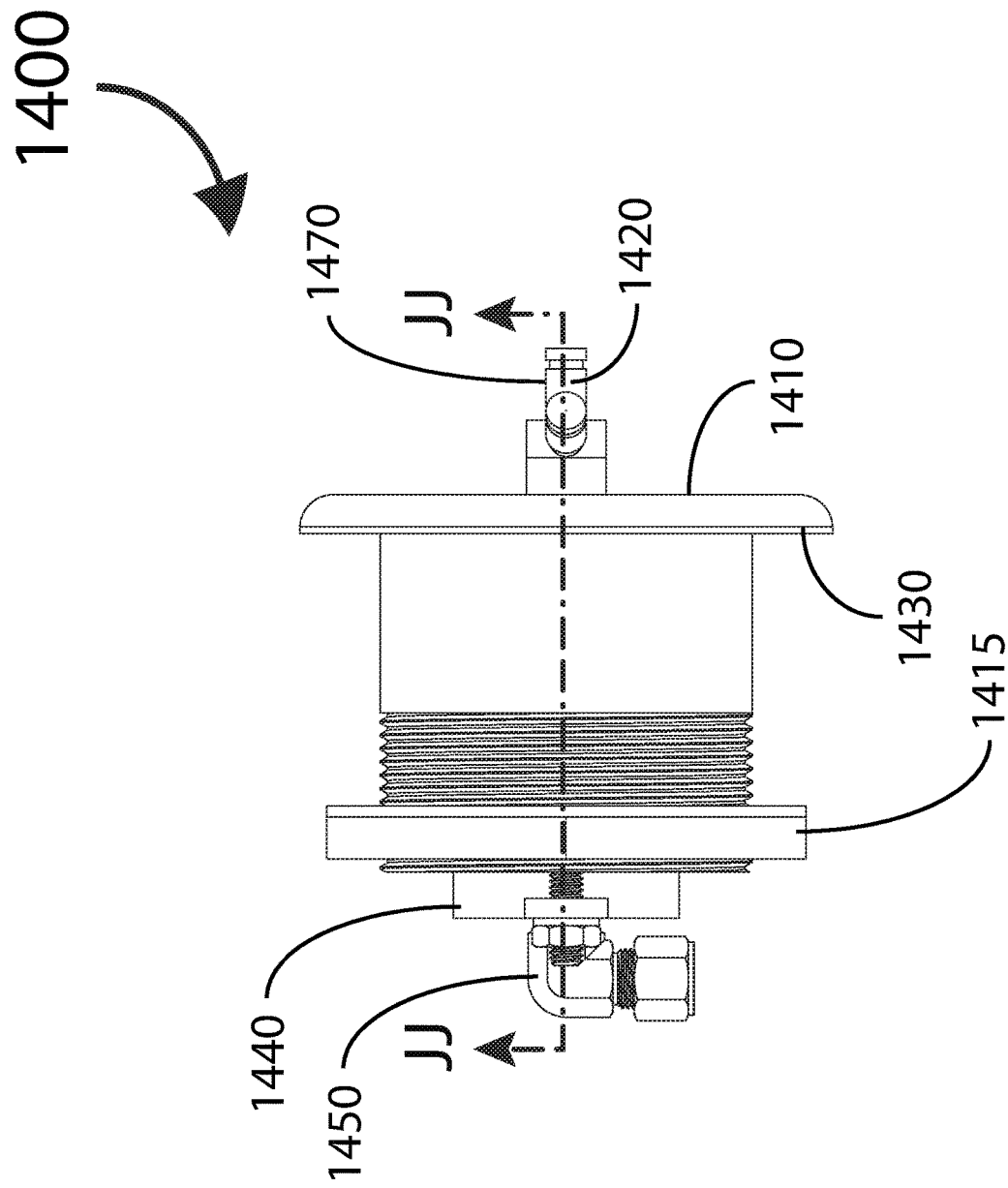
FIGS. 14A through 14C illustrate construction details of the fogging nozzles that are used in the chamber assembly illustrated in FIG. 13A.
Figure 14B:
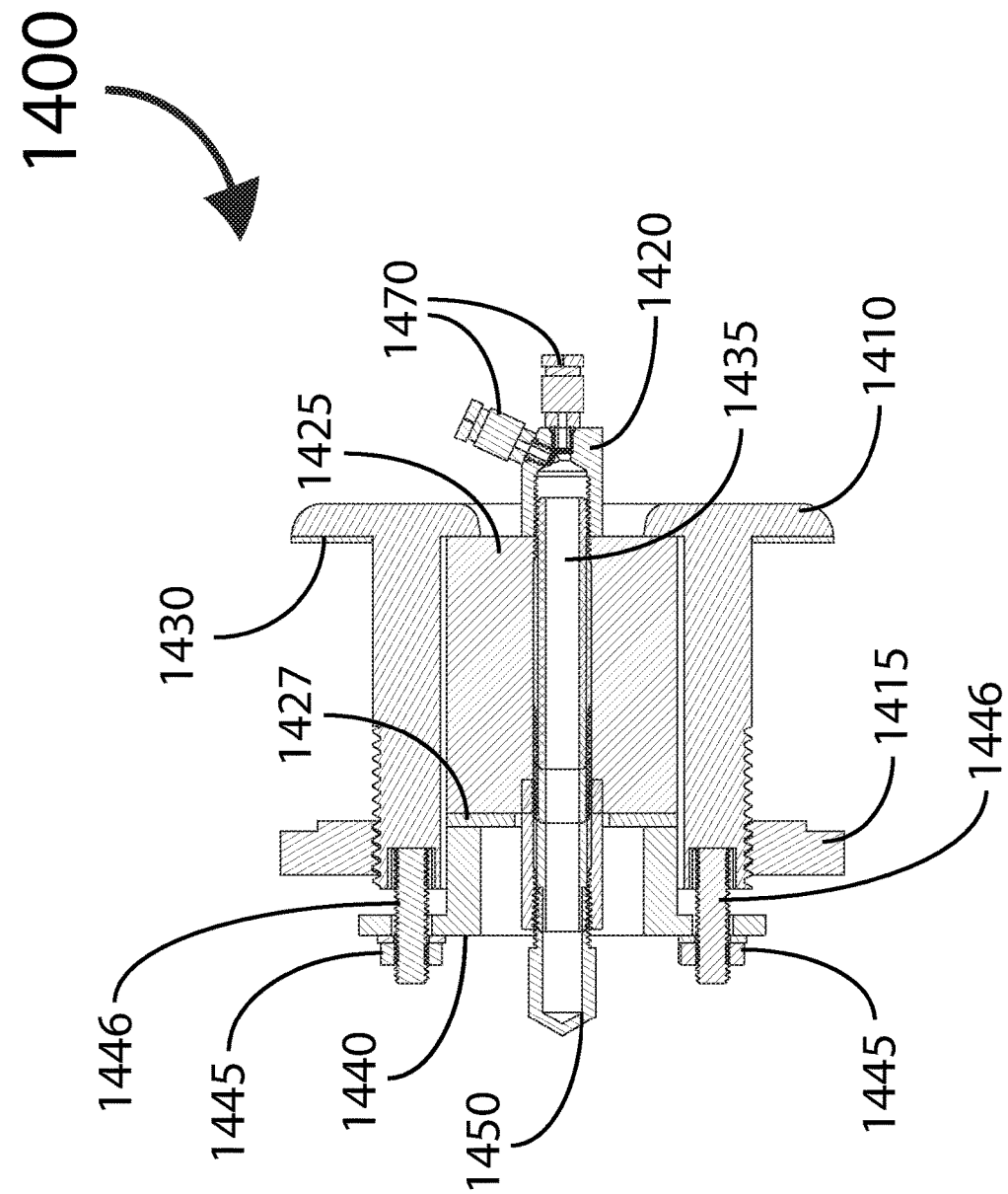
Figure 14C:
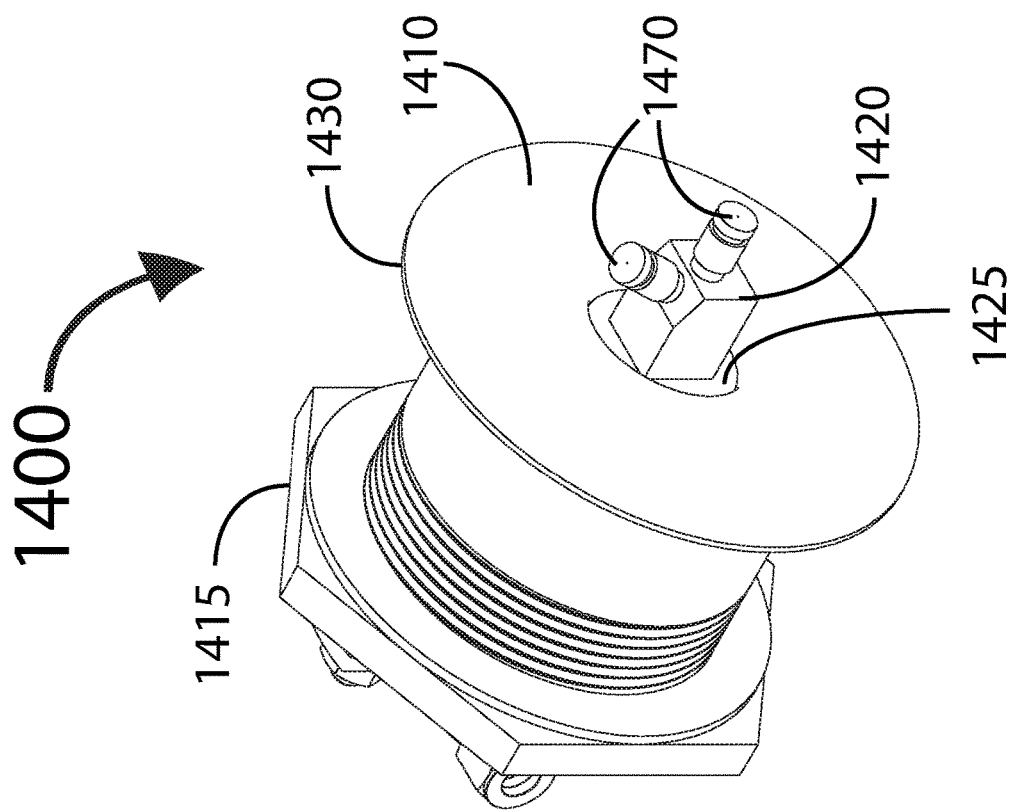
Figure 14C:
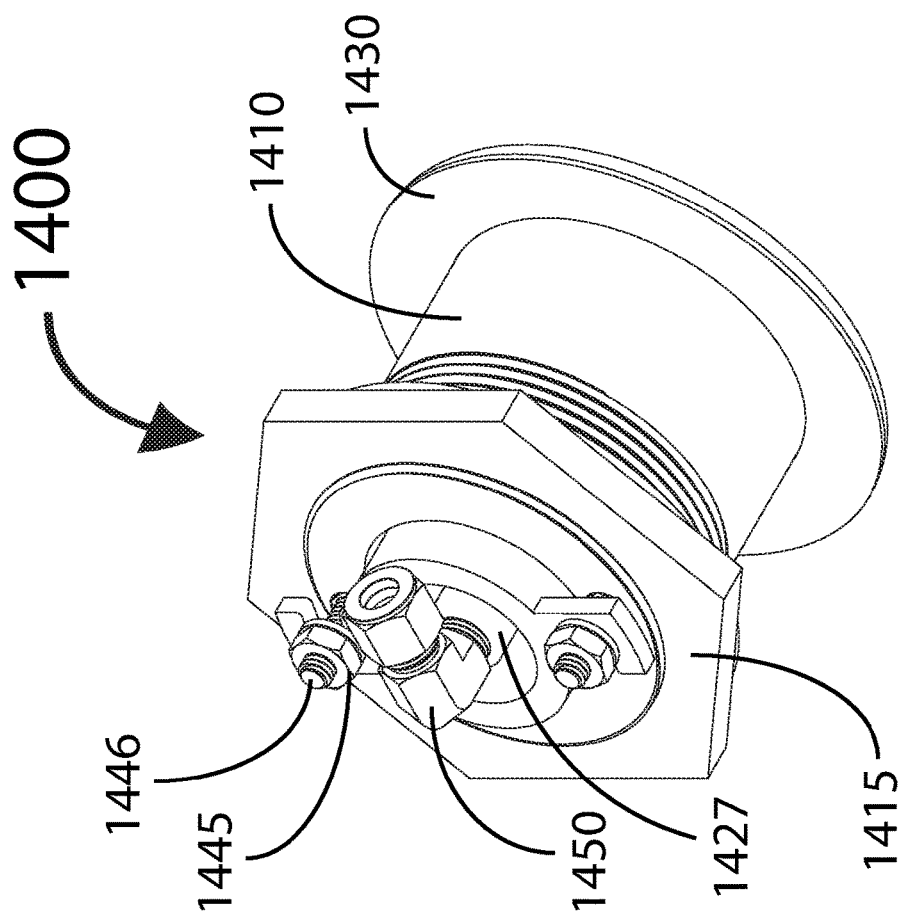

FIGS. 14A, 14B and 14C depict exemplary side view, cutaway view and perspective views of the nozzle assembly 1400 that allows the internal construction to be clearly seen. The functionality described can be achieved with variations that do not materially change the operation of this nozzle. At the cost of more difficult maintenance one embodiment has the nozzle adapter 1420 connected directly to a semi-permanent pressure feed that is installed as part of the reservoir. The body of the nozzle assembly 1410 provides the attachment for the nozzle adapter 1420 as well as the assortment of sealing materials to prevent leakage from the inside of the reservoir. The assembly is installed by inserting the assembly 1400 from the inside of the reservoir so that the finished end that supports the one or more fogging nozzles is within the reservoir. A gasket 1430 ensures that a good watertight seal is maintained between the reservoir liner 1307 and this assembly 1400. The gasket 1430 may be made from any convenient material and in one embodiment a neoprene gasket is used; the requirement is that the gasket material be sufficiently compliant to seal in the presence of surface imperfections or irregularity at the surface of the liner 1307. The outer end of the body of the assembly 1400 is threaded and a nut 1415 screwed onto it to compress the panel 1310, insulation 1305 and liner 1307 materials, thus securing the assembly. One or more nozzles can be fitted into the nozzle adapter 1420 so that the spray patterns from the nozzle(s) are more or less symmetrical about the vertical axis to ensure good coverage of the root systems whose volume bulk can be above or below the nozzle(s).

In some embodiments, a simple keying system is used, which may be a flat or a protrusion from the body of the assembly 1400 so that preassembled components require no particular alignment procedure. To tighten the nut, hand pressure alone may be adequate, but if desired, a simple spacing washer may be used between the outer surface of the panel 1310 and the inner surface of the nut to reduce friction. The required tightness is that which ensures a water resistant seal between the gasket 1430 and the reservoir liner 1307. Synthetic sealants may be used but it is important that they be fully cured before the system is used, due to the potential toxicity of fumes produced whilst curing.

The fogging nozzle adapter 1420 is threaded onto a schedule 80 stainless steel pipe 1435. A seal 1425 is inserted into the assembly body and the pipe inserted into a preformed hole in the seal. A seal backing ring 1427 is then installed that also secures the pipe in the center of the assembly. A gland 1440 is inserted that presses against the backing ring 1427 and the seal is compressed using nuts 1445 which screw onto threaded components 1446 that have been installed into the assembly body 1410. Screws may also be used to tighten the gland 1440 though this risks damage to the body from repeated insertions into a comparatively soft material. The body should not be of a material that corrodes in the presence of moisture or any of the chemicals that are used in the nutrient solution. A fitting 1450 is finally added to the finished bulkhead assembly that allows a connection to be made to the high pressure distribution line; typically a braided flexible hose is used to connect the completed nozzle assembly to the distribution line or manifold. The fogging nozzles 1470 may be inserted into the nozzle adapter 1420 at any suitable time. The function of the entire nozzle assembly 1400 can be verified prior to installation since improper performance can be masked by the presence of the other fogging nozzles and only eventually discernable as poor growth performance in certain areas of the growth platform. FIG. 14A shows a horizontal nozzle and a single additional nozzle used to ensure that the fogging performance is uniform across the working width of the growth platform. This fill-in at the edges ensures the maximum usable root area. In some embodiments, two additional nozzles are used, more or less symmetrically disposed about the vertical to improve the inter-nozzle coverage between the fogging assemblies.

As the crop reaches maturity, the continuous light and nutrition regimes that characterize the rapid growth phase of the plants become progressively less efficient. The plants then move into a cycle that more closely mirrors the day and night cycle that defines the plant metabolism. The effects of light and dark are easily simulated by altering the light intensity and spectral content as desired, or at least within the capability of the lighting mechanism. A further requirement is the modulation of temperature and humidity to properly reflect the optimal growth and production needs of the plant or crop.

Contrary to common practice, for some plant species, the temperature and humidity range between the simulated day and night environment and varies within an elevated temperature range that approaches averages of, for example, 110° F. along with a humidity as low as 45% and as high as 70% during the daylight cycle, to a low temperature of between 55° F. and 60° F. with a humidity in a similar range. Using standard HVAC techniques to regulate temperature and humidity is surprisingly difficult because the heating cycle allows the humidity to climb as the plants transpire water and so a cooling cycle is needed to reduce the humidity of the air. This results in considerable energy expenditure and complexity to manage these two elements closely because they are tightly coupled and interaction cannot be avoided.

Figure 15A:
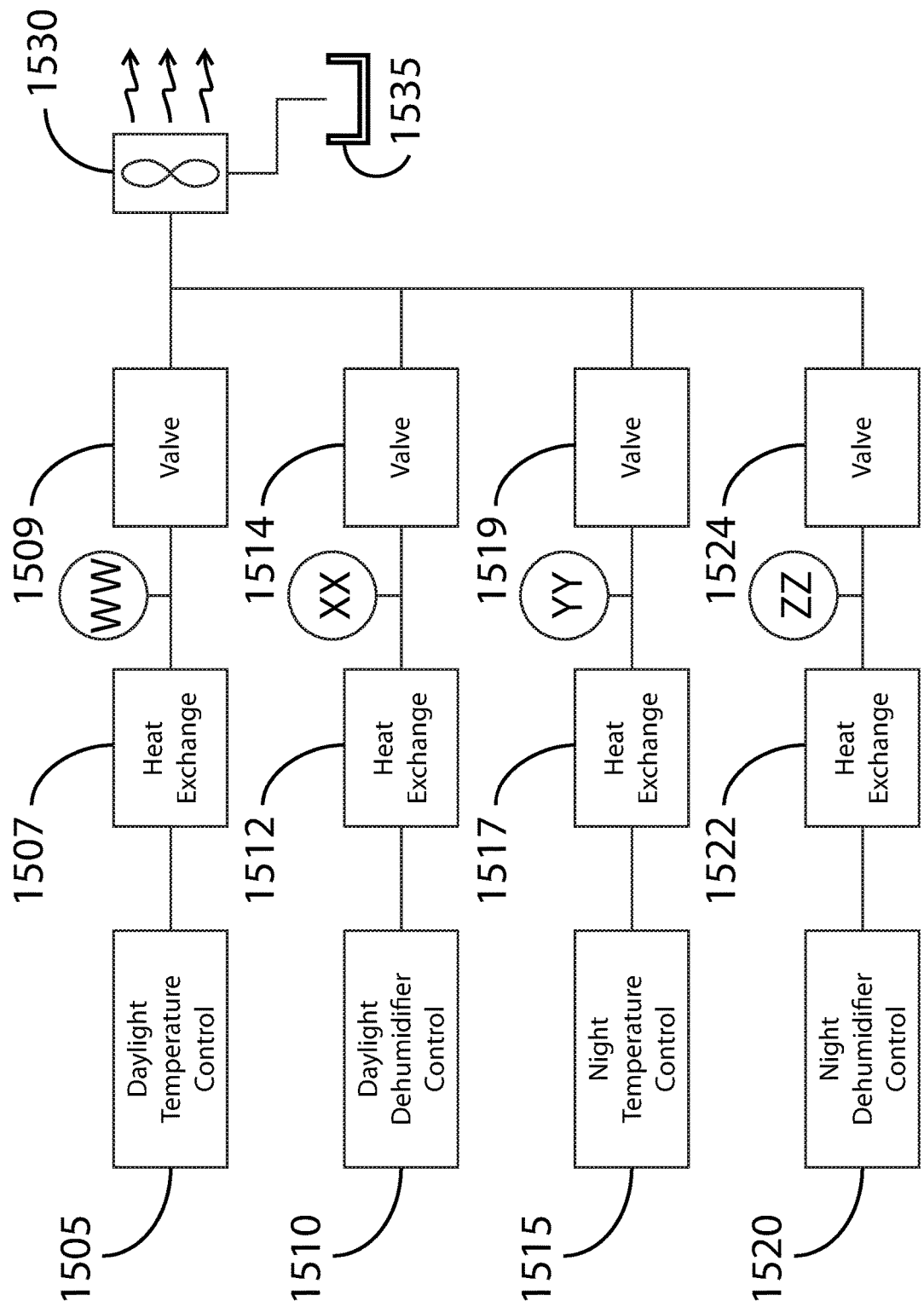
FIG. 15A illustrates an exemplary heating and cooling system for the fogponics growth system of FIG. 1A.

In some embodiments, humidity and temperature can be controlled fairly precisely and are quite well decoupled, which in concert with separate, closed heating and dehumidifying sections enables the system to be entirely contained. An advantage is that with very little fluid loss in the heat exchanger system maintenance of the fluids is kept to a minimum. Turning to FIG. 15A, this figure illustrates system operation at the block diagram level. Four exemplary tanks, 1505, 1510, 1515 and 1520, containing a water-glycol mixture are temperature controlled independently. Any antifreeze mixture that prevents any risk of freezing of the fluid due to extreme malfunction or system failure in harsh environments may be used. It is beneficial if the heat capacity of the system is not compromised by improper choice of fluid, nor must the fluid cause corrosion in the system components. A heating or cooling system associated with each tank, not shown in this diagram, allows precision control of tank temperature and is implemented at build-time so as to be operable in the intended environment in which the growing system will be implemented. Although each tank may be equipped with both heating and cooling capability for the fluid contained in the tank, this represents an avoidable expense if proper planning is used.

In some embodiments, a single heating and cooling system is used and an arrangement of valves used to route the fluid so that is raised or lowered to the predetermined temperature for that tank. By choosing the volume of fluid for each tank, then sufficient thermal capacity is assured to hold the fluid temperature close enough to the predetermined temperature to maintain a stable growing temperature and humidity.

Referring now to the functional block diagram of FIG. 15A, consider the task of raising the temperature of the growing chamber. The high temperature cooling tank 1505 is heated or cooled as required and held at a predetermined temperature. The fluid from this tank is passed to a heat exchanger 1507 where energy is exchanged into a second circuit that is coupled by a system of valves to the growing chamber radiator 1530 which radiator may be equipped with a fan so as to produce a more even heating or cooling effect. At first, the chamber will be cool or cold and the warm fluid at the predetermined temperature of the fluid contained in tank 1505 serves to raise the temperature of the growing chamber to that of the fluid. However, the temperature of the growing chamber is also being raised when the lighting system is in operation due to the significant energy being dissipated by the lights. At some point, the temperature of the growing chamber will exceed that of the fluid in radiator 1530 and instead of heating the chamber, the radiator now serves as a cooling influence. Excess heat energy is removed by using one or more fans to circulate air through the radiator 1530 which is a heat exchange process. In order for heat to be extracted, there must be a temperature differential between the ambient air being circulated over the heat exchanging radiator and the fluid within the radiator. Although ideal temperature ranges can be recalibrated for growth optimization of different plant species, for some plant species, experimentation has shown that an exemplary target temperature for the fluid of 92° F. resulted in the desired exemplary operating temperature for the plants of about 110° F.; with an exemplary temperature differential of about 18° F. or 10° C. Using a radiator for this growing chamber heat exchanger that has a larger surface area will reduce this differential temperature as will moving more air over the radiator fins. Once the desired temperature is achieved, valve 1509 can be closed and after a short time lag the chamber temperature will then rise again. In some embodiments, the valve 1509 is continuously variable so that the fluid flow may be modulated to achieve a more precise chamber temperature.

During the daylight cycle when photosynthesis is occurring and temperatures are quite high, plant transpiration releases water vapor into the air in the leafy section of the growing chamber and so the humidity rises. Depending on the crop being processed, there is a respective range of humidity which optimizes the plant's performance. To reduce humidity, it may be necessary to remove this mainly transpired water from the air. Tank 1510 holds fluid at a lower temperature than tank 1505. As for tank 1505, valve 1509 is closed to stop its fluid from circulating through radiator 1530. Fluid from tank 1510 is passed to heat exchanger 1512 and this allows fluid in a second circuit to pass through valve 1514 to the chamber radiator 1530. If the fluid in this second circuit is below the dew point for the atmosphere in the growing chamber, then water will condense on the fins of the radiator and can be exhausted to a drain 1535. Again, although this can be calculated, an experimental determination of the fluid temperature in tank 1510 is quite adequate and when this is 70° F. the humidity in the growing chamber is easily brought into the desired range. Beneficially, this cooling rate of the air mitigates a rapid rise in temperature due to the heat energy released by the illumination for the growing chamber and, once the humidity has reached the predetermined percentage, then valve 1514 may be closed and valve 1509 re-opened to resume active control of the temperature in the growing chamber.

Once the plant moves into the resting cycle as the system moves to the night-time simulation, then the chamber needs to be cooled to the predetermined temperature so that the plant may stop feeding and photosynthesis stopped. In the same manner as described above, tank 1515 contains fluid at a temperature that, when passed through heat exchanger 1517 thence through the second circuit through valve 1519 into the chamber radiator 1530, stabilizes the chamber temperature to, for example, between 55° F. and 60° F., which temperature is predetermined according to the crop being grown. Experimentally the temperature of the fluid in tank 1515 was determined to be about 55° F.; although this might appear to offer too low a temperature differential for efficient cooling or heating of the chamber air, it should be noted that the heat energy that must be dissipated is far lower at simulated night because the illumination mechanism is inactive. In a manner similar to the daylight environmental control, as the air temperature drops, the humidity will increase and so once the predetermined chamber temperature is reached, valve 1519 can be closed and the dehumidifier action started. Tank 1520 contains fluid that is held at the lowest temperature of all four tanks. As described, this fluid is passed to a heat exchanger 1522 and the second circuit passes fluid through valve 1524 to the chamber radiator 1530. To control the humidity, the temperature of the second circuit fluid needs to be considerably lower than might be expected and experimental determination shows that a temperature just above the freezing point of water provides best performance; it should be clear that if the extracted water is allowed to freeze then the system will be inefficient and, even though the next application of warmer fluid in pursuit of temperature control will melt any accumulated ice, the regulation of both temperature and humidity will be inadequate. Accordingly the temperature of the fluid in tank 1520 is held above freezing at about 33° F.

Figure 15B:
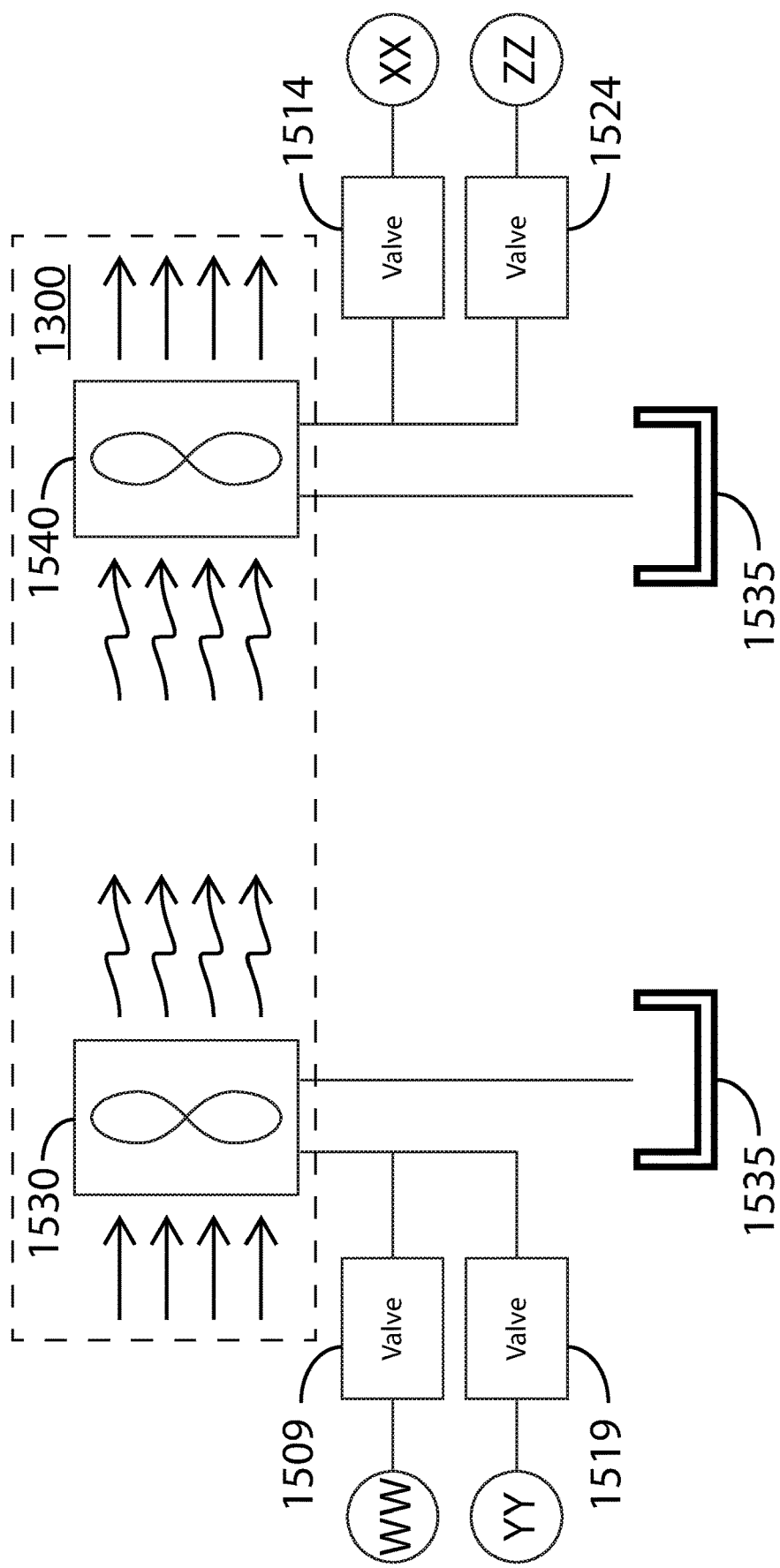
FIG. 15B depicts enhanced control of temperature and humidity for the heating and cooling system of FIG. 15A.

FIG. 15B shows an augmented embodiment of the chamber air treatment system. Here two radiators radiator type heat exchangers, 1530 and 1540 are used. The airflow is generated by a fan assembly which may be incorporated in the radiator assemblies. Radiator 1530 provides the temperature control element for the growing chamber and is fed by the secondary circuits of either the daytime system through valve 1509 or the night-time system through valve 1519. The feed points "WW", "XX", "YY" and "ZZ" correspond to the same identifying points in FIG. 15A and the valves are also the same ones identified in FIG. 15A. Radiator 1540 provides the humidity control and is fed by the secondary circuits for the daytime system through valve 1514 or the night-time system through valve 1524. In this embodiment, the airflow is continuous passing through first the temperature control radiator assembly 1530 passing through the growing chamber to absorb transpiration water from the plant foliage and then through the dehumidifying radiator 1540 before being directed to the walls of the chamber where it circulates up and around and back to the temperature control radiator. No special ducting is needed to direct the flow but fan speed in the radiator heat exchangers can be altered so as to change the heating or cooling rates for either exchanger by changing the air volume per unit time. This results in superior control of the growing chamber environment and leads to both reliability and economical operation. Drain 1535 can be common to both exchangers; the water condensed is clean and can be used as makeup water for the nutrition system, minimizing the overall loss of water and reducing the demand on external supplies.

Pumps can be used to circulate the fluids between the heat exchanging elements and that non-return valves can be used to limit undesirable flow. In some embodiments, a single chilling unit can be used to cool the coldest tank fluid and an arrangement of circulating pumps, valves and small heat exchangers can be used to provide cooling to any other holding tank's contents. A single header tank, not shown, can be used to supply make-up fluid for any of the tanks since the fluid is the same in each and only the temperature is altered. If supplementary heat is required at the growing chamber heat exchangers, either to speed up the process or to improve dehumidification performance, then electric heaters may be attached to the heat exchanging radiators. The use of fan cooling is practical in most ambient conditions where these units are placed and by using the system architecture laid out herein, costly refrigerant systems can be avoided. A two stage exchange system is described because it allows the secondary loop to operate with a minimum amount of fluid. The primary system can be built remotely to any scale and can be arranged to support a large number of growing chambers. Since the secondary system is of limited fluid volume, leaks and spillage are reduced which in turn mitigates against a catastrophic spill of a large volume of a comparatively toxic nature to the crop. This also provides a significant advantage that maintenance work in the chamber can be carried out far more easily since only small fluid loss must be contained if any of the components must be replaced. It should be clear that safety provisions such as overpressure relief valves, temperature cut-outs and fuses or circuit breaker protection for electrical equipment is considered to be normal industrial practice.

In sum, the present invention provides systems and methods for fogponics agriculture. Advantages include substantial reduction in maintenance costs, enabling the substantial reduction in waste of the nutrients and also greatly improved growth performance of the target crop.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. An integrated fogponics crop growth system for cultivating a crop, the growth system comprising:
   an upper growth chamber for accommodating a leafy portion of a crop;
   a lower growth containment chamber for accommodating a root portion of the crop;
   a nutrient tank for holding a nutrient mixture for sustaining the crop, wherein the nutrient tank is external with respect to the lower growth containment chamber;
   a mixing pump for circulating the nutrient mixture, comprising water and a nutrient concentrate, until a homogeneous solution is achieved;
   a nutrient dispenser coupled to the nutrient tank and for atomizing the nutrient mixture into a nutrient fog comprising of micro-droplets in suspension, wherein the nutrient dispenser includes a booster pump and a high pressure pump, and wherein the high pressure pump is operatively coupled to a nozzle configured to dispense the atomized nutrient into the lower growth containment chamber;

a nutrient drainage system coupling the lower growth containment chamber to the nutrient tank for collecting excess nutrient mixture to be returned back to the nutrient tank, wherein the nutrient drainage system is external with respect to the lower growth containment chamber;

an equilibrium loop system for determining and maintaining an electrical conductivity and a pH value of the nutrient mixture and for calculating a rate of change of the electrical conductivity while adjusting the nutrient mixture so that both the electrical conductivity and the pH value are maintained at their respective predetermined target values corresponding to at least one growth phase of the crop, wherein the electrical conductivity provides an alkalinity measure of the nutrient mixture, wherein the alkalinity of the nutrient mixture is adjusted at a rate determined primarily by the rate of change of the electrical conductivity, and wherein any resultant change of the pH value from the predetermined pH target value is adjusted by adding a pH reducer to the nutrient mixture; and an environmental system for maintaining an air mixture at an ambient temperature for the upper growth chamber.

2. The system of claim 1 wherein the high pressure pump generates between approximately 800 PSI to 1500 PSI at the nozzle, and wherein the micro-droplets are between 8 and 20 mils in diameter.

3. The system of claim 1 wherein the upper growth chamber and the lower growth containment chamber are constructed using modular structures.

4. The system of claim 3 wherein the modular structures are shipping containers.

5. The system of claim 1 further comprising at least one computerized server for controlling the nutrient dispenser and the environmental system via a local communication channel.

6. The system of claim 5 further comprising a water preparation controller, a nutrient preparation controller and a root zone controller for controlling the nutrient dispenser via the local communication channel.

7. The system of claim 5 wherein the at least one computerized server includes two or more redundant servers.

8. The system of claim 7 further comprising a master server for monitoring the two or more redundant servers and wherein the master server switches control of the nutrient dispenser and the environmental system between the two or more redundant servers.

9. The system of claim 8 wherein the master server and the two or more redundant servers are coupled to a wide area network.

10. The system of claim 9 wherein the wide area network includes the Internet.

11. The system of claim 9 wherein at least one of the master server and the two or more redundant servers securely communicate with one or more remote grower communicators via the wide area network.

12. The system of claim 1 further comprising a fluid heat exchanger operatively coupled to the lower growth containment chamber, and wherein the heat exchanger maintains a selectable temperature for the lower growth containment chamber.

13. The system of claim 1 further comprising an irrigation controller for draining the lower growth containment chamber.

14. The system of claim 1 wherein a root stem of the crop is located inside a grow pod supported by a support ring which is in turn supported by a floor located between and environmentally separating the upper growth chamber and the lower growth containment chamber.

15. The system of claim 14 wherein the support ring includes two or more segments.

16. The system of claim 14 wherein the crop is suspended inside the grow pod by a plurality of clay balls.

17. The system of claim 1 wherein the nutrient fog is substantially between 6 microns and 15 microns.

18. The system of claim 1 further comprising a bypass valve operatively coupled to the booster pump and wherein the booster pump operating together with the bypass valve provides a constant back pressure for the high pressure pump.

19. The system of claim 1 further comprising a day-time temperature control tank operatively coupled to a heat exchanger for controlling temperature in at least one of the upper growth chamber and the lower growth containment chamber.

20. The system of claim 19 further comprising a radiator and a valve, wherein the valve is operatively located between the heat exchanger and the radiator, and wherein a feed point provides rate of change information to allow precise temperature control in the at least one of the upper growth chamber and the lower growth containment chamber.

21. The system of claim 20 wherein the valve is a variable flow rate valve.

22. The system of claim 19 wherein the temperature is elevated to an average of 110 degrees Fahrenheit.

23. The system of claim 1 further comprising a day-time humidity control tank operatively coupled to a heat exchanger for controlling humidity in at least one of the upper growth chamber and the lower growth containment chamber.

24. The system of claim 23 further comprising a radiator and a valve, wherein the valve is operatively located between the heat exchanger and the radiator, and wherein a feed point provides rate of change information to allow precise humidity control in the at least one of the upper growth chamber and the lower growth containment chamber.

25. The system of claim 24 wherein the valve is a variable flow rate valve.

26. The system of claim 1 further comprising a night-time temperature control tank operatively coupled to a heat exchanger for controlling temperature in at least one of the upper growth chamber and the lower growth containment chamber.

27. The system of claim 1 further comprising a night-time humidity control tank operatively coupled to a heat exchanger for controlling humidity in at least one of the upper growth chamber and the lower growth containment chamber.

28. The system of claim 1 wherein the environmental system maintains a plurality of day and night cycles which include a plurality of resting cycles.

29. The system of claim 1 wherein the temperature of the cooling fluid is maintained at just above a freezing point of water to provide best performance.

30. The system of claim 1 wherein the pH reducer includes carbon dioxide.

31. The system of claim 1 wherein an excess of the electrical conductivity is reduced by adding water.

32. The system of claim 1 wherein the alkalinity of the nutrient mixture is adjusted after any addition of the pH reducer to the nutrient mixture.

* * * * *